United States Patent [19]
Ikeda et al.

[11] Patent Number: 5,530,792
[45] Date of Patent: Jun. 25, 1996

[54] DATA PROCESSING APPARATUS UTILIZING CPU

[75] Inventors: Hirokazu Ikeda; Junichi Arakawa, both of Yokohama; Hideo Horigome; Kazuyuki Masumoto, both of Tokyo, all of Japan

[73] Assignee: Canon Kabushiki Kaisha, Tokyo, Japan

[21] Appl. No.: 232,579

[22] Filed: Apr. 25, 1994

Related U.S. Application Data

[63] Continuation of Ser. No. 697,587, May 9, 1991, abandoned.

[30] Foreign Application Priority Data

| May 10, 1990 | [JP] | Japan | 2-122038 |
| Jul. 26, 1990 | [JP] | Japan | 2-199484 |
| Sep. 21, 1990 | [JP] | Japan | 2-252273 |

[51] Int. Cl.⁶ ............................................. G06K 15/00
[52] U.S. Cl. ........................................ 395/115; 395/166
[58] Field of Search ........................... 395/101, 114–116, 395/162–166; 358/404, 444

[56] References Cited

U.S. PATENT DOCUMENTS

| 4,122,520 | 10/1978 | Adamchick et al. ............. 395/164 |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |

FOREIGN PATENT DOCUMENTS

| 0094042 | 11/1983 | European Pat. Off. . |
| 0227106 | 7/1987 | European Pat. Off. . |
| 59-123670 | 7/1984 | Japan . |
| 59-138461 | 8/1984 | Japan . |
| 62-165263 | 7/1987 | Japan . |
| 2029357 | 1/1990 | Japan . |

*Primary Examiner*—Arthur G. Evans
*Attorney, Agent, or Firm*—Fitzpatrick, Cella, Harper & Scinto

[57] ABSTRACT

An information processing apparatus, or an image recording apparatus, utilizing a CPU and a memory and capable of improving the throughput of data processing is disclosed. When the CPU does not make access to the memory, the bus between the CPU and the memory is disconnected and the bus between the memory and a data reception buffer or a recording device is established, so that the data transfer between the memory and the data reception buffer or the recording device can be conducted in parallel to the function of the CPU.

50 Claims, 47 Drawing Sheets

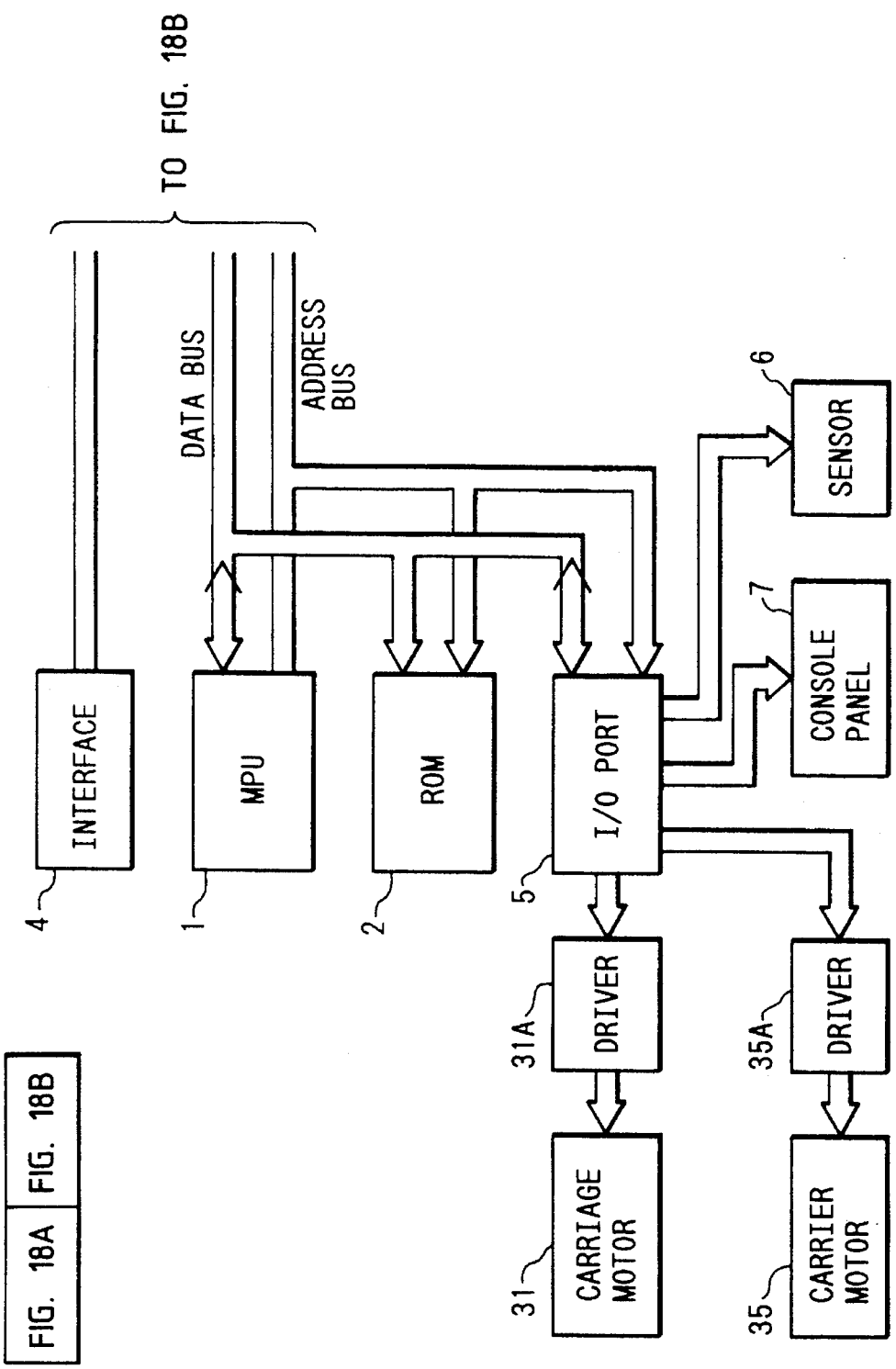

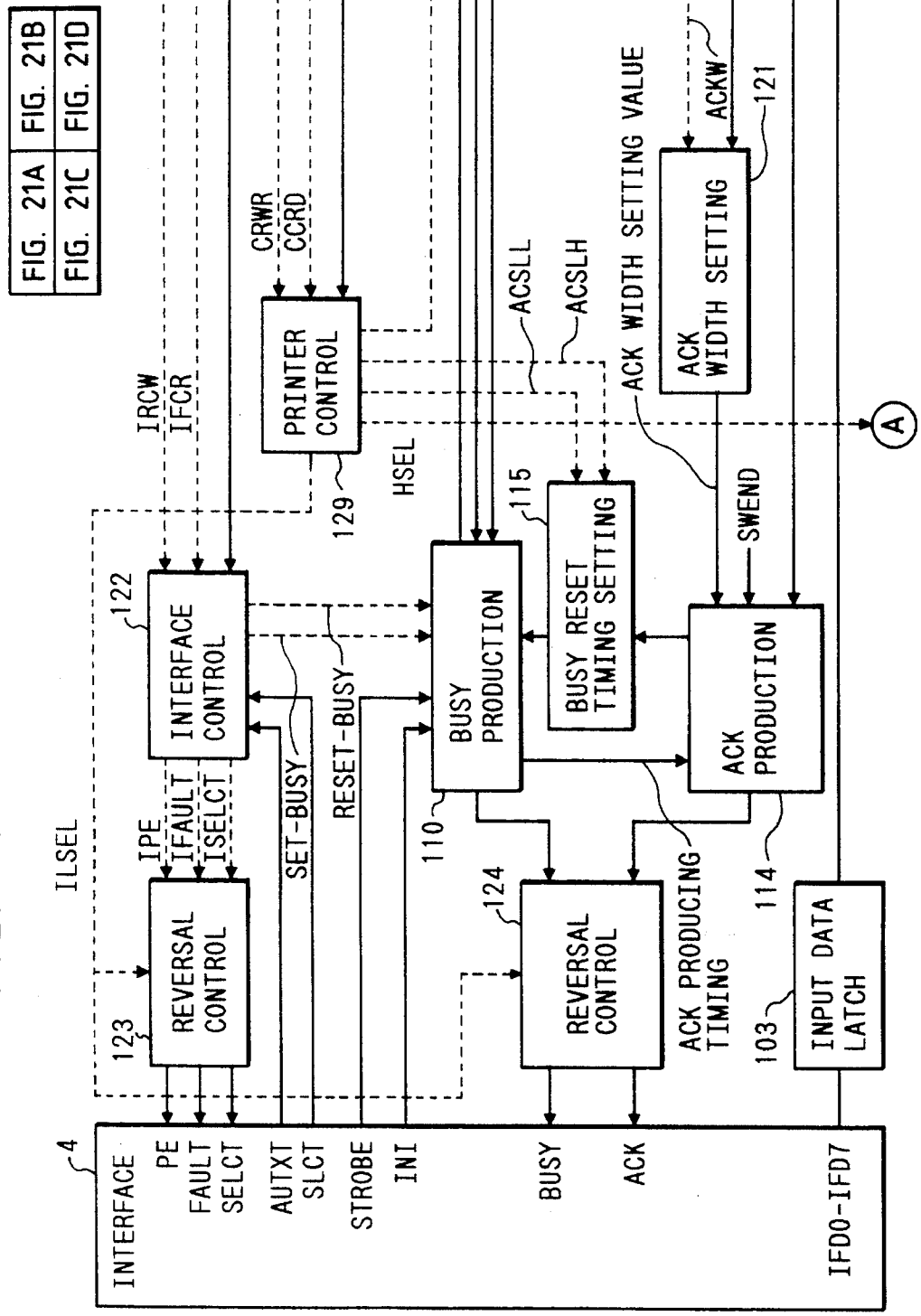

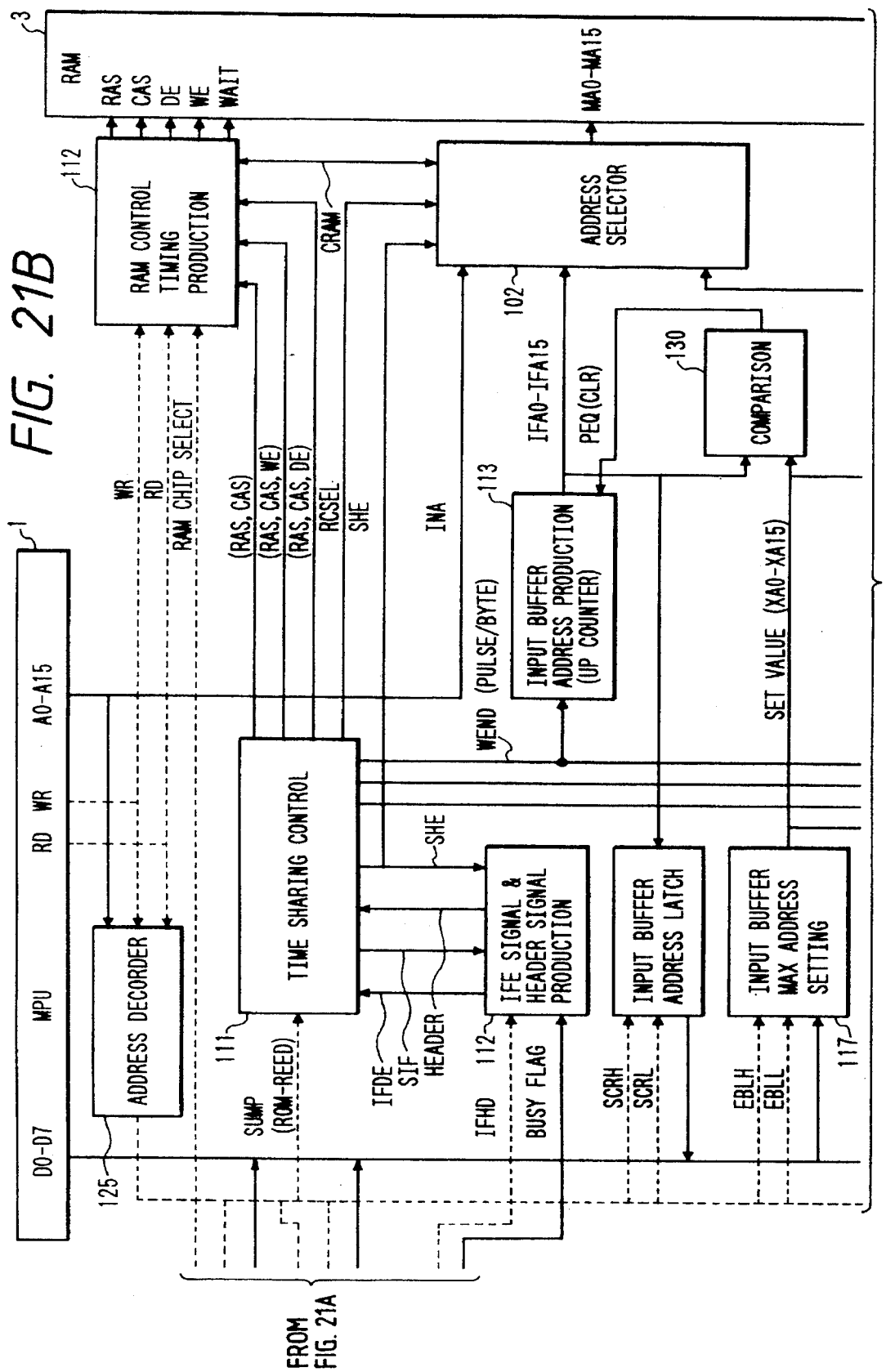

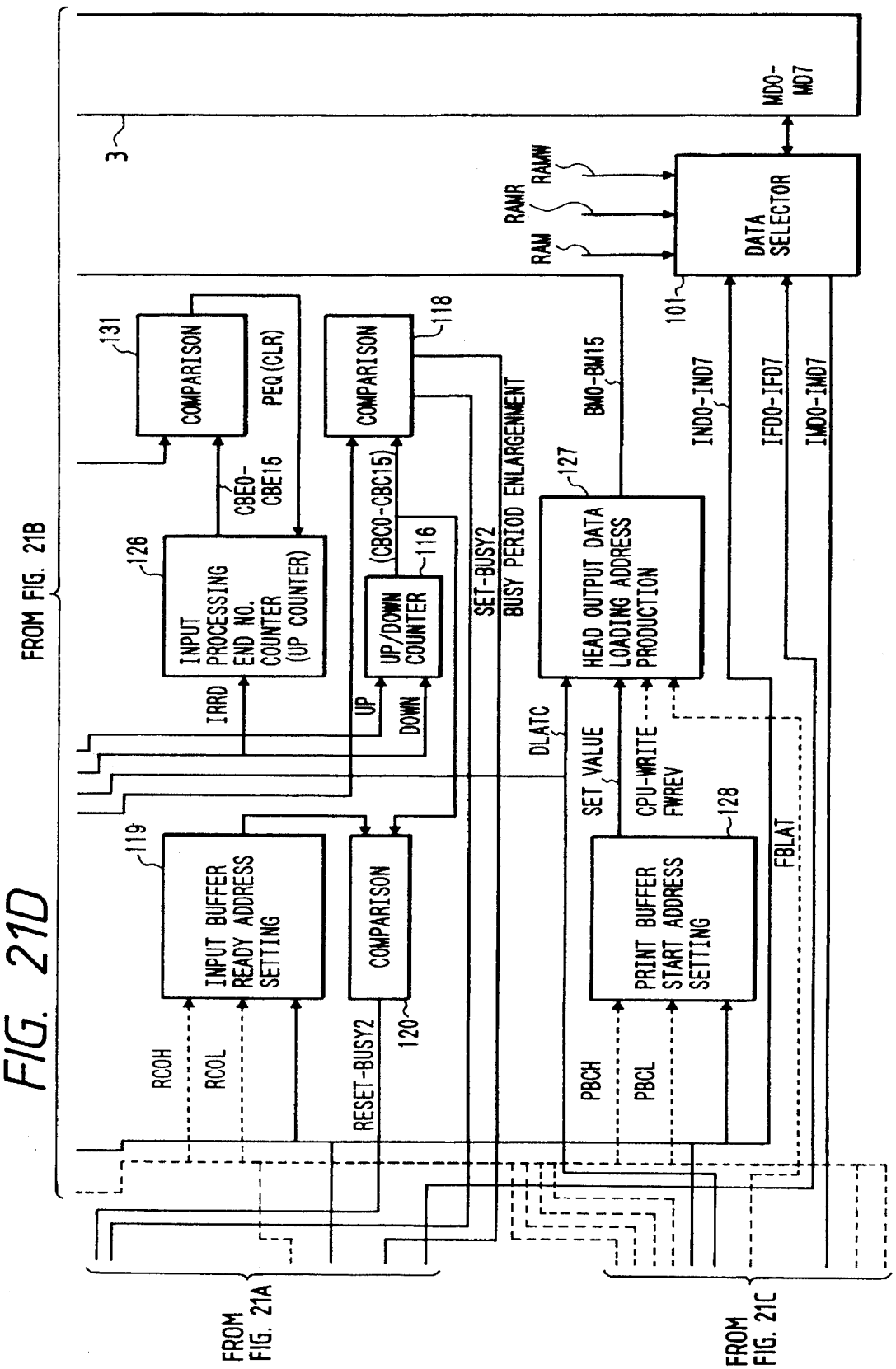

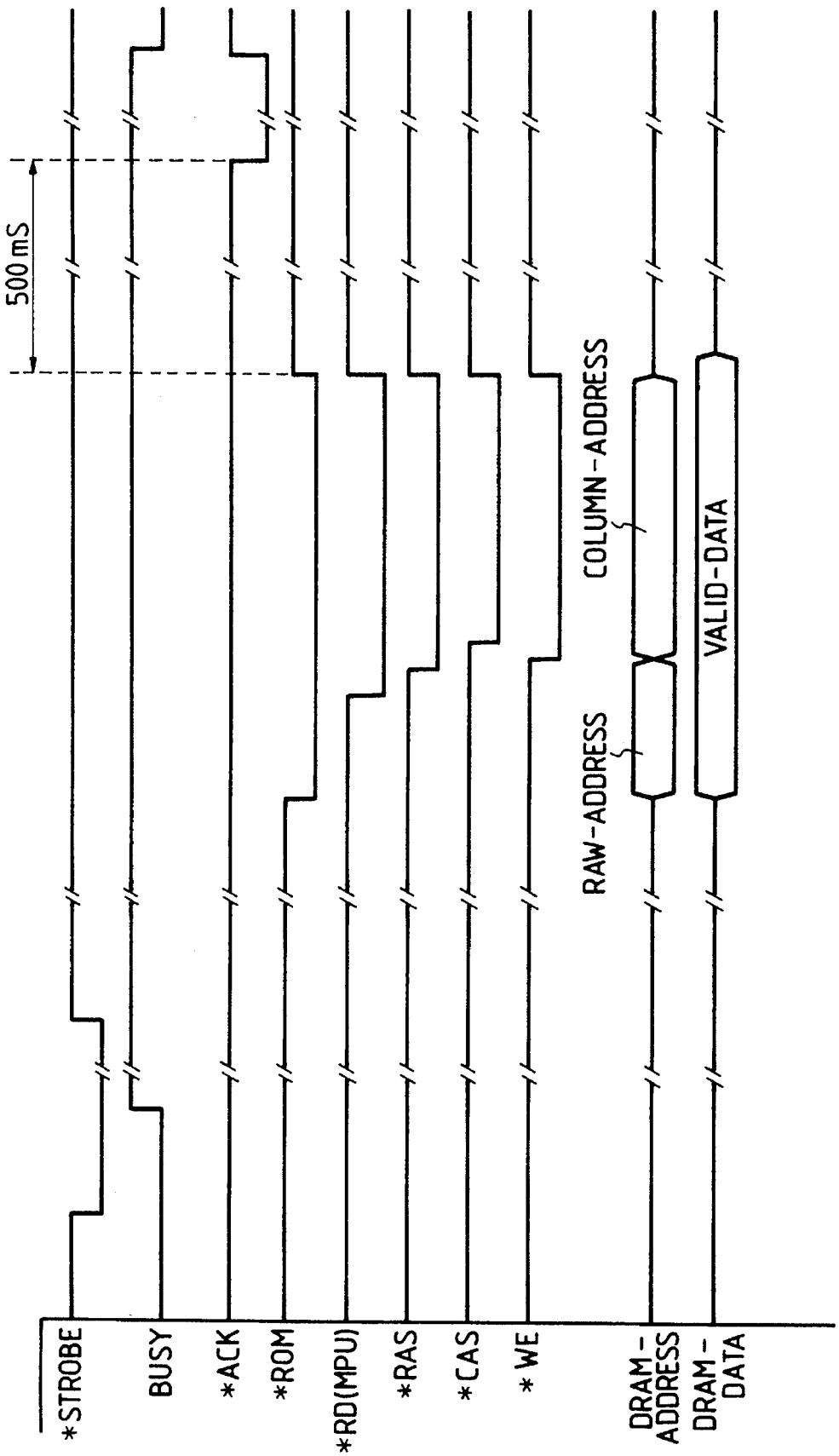

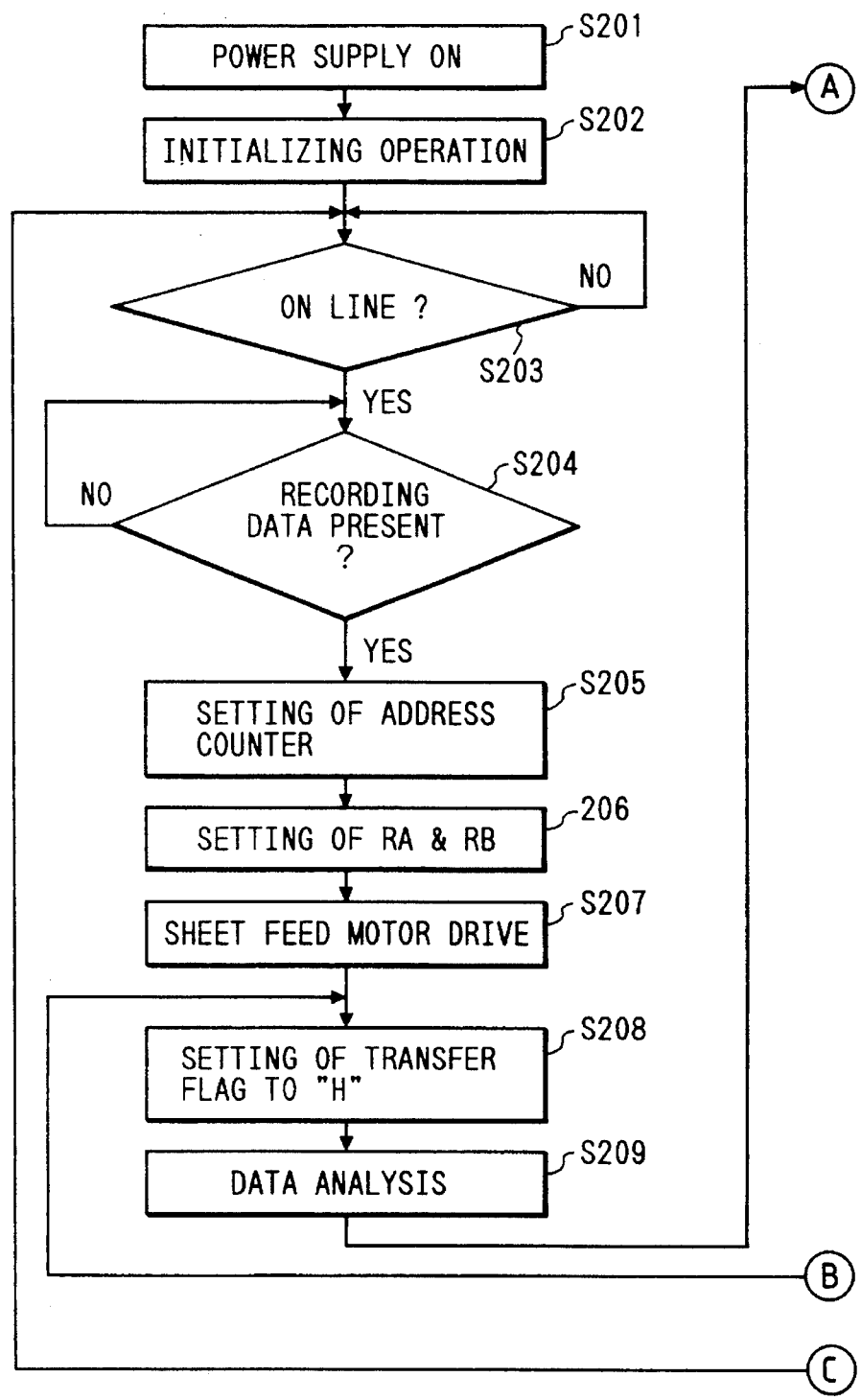

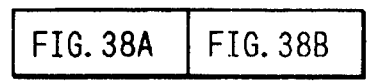
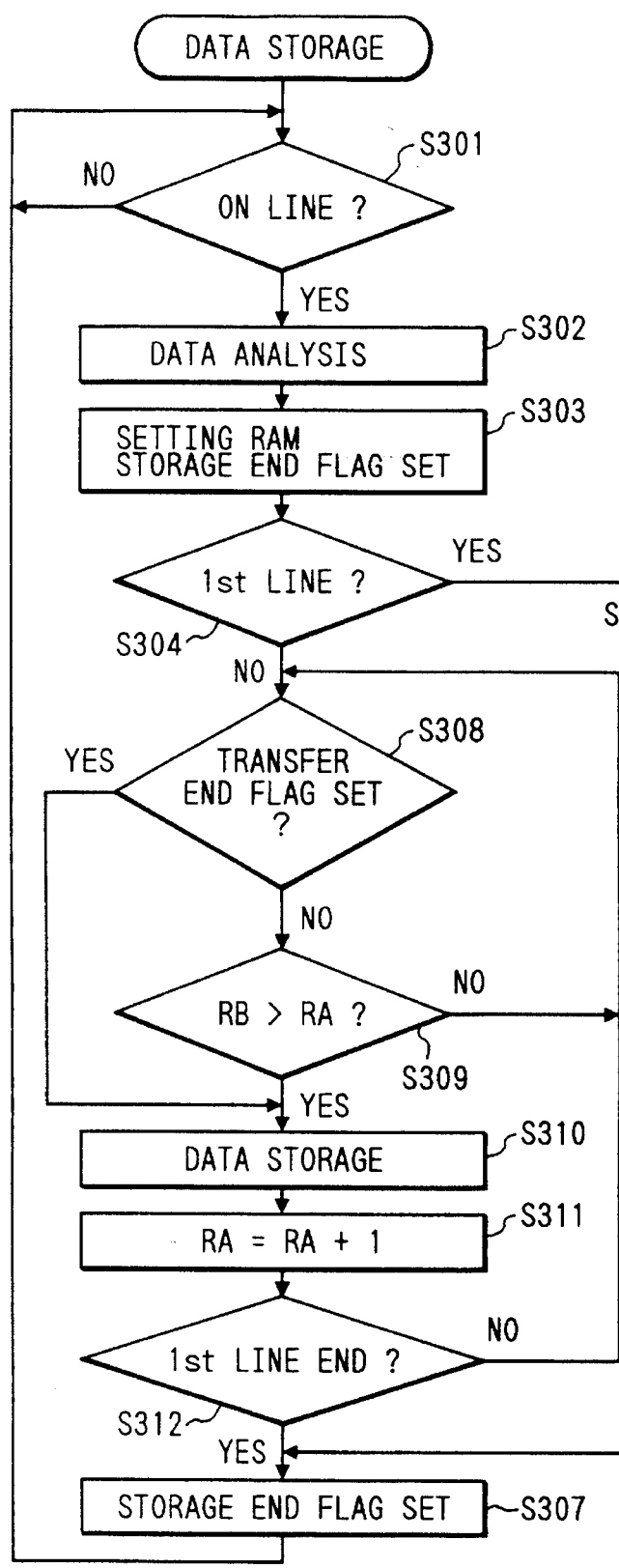
FIG. 38A

DATA PROCESSING APPARATUS UTILIZING CPU

This application is a continuation of U.S. patent application Ser. No. 07/697,587 filed May 9, 1991, now abandoned.

BACKGROUND OF THE INVENTION

1. Field of the Invention

The present invention relates to a recording apparatus, and more particularly to a recording apparatus capable of supplying a recording head with image data at a high speed.

2. Related Background Art

For the purpose of recording on a recording medium such as paper or OHP sheet (hereinafter simply called recording sheet or sheet), there have been proposed recording apparatus with various types of recording heads. Such recording heads are known, for example, as the wire dot type, thermosensitive type, thermal transfer type, ink jet type etc. Among these, the ink jet recording head is attracting attention because of low running cost and low noise, as it is designed to directly discharge ink onto the recording sheet.

Among the ink jet recording apparatuses there is proposed an apparatus designed to discharge ink from discharge openings toward the recording medium, utilizing bubbles generated by thermal energy, thereby recording characters or patterns on said medium.

Such recording apparatus, in which the heat-generating resistor provided in each discharge opening is significantly smaller than the piezoelectric element employed in the conventional ink jet recording apparatus, allows to arrange multiple discharge openings at a high density and has the advantage of providing recorded images of high quality, with a high speed and low noises.

FIG. 1 is a block diagram of the control system for controlling various units of a conventional recording apparatus, in which there are shown an MPU 1 for controlling the entire apparatus through signal exchange with various units thereof; a ROM 2 storing the sequences of control; a RAM 3 used for example as a buffer for the recording data; an interface 4 for information exchange with a host apparatus such as a computer; and an I/O port.

Control signals from the MPU 1 are supplied, through the I/O port 5, to driver circuits 9A, 31A, 35A to control a recording head 9, a carriage motor 31 and a transport motor 35. Also information from a sensor 6 or an operation panel 7 are supplied through the I/O port 5 to the MPU 1.

Now reference is made to a flow chart shown in FIG. 2, for explaining the actual recording operation. After the power supply is turned on in a step S1, there is conducted an initializing operation, such as the detection of home position of a carriage 11 (step S2). If an ON-LINE mode is selected on the operation panel 7 in a step S3, a step S4 enters the recording data, supplied from the host apparatus through the interface 4, into an input buffer area of the RAM 3. Then the MPU 1 converts said data, such as character codes, entered into said input buffer area, into dot matrix image data and stores thus converted data in an image buffer area of the RAM 3. After the image data of a line are prepared in this manner, a step S5 advances the recording sheet by the transport motor 35.

Then the image data to be recorded on the recording sheet are transferred from the image buffer area of the RAM 3 to the I/O port 5 (step S6). Then, a subsequent step S7 effects data analysis for the next line, namely entry of the recording data into the reception buffer area, data conversion into image data and storage of said image data into the image buffer area. Said image buffer area is selected different from that used in the step S6, in order to prevent the loss of the image data. Then, the carriage motor 31 is activated to move the carriage 11 (step S8), and, upon its arrival at the recording position (step S9), a step S10 sends a recording head drive start signal (not shown) to the driver circuit 9A through the I/O port 5. In response the driver circuit 9A drives the recording head 9 according to the image data supplied from the I/O port 5.

The steps S6 to S10 are repeated until the recording of a line is completed, and, upon its completion (step S11), the sequence returns to the step S4.

In such conventional structure, however, the time required by the MPU 1 for the storage of the recording data in the input buffer or the transfer of the image data to the recording head with the increase in the resolving power of the recording head, as the amount of image data to be recorded increases. Thus, within a given drive time of the recording head, the proportion of the image data transfer increases, and accordingly decreases the time allotted to other processes, namely the entry of recording data for the next line into the input buffer area, conversion of said recording data into image data and storage of said image data into the image buffer area.

This drawback becomes particularly conspicuous when the recording head is capable of high-speed recording, such as the aforementioned ink jet recording head utilizing thermal energy. After the completion of recording of a line, the recording operation for the next line is not started until the image data for said next line are prepared, so that there will result a decrease in the recording speed, giving rise to a loss in the throughput.

Also there is required a large memory capacity, because there are provided image buffer areas at least for two lines, in order to prevent the loss of image data as explained above. The increase in the memory capacity is particularly significant when the resolving power of the recording head is high, as in the aforementioned ink jet recording head utilizing thermal energy (hereinafter called bubble ink jet recording head), since the memory capacity required for the image buffer area is proportional to the square of the resolving power of the recording head.

Furthermore, the amount of image data transferred from the host apparatus increases for a recording apparatus capable of high-density recording, such as a bubble ink jet recording apparatus. In such case, unless said recording apparatus is capable of receiving the data at a high speed, the host apparatus is inevitably occupied by the recording apparatus for a long time, so that the throughput of the host apparatus is deteriorated.

SUMMARY OF THE INVENTION

An object of the present invention is to provide a recording apparatus capable of achieving high-speed data processing, thereby improving the throughput thereof.

Another object of the present invention is to provide a recording apparatus capable of achieving high-speed data processing, thereby improving the throughput, without increase in the memory capacity.

Still another object of the present invention is to provide a data processing apparatus capable of high-speed transfer of data from an input apparatus to a memory, and from the memory to an output apparatus.

The foregoing objects can be attained, according to the present invention, by an apparatus provided with means for separating an address bus and a data bus connected to a memory for storing for example recording data and image data, from an address bus and a data bus connected to an MPU, whereby the data in said memory can be controlled while said memory is not accessed by said MPU.

Also said objects can be attained, according to the present invention, by a data processing apparatus provided with bus control means for disconnecting the bus between a CPU and a memory while said CPU makes access to another unit and connecting the bus between said memory and input or output means, wherein the data access between said input or output means and said memory is enabled in synchronization with an access operation of said CPU to another unit than said memory.

The above-explained structure enables data transfer between the memory and the input or output means simultaneously with the function of the CPU, since the bus between the memory and the CPU can be disconnected while that between the memory and the input or output means can be connected.

BRIEF DESCRIPTION OF THE DRAWINGS

FIGS. 23, 24 and 25A to 25C are timing charts showing the timing of ACK signal, BUSY signal etc.;

DETAILED DESCRIPTION OF THE PREFERRED EMBODIMENTS

Figure 3:
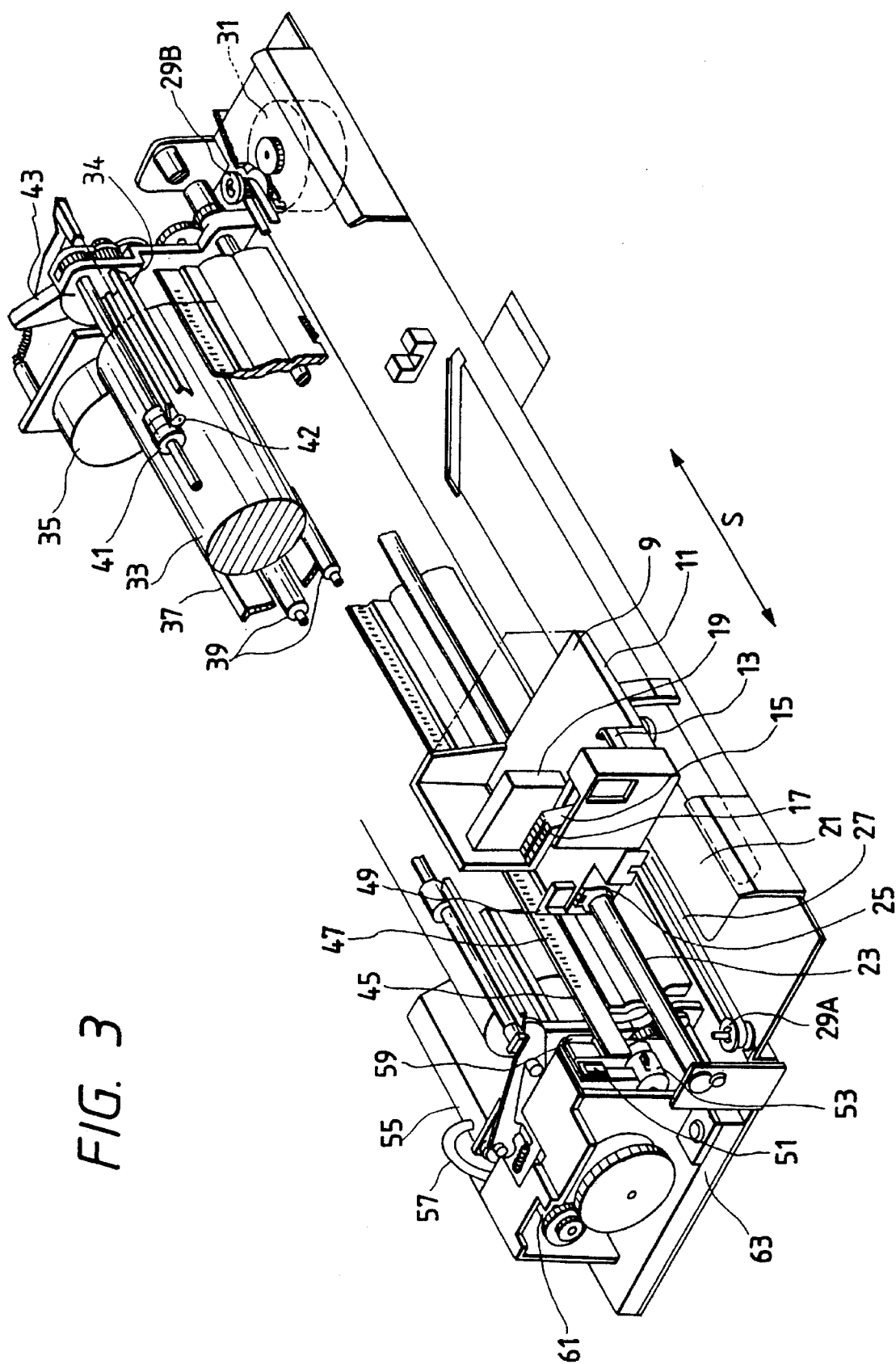
FIG. 3 is a perspective view of an ink jet recording apparatus in which the present invention is applicable.

In the following there will be explained, with reference to the attached drawings, an embodiment in which the present invention is applied to an ink jet recording apparatus utilizing thermal energy. FIG. 3 is an external perspective view of such ink jet recording apparatus.

In FIG. 3, there are shown a head cartridge 9 provided with an ink jet recording head, a carriage 11 for supporting said head cartridge and conveying the same in a scanning motion in a direction S; a hook 13 for mounting the head cartridge 9 on the carriage 11; a lever 15 for operating said hook 13; a support plate 19 for supporting electrical connectors for the head cartridge 9; and a flexible cable 21 for connecting said electrical connectors with the control unit of the main body.

A guide shaft 23 for guiding the carriage 11 in the direction S is inserted in a bearing 25 thereof. A timing belt 27 fixed to the carriage 11 for moving the same in said direction S is supported by pulleys 29A, 29B positioned on both ends of the apparatus. The pulley 29B receives the driving force of a carriage motor 31 through a transmission mechanism such as gears.

There are further provided a transport roller 33 for defining the recording surface of the recording medium such as paper and serving to transport said recording medium at the recording operation, and being driven by a transport motor 35; a paper pan 37 for guiding the recording medium from a sheet feeding tray 4 to the recording position; feed rollers 39 positioned in the transport path of the recording sheet for pressing said sheet against the transport roller 33 thereby transporting said sheet; a platen 34 positioned opposite to the discharge openings of the head cartridge 9 for defining the recording surface of the recording sheet; discharge rollers 41 positioned at the downstream side of the recording position, in the transporting direction of the recording sheet, for advancing the recording sheet toward an unrepresented discharge aperture; spurs 42 positioned corresponding to said discharge rollers 41 to press the recording sheet toward the rollers 41, thereby enabling sheet transport; and a release lever 43 for releasing the biasing action of the feed rollers 39, a pressure plate 45 and the spurs 42 for example at the setting of the recording sheet.

The pressure plate 45 is provided for preventing the flapping of the recording sheet in the vicinity of the recording position and maintaining close contact of the recording sheet with the transport roller 33. The present embodiment employs an ink jet recording head which performs recording operation by ink discharge. Consequently the distance between the plane of ink discharge openings of the recording head and the surface of the recording sheet is considerably small, and has to be precisely controlled in order to avoid the mutual contact between said discharge openings and the recording sheet. For this reason the presence of said pressure plate is effective. A scale 47 marked on the pressure plate 45 and a marker 49 mounted on the carriage 11 corresponding to said scale 47 allow the operator to recognize the printing position or the set position of the recording head.

A cap 51, composed of an elastic material such as rubber, is so located as to oppose to the face of ink discharge openings of the recording head at the home position thereof, and is so supported that it can be contacted with and separated from the recording head. Said cap 51 is used for protecting the recording head when it is not in the recording operation, and for discharge recovery operation of the recording head. The discharge recovery operation is an operation for eliminating the cause of unsatisfactory ink discharge such as bubbles, dusts or viscosified ink by positioning said cap 51 opposite to the face of discharge openings and activating the energy generating elements for ink discharge thereby discharging the ink from all the discharge openings (said operation being called preliminary discharge), or an operation for eliminating such case of unsatisfactory ink discharge, by covering said face of discharge openings with the cap 51 and forcedly sucking the ink from the discharge openings (said operation being called suction recovery).

A pump 53 is used for providing a suction force for such forced ink discharge and for sucking the ink received in the cap 51 in such suction recovery operation and preliminary ink discharge operation. There are also provided a used ink tank 55 for receiving the used ink sucked by said pump 53, and a tube 57 connecting the pump 53 with said used ink tank 55.

A blade 59, for wiping the face of ink discharge openings of the recording head, is movably supported between an advanced position in which said blade protrudes toward the recording head for wiping the head in the course of movement thereof, and a retracted position in which said blade does not engage with said face of ink discharge openings. There are also provided a motor 61, and a cam mechanism 63 for moving the cap 51 and the blade 59 by the driving force of said motor 61.

Figure 4:
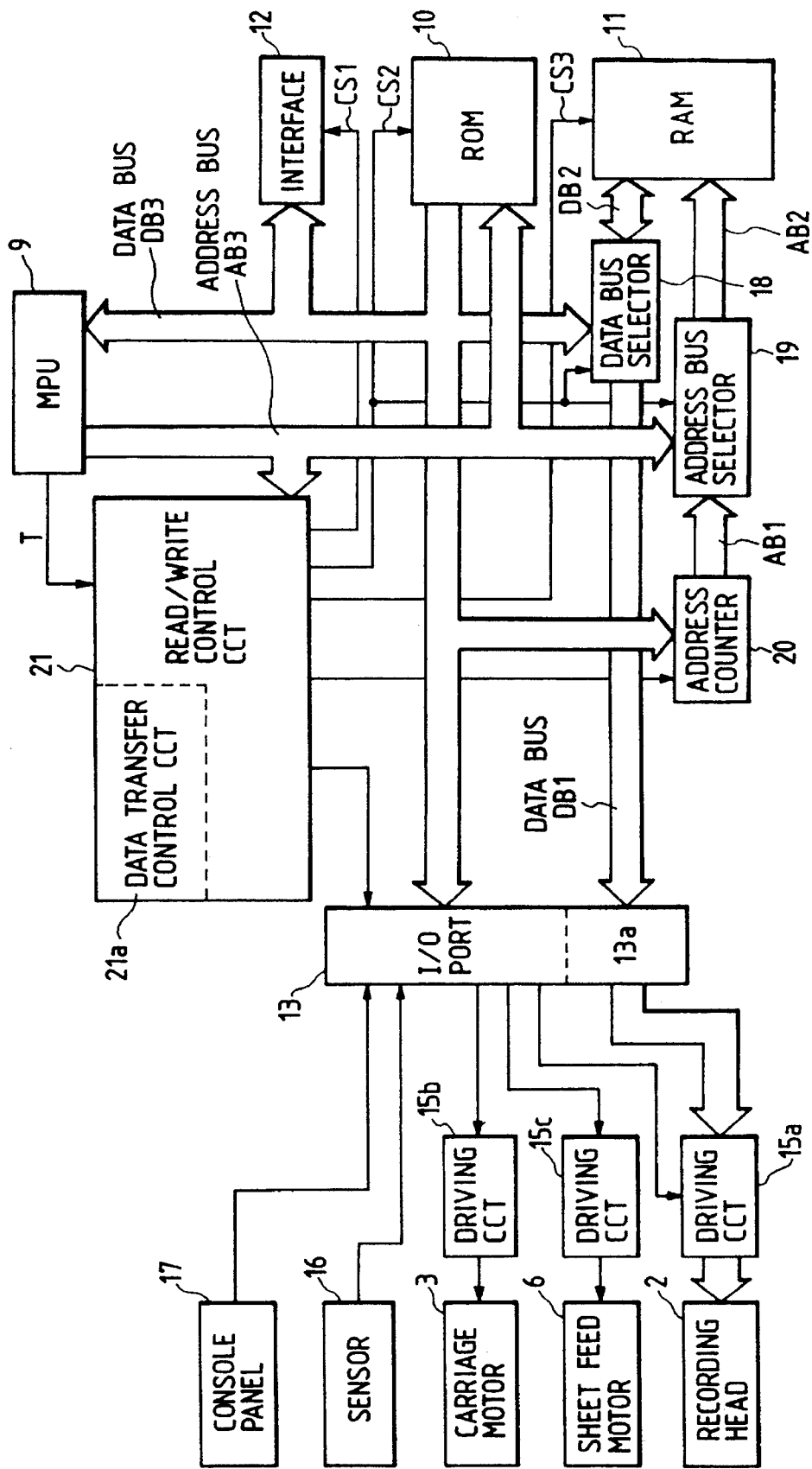
FIG. 4 is a block diagram of a recording apparatus constituting a first embodiment of the present invention.

FIG. 4 is a block diagram of a first embodiment of the present invention, wherein a data bus DB2 leading to a RAM 11 is connected, by a data bus selector 18, either to a data bus DB3 leading to an MPU 9 or a data bus DB1 leading to an I/O port 13a. Also an address bus AB2 leading to the RAM 11 is connected by an address bus selector 19, either to an address bus AB3 for the MPU 9 or a bus AB1 from an address counter 20 for generating addresses of an area storing the image data to be transferred to the I/O port 13a. When the MPU 9 makes an access to the RAM 11, a chip select signal CS3 is released whereby the data bus selector 18 and the address bus selector 19 connect the buses DB3, AB3 of the MPU 9 respectively with the buses DB2, AB2. On the other hand, in case of an access of the MPU 9 to the ROM 10, a chip select signal CS2 is released whereby the data bus selector 18 connects the data bus DB2 of the RAM 11 with the data bus DB1 to the I/O port 13a, and the address bus selector 19 connects the address bus AB2 of the RAM 11 with the address bus AB1 from the address counter 20.

The bus selecting operation of said data bus selector 18 and address bus selector 19 is controlled by the chip select signal CS2, released by a read-write control circuit 21 based on addresses supplied from the MPU 9 to the address bus AB3, Said read-write control circuit 21 is provided with a data transfer control circuit 21a for controlling the image data transfer from the RAM 11 to the recording head 2. The data reception from an interface 12 is conducted by the release of a chip select signal CS1.

Figure 5:
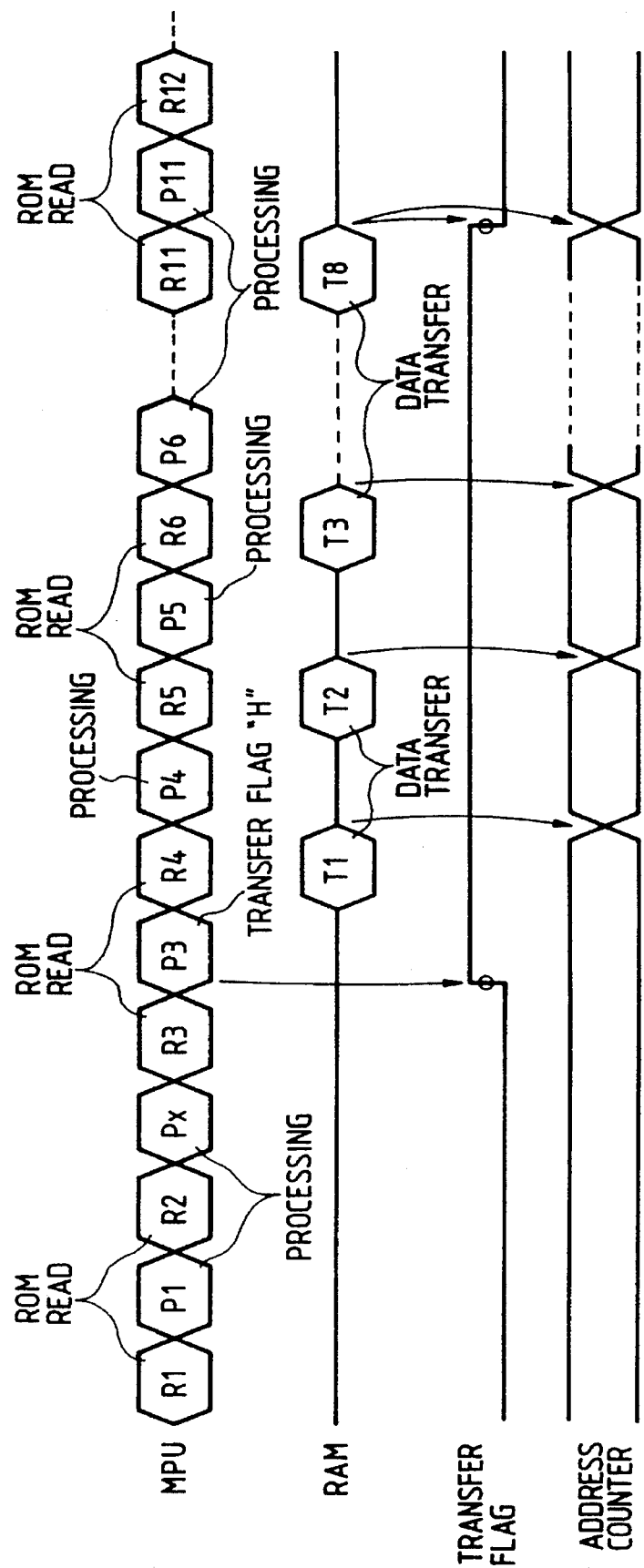
FIG. 5 is a timing chart of operations relating to data transfer in the recording apparatus of the first embodiment.

FIG. 5 is a timing chart showing the functions of the MPU 9 and the RAM 11 during a recording operation. In normal state, the MPU 9 executes control operations such as entry of recording data into the reception buffer area, data conversion into image data, storage of image data in the image buffer area and activation of the carriage motor 3, activation of the sheet feed motor 6 etc. in succession, by reading data from the ROM 10.

In a process step P3, the MPU 9 releases a signal T to shift a transfer flag (not shown) in the data transfer control circuit 21a to a state "H", whereby said control circuit 21a transfers the image data from the image buffer area of the RAM 11 to the I/O port 13a in synchronization with the ROM reading cycles, during said "H" state (T1–T8). Said data transfer can be conducted for example based on the logic product of the chip select signal CS2 for the ROM 10 and said transfer flag.

For example if the recording head 2 has 64 dots, image data of 8 bytes have to be transferred for each driving of the recording head. Consequently the present embodiment employs a RAM of 8-bit structure, and the transfer flag is shifted to an "L" state after the transfer of image data of 8th byte in a cycle T8. Said transfer flag is for example retained in a flip-flop, which is cleared at an 8th counting operation of a counter effecting a counting operation at each transfer of one byte.

In the subsequent ROM reading operations, the image data are not transferred from the RAM 11. The count of the address counter 20 is increased stepwise at the completion of data transfer from the RAM 11 in the cycles T1 to T8.

Figure 6:
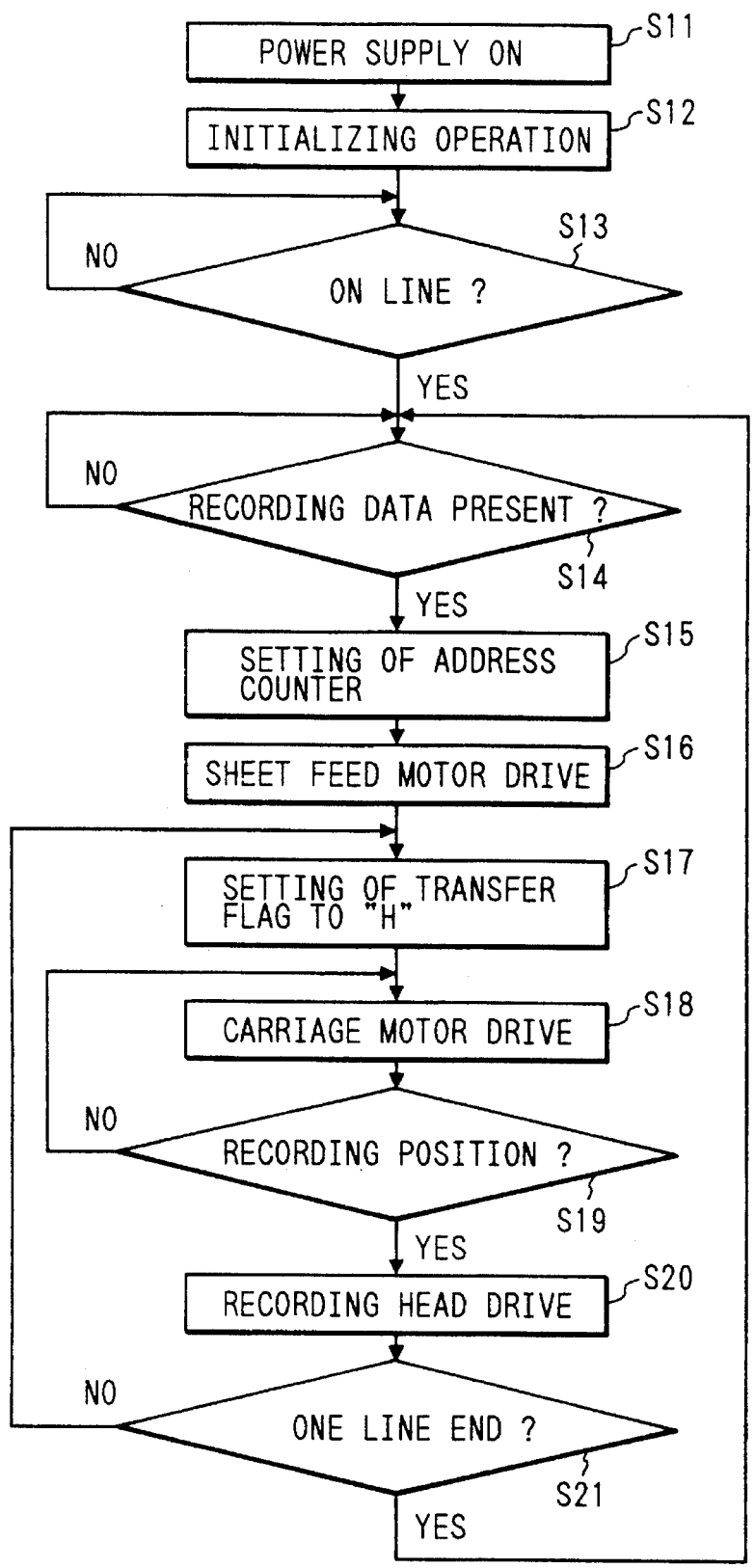
FIG. 6 is a flow chart of the control sequence of an MPU in said recording apparatus of the first embodiment.

Now the actual operations will be explained with reference to a flow chart shown in FIG. 6, in which steps S11–S14 are same as the steps S1–S4 in the conventional example.

When the step S14 identifies that the image data of a line are ready, a step S15 sets the start address of the image buffer area of the RAM 11, storing the image data, in the address counter 20. Then a step S16 activates the feed motor 6 to advance the recording sheet, and a step S17 sets the transfer flag of the read/write control circuit 21 at the "H" state, whereby the image data are transferred to the I/O port 13a at each access of the MPU 9 to the ROM 10. Steps S18–S21 effect the recording of a line by activating the carriage motor and the recording head, in the same manner as in the steps S7–S10 in the conventional example.

As will be apparent from the foregoing explanation, the image data transfer in the present embodiment can be realized by a single setting of the transfer flag by the MPU 9, whereas, in the conventional example, the RAM address setting and the data transfer have to be repeated 8 times for each drive of the recording head.

Thus the data transfer process by the MPU 9 is significantly simplified. In the present embodiment the image data transfer is conducted with the cycles of ROM 10 reading, but it is also possible to effect the image data transfer when the MPU 9 does not make access to the RAM 11, namely when it makes access to the interface 12 or the I/O port 13. For example if the MPU 9 makes access to the interface 12 in a process P5, the image data transfer is conducted with the cycle thereof, so that the cycle T8 is completed prior to R11 and the time required for the cycles T1–T8 can, be shortened. The foregoing explanation applies to a forward scanning motion of the recording head 2. If the recording is conducted during a reverse scanning motion, the address counter 20 effects a down counting after the end of cycles T1–T8 in FIG. 5.

In the following there will be explained a second embodiment of the present invention.

In the first embodiment, since the processes P4–P11 in FIG. 5 are arbitrary, the time required for the data transfer to the cycle T8 is, at maximum, seven times of the time required for execution of the longest command of the MPU 9. (It is to be noted that the process P11 is irrelevant from the data transfer time.) Although the probability of seven longest commands in succession is quite scarce, the time required for the data transfer may be considerably extended. Also in case of a higher recording speed, the time permissible for data transfer, will be reduced as the interval of drivings of the recording head is shortened. In consideration of this fact, the present embodiment is so designed to securely complete the data transfer even for a short driving interval of the recording head.

More specifically, the second embodiment of the present invention is featured by a fact that certain short processes are executed in succession after the setting of the transfer flag.

Figure 7:
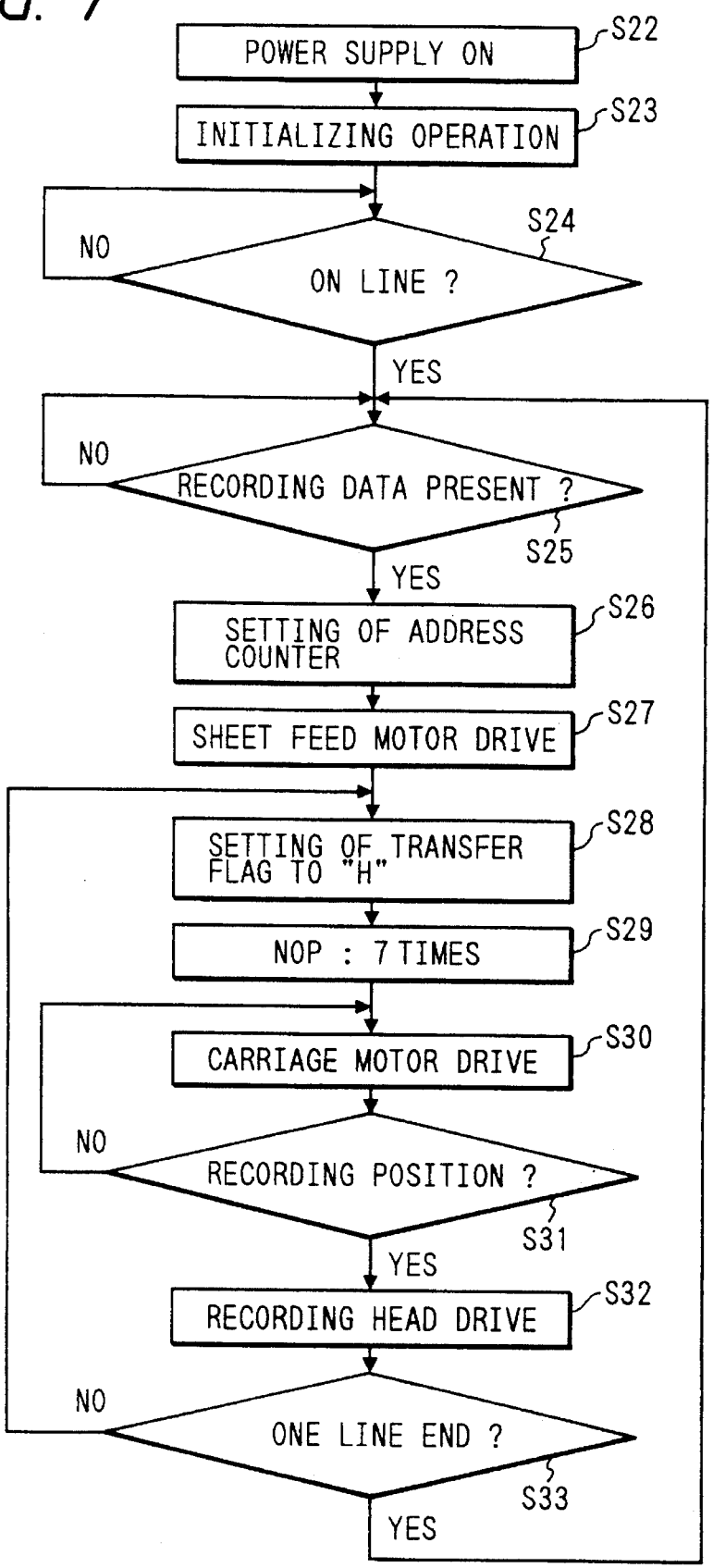
FIG. 7 is a flow chart of the control sequence of an MPU in a recording apparatus constituting a second embodiment of the present invention.

FIG. 7 is a flow chart of said second embodiment. After the transfer flag is set at the "H" state in a step S28, a NOP (non operation) command, which is one of the shortest commands, is repeated seven times in a step S29, with the timing shown in FIG. 8.

The NOP command itself has no meaning except an increment of the program counter of the MPU 9, but, in the present embodiment, the image data transfer is conducted at the read-out of the NOP command from the ROM 10.

As explained above, the present embodiment allows to significantly reduce the processes of the MPU 9 required for the image data transfer and also to significantly shorten the time required for the transfer of image data of 8 bytes. In the foregoing description, the NOP command is executed as a command with a short time of execution, but other similar commands may naturally be used for the same purpose.

In the following there will be explained a third embodiment of the present invention.

In case the RAM 11 is composed of a DRAM, it is necessary to refresh the content of the RAM 11. Therefore the present embodiment is designed to have a refreshing cycle for the RAM 11.

Figure 9:
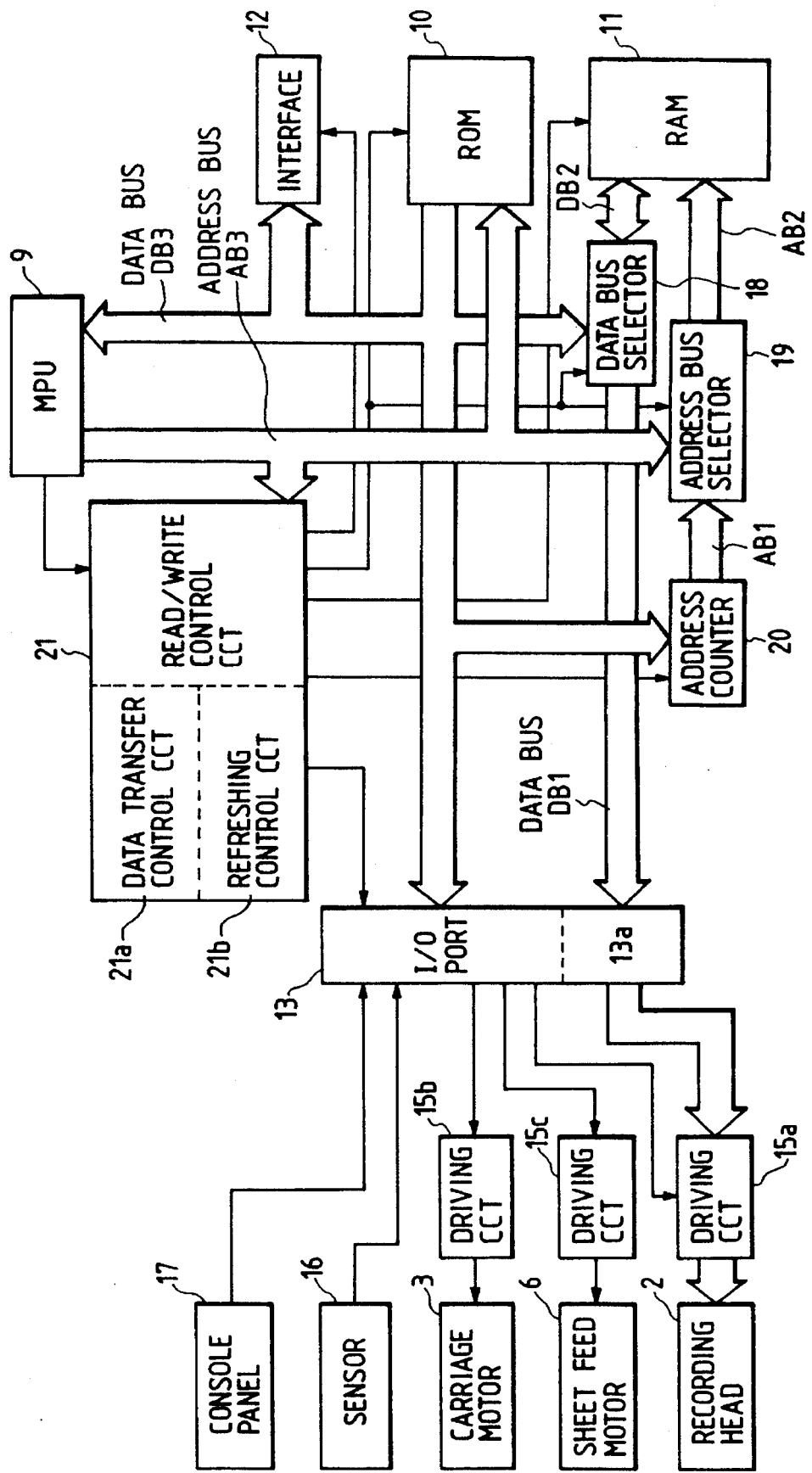
FIG. 9 is a block diagram of a recording apparatus constituting a third embodiment of the present invention.
Figure 10:
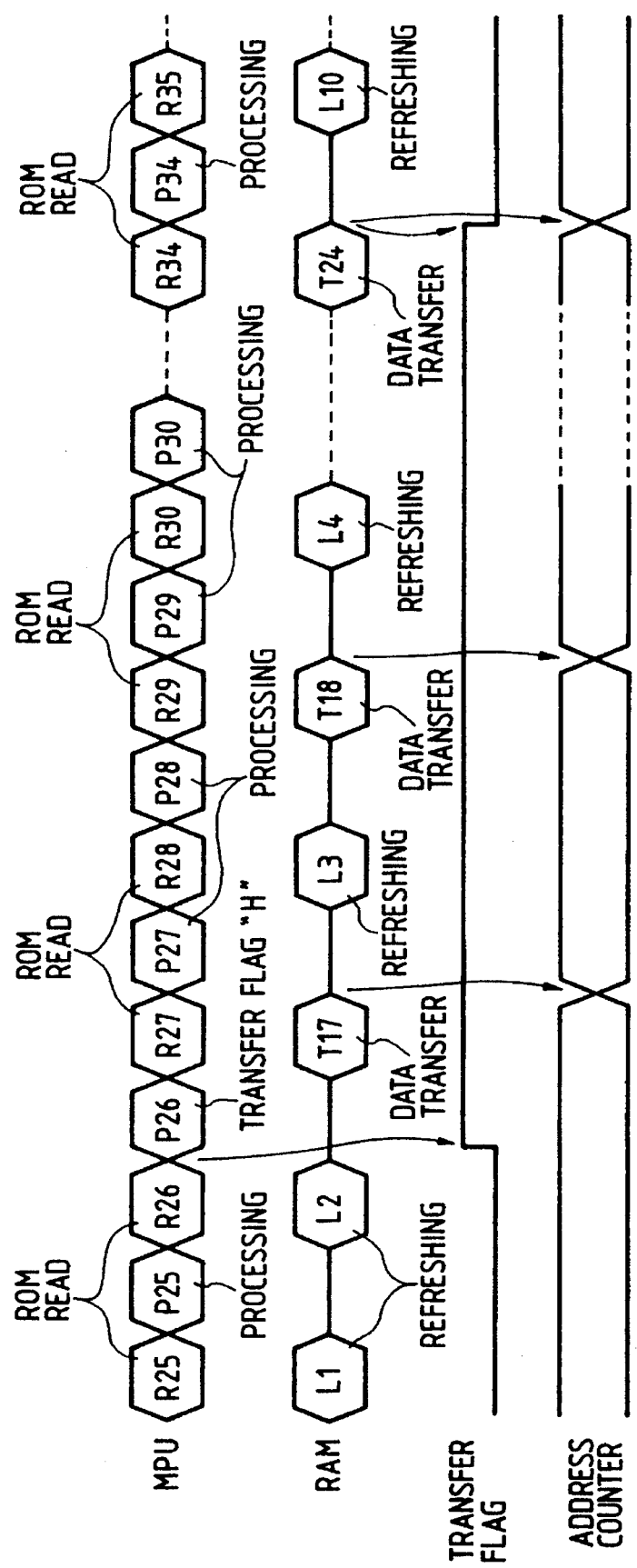
FIG. 10 is a timing chart of operations relating to data transfer and refreshing in said recording apparatus of the third embodiment.

FIG. 9 is a block diagram of the present embodiment. A read/write control circuit incorporating a data transfer control circuit 21a and a refreshing control circuit 21b controls the refreshing of the RAM 11 and the image data transfer as shown in a timing chart in FIG. 10.

When the transfer flag is at the "L" state, at each access cycle of the MPU 9 to the ROM 10, the RAM 11 is simultaneously refreshed. When the transfer flag is set at the "H" state in a cycle P26, the image data transfer and the refreshing of the RAM 11 are alternately conducted. When the image data transfer of 8th byte is completed in a cycle T24, the transfer flag is reset to the "L" state, and the refreshing is thereafter conducted at each access cycle of the MPU 9 to the ROM 10.

It is also possible to effect the refreshing of the RAM 11 and the image data transfer not only in the ROM reading cycles of the MPU 9 but also in other cycles, namely in access cycles to the interface 12 and to the I/O port. Thus, for example if the MPU 9 makes access to the interface 12 in the cycles P27–P33, the refreshing or the image data transfer is conducted in said cycles so that the cycle T24 is completed before R34 and the time required for the cycles T17 to T24 can be shortened. Still a satisfactory refreshing operation can be assured since the period requiring refreshing is sufficiently longer than the execution time of the longest command by the MPU 9.

In the following there will be explained a fourth embodiment of the present invention.

Figure 11:
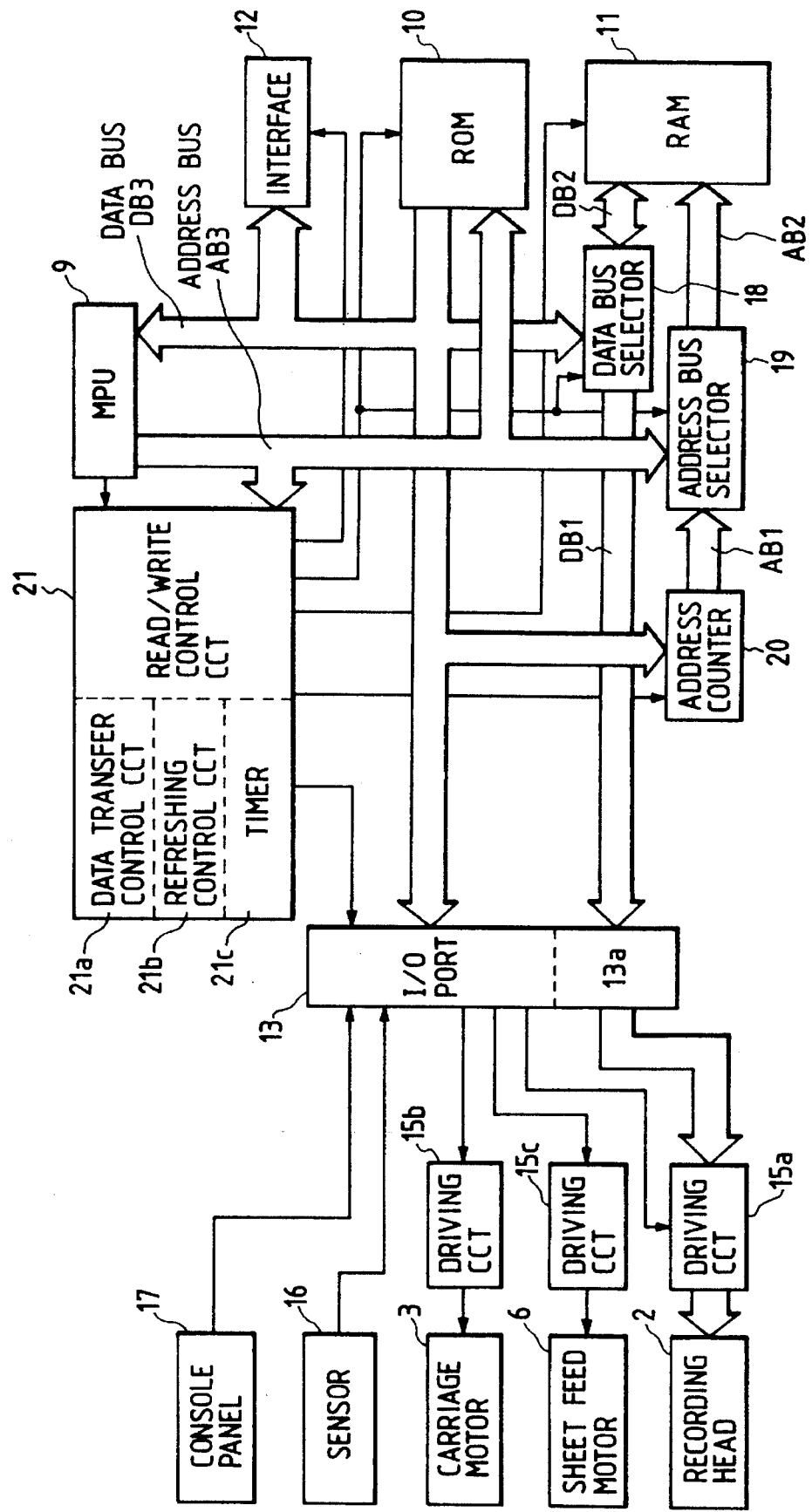
FIG. 11 is a block diagram of a recording apparatus constituting a fourth embodiment of the present invention.
Figure 12:
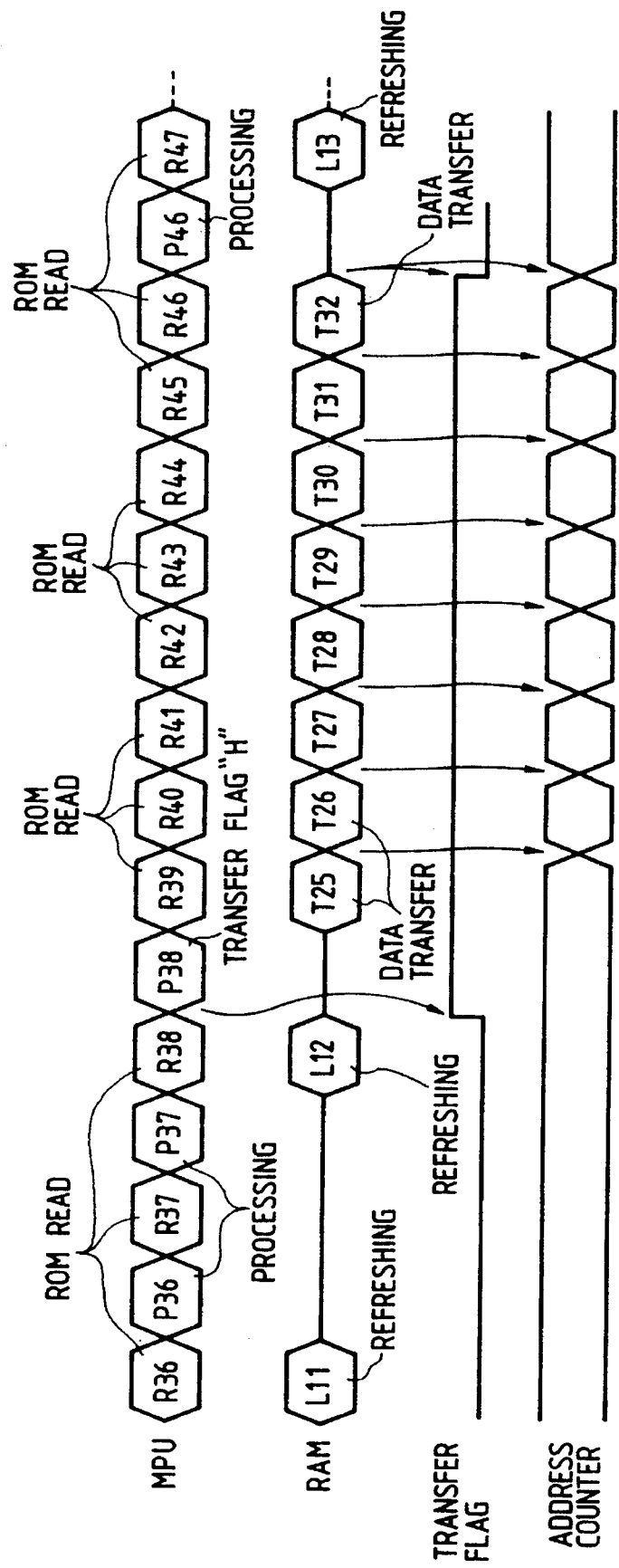
FIG. 12 is a timing chart of operations relating to data transfer and refreshing in said recording apparatus of the fourth embodiment.

In the third embodiment, the RAM 11 is refreshed in the access cycle of the MPU 9 to the ROM 10 or to others. In the present embodiment, in contrast, the refreshing is not conducted if the execution time of the MPU 9 is short, The present embodiment shown in FIG. 11 is different from the structure shown in FIG. 4 in that the RAM 11 is composed of a DRAM and has a refreshing system. In FIG. 11, a refreshing circuit 21b is so controlled by a timer 21c that the refreshing operation is conducted only after the lapse of a predetermined period after the preceding refreshing operation. More specifically, in a timing chart shown in FIG. 12, if a cycle P36 is short, the refreshing is not conducted in a succeeding cycle R37. Similarly the refreshing is not conducted in a period T25 to T32 since cycles R39 to P46 are short NOP commands. Next refreshing operation is conducted at L13 corresponding to the cycle R47.

Thus the data transfer time can be shortened as the RAM 11 is not refreshed during the image data transfer. Also a similar effect can be obtained by inhibiting the refreshing operation during the "H" state of the transfer flag, In the following there will be explained a fifth embodiment of the present invention.

For obtaining Italic characters, it is generally necessary, after the recording of image data of a line, to erase the previous data in the image buffer area of the RAM 11 prior to the development of image data of a next line and the storage of said image data in said image buffer area. The processes required for such erasure are quite burdensome to the MPU 9, and the throughput is therefore inevitably lowered in such Italic character generation.

Consequently, the present embodiment prevents the loss in throughput by effecting the image data transfer and the image data erasure in the access cycles of the MPU 9 to the ROM 10 and in those to other units than the RAM 11.

Figure 13:
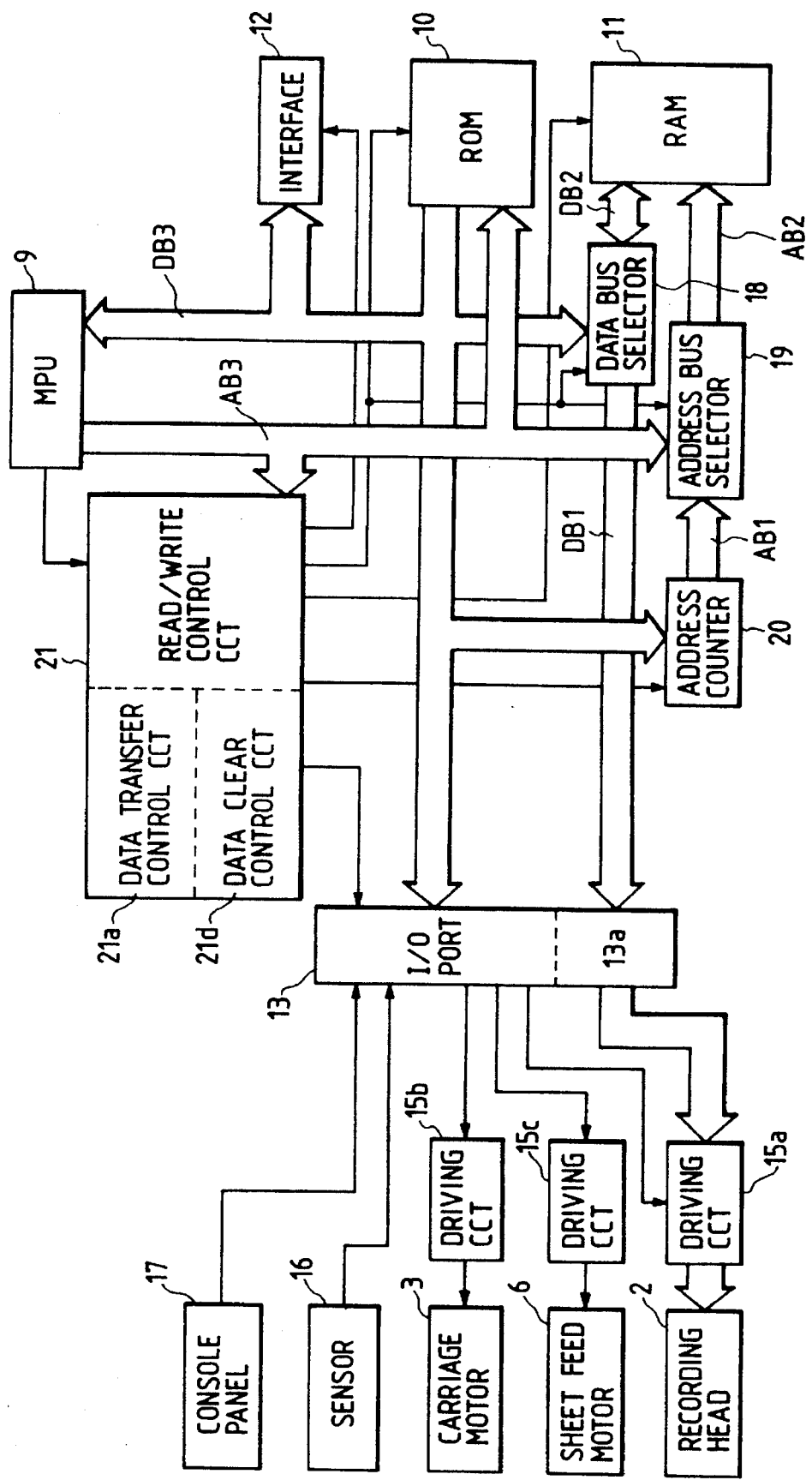
FIG. 13 is a block diagram of a recording apparatus constituting a fifth embodiment of the present invention.
Figure 14:
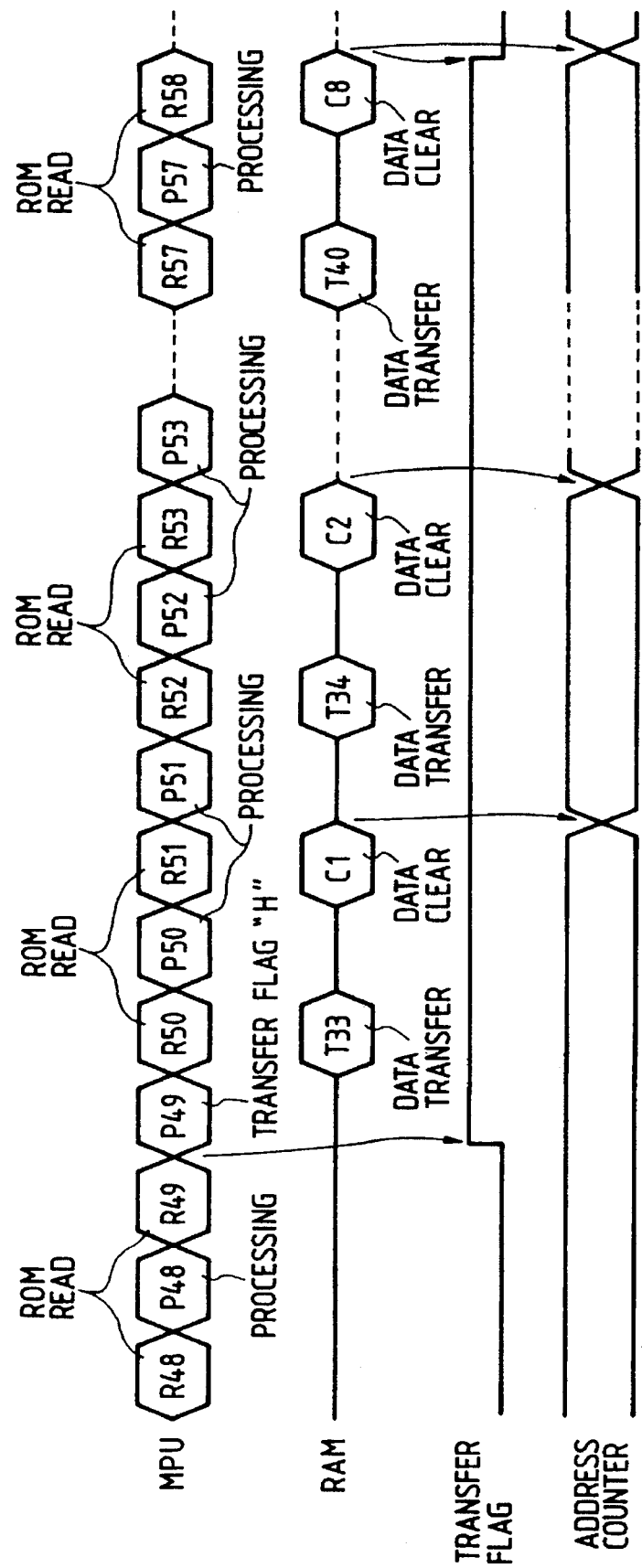
FIG. 14 is a timing chart of operations relating to data transfer and data erasure in said apparatus of the fifth embodiment.

FIG. 13 is a block diagram of the present embodiment, in which a read/write control circuit incorporating a data transfer control circuit 21a and a data clear control circuit 21d controls the image data transfer and the image data clearing of the RAM 11, as shown in a timing chart in FIG. 14.

When the MPU 9 sets the transfer flag in the data transfer control circuit 21a in the "H" state in a cycle P49, the data transfer control circuit 21a transfers the image data of a RAM area, indicated by the address counter 20, to the I/O port 13a in a next ROM reading cycle R50. Then, in a next ROM reading cycle R51, the data clear control circuit 21d writes "00"H into the RAM area in which said transferred data were originally stored. The data clearing is conducted in this manner in a cycle C1.

Figure 15:
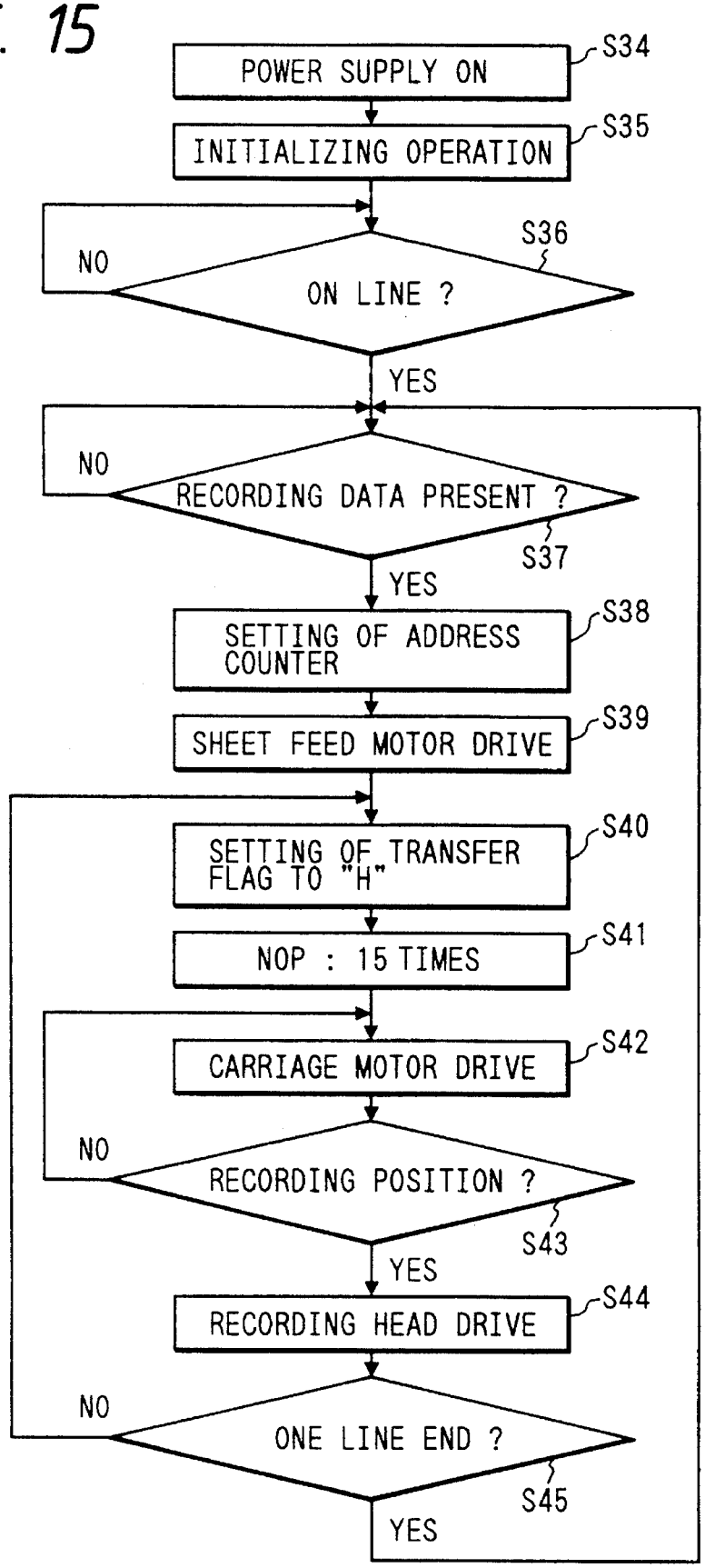
FIG. 15 is a flow chart of control sequence of an MPU in said recording apparatus of the fifth embodiment.

After said cycle C1, the count of the address counter is increased by "1". In the present embodiment, this operation is repeated to transfer and clear the data of 8 bytes. After the clearing of 8th byte in the cycle C8, the transfer flag is shifted to the "L" state, so that no operation is conducted in the next ROM reading cycle. Thus the MPU 9 can execute the transfer and clearing of the image data only by a cycle P49, so that the load of the MPU 9 is significantly reduced. It is also possible, as in the second embodiment, to reduce the time required for transfer and clearing of the image data by consecutive executions of short commands by the MPU 9 after the setting of the transfer flag. For example, it is necessary, as shown in a step S41 in a flow chart in FIG. 15, to repeat a short command such as a NOP command 15 times.

In the following there will be explained a sixth embodiment of the present invention.

The present embodiment is so constructed as to effect image data transfer, data clearing and refreshing in case the RAM 11 in the fifth embodiment is composed of a DRAM. The structure of the present embodiment is shown as a block diagram in FIG. 16.

Figure 16:
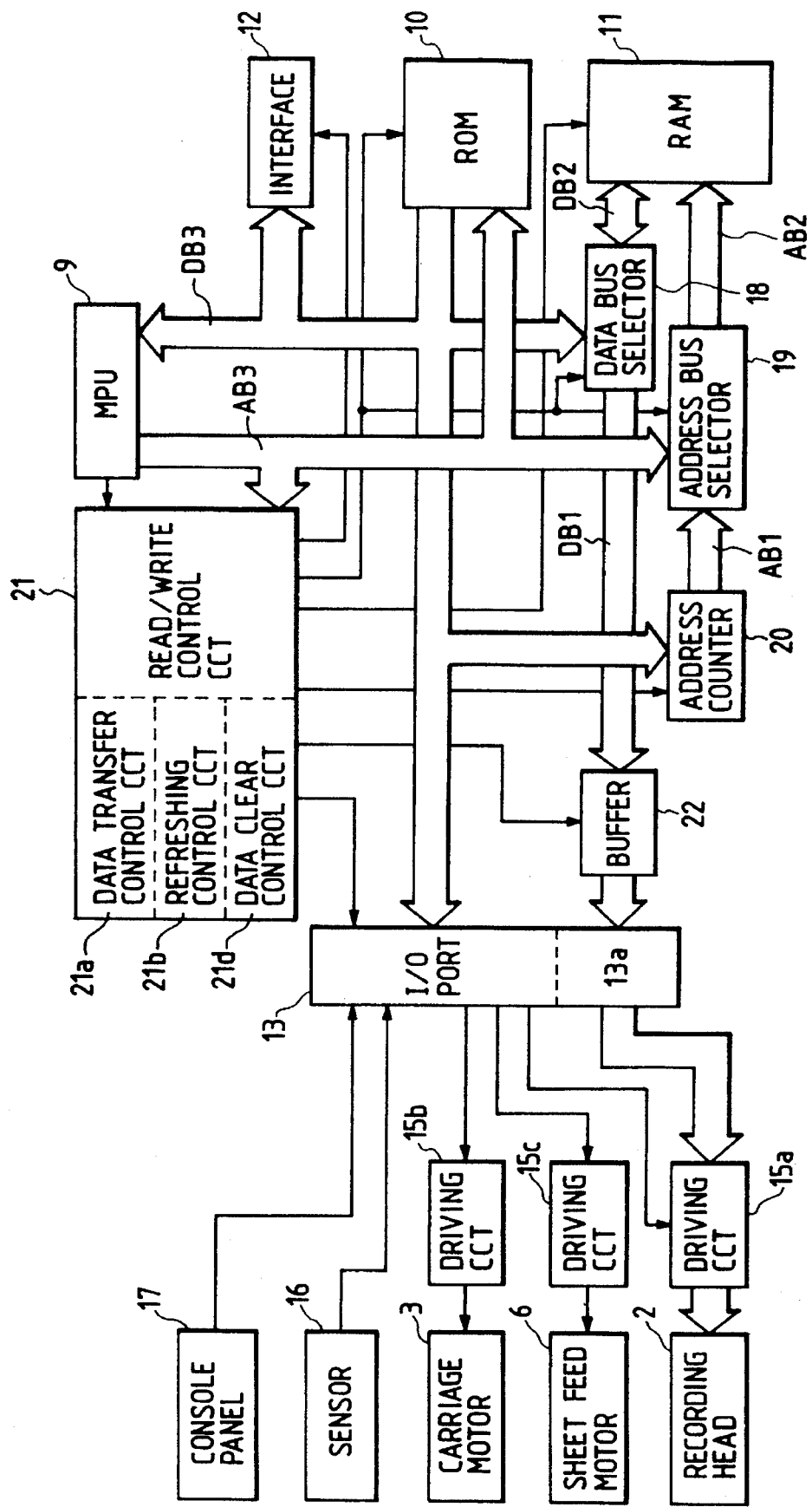
FIG. 16 is a block diagram of a recording apparatus constituting a sixth embodiment of the present invention.
Figure 17:
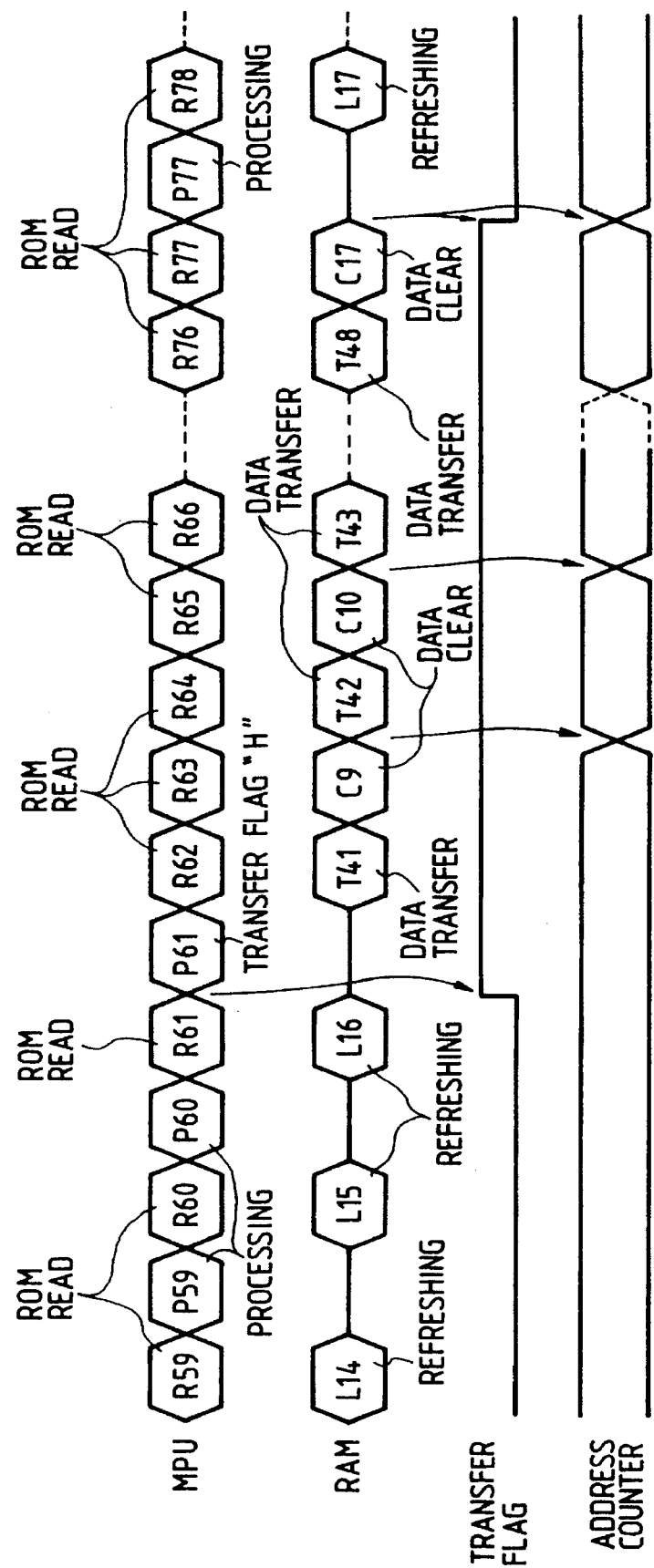
FIG. 17 is a timing chart of operations relating to data transfer, data erasure and refreshing in said recording apparatus of the sixth embodiment.

In FIG. 16, a read/write control circuit incorporating a data transfer control circuit 21a, a refreshing circuit 21b and a data clearing control circuit 21d executes the image data transfer, data clearing and memory refreshing as shown in a timing chart in FIG. 17. In normal state, the refreshing is conducted simultaneously with the ROM reading cycle of the MPU 9. However, when the transfer flag is shifted to the "H" state in a cycle P61, the refreshing is not conducted and the image data transfer and the data clearing are alternately conducted in synchronization with the ROM reading cycles until the transfer flag is shifted to the "L" state when the image data of 8th byte are cleared in a cycle C17. The refreshing operation is not required during a period from R62 to R67 since it is sufficiently short. The count of the address counter is increased by "1" after every completion of the cycles C9–C17.

As explained in the foregoing, the present invention allows to reduce the load of the MPU and to improve the throughput, by effecting image data transfer or other control operations while the MPU does not make access to the RAM.

In the following there will be explained an embodiment in which the data processing apparatus of the present invention is applied to an ink jet recording apparatus, with reference to the attached drawings.

Figure 1:
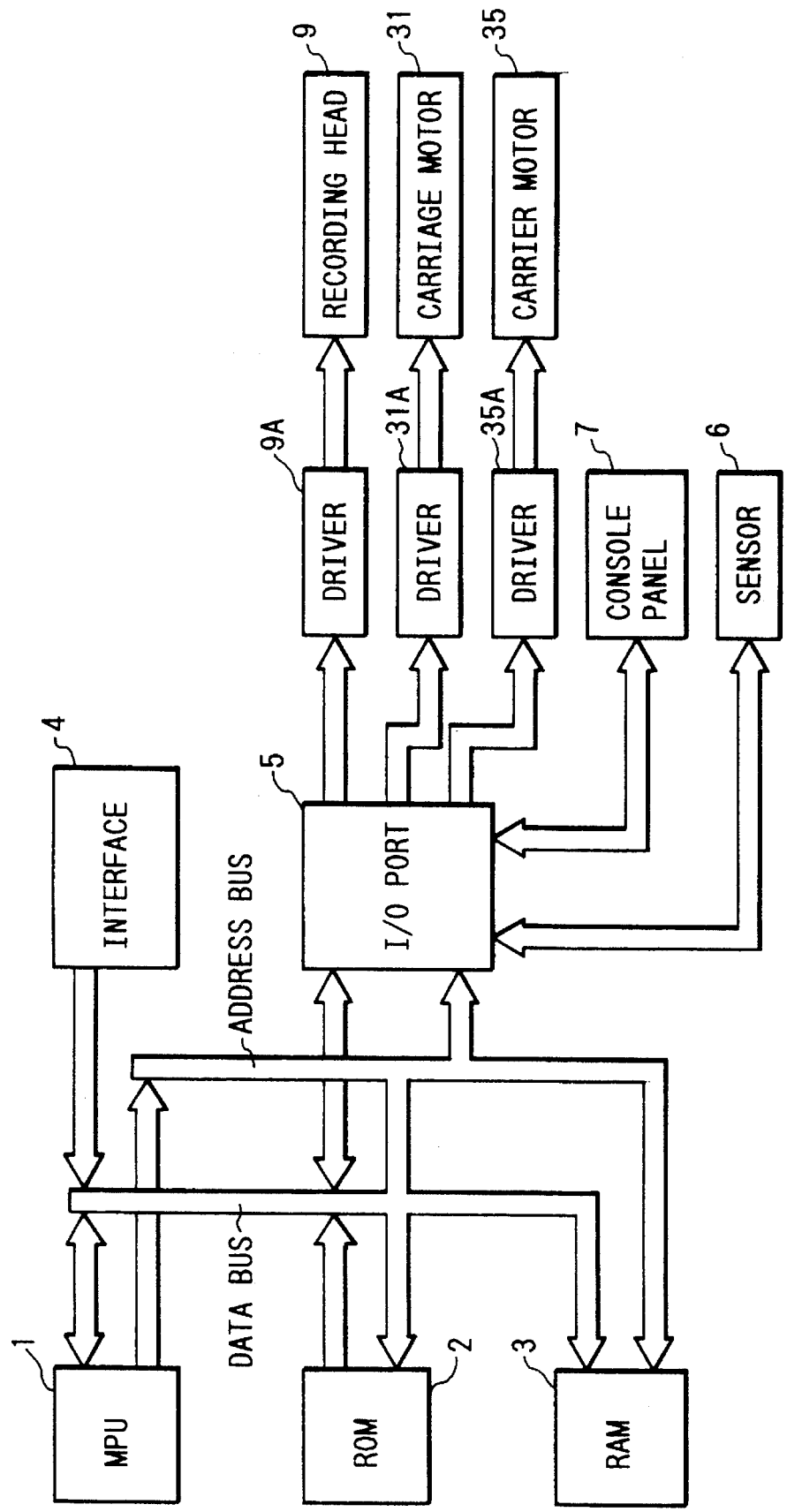
FIG. 1 is a block diagram of a control system for controlling various units of a conventional recording apparatus.
Figure 18B:
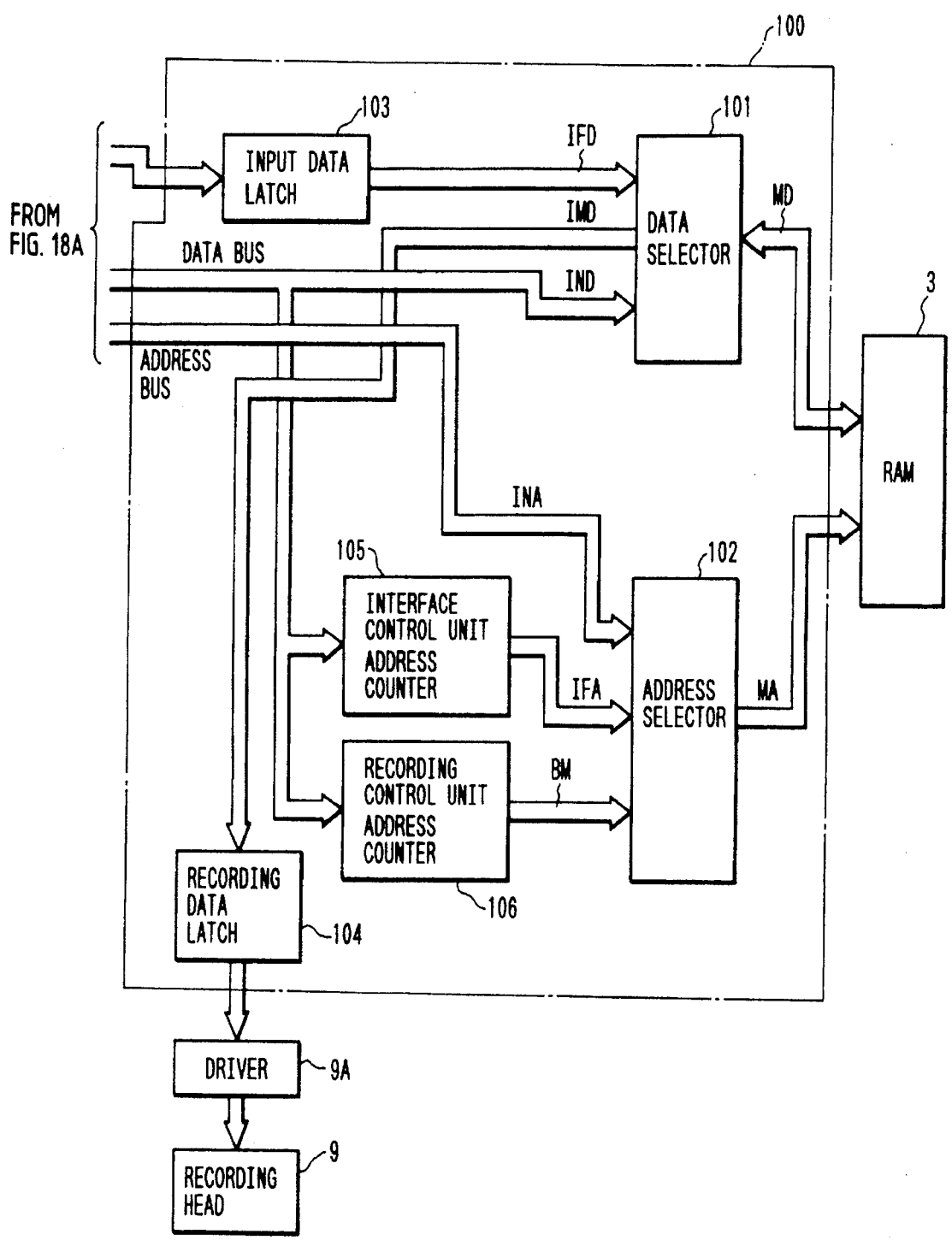
FIG. 18, which is comprised of FIGS. 18A and 18B, is a schematic block diagram of a control system of a seventh embodiment of the present invention.

FIG. 18 is a schematic block diagram of a control system for controlling various units of the ink jet recording apparatus, wherein equivalent parts to those in FIG. 1 are represented by same symbols and will not be explained further. The ink jet recording apparatus employed in the present embodiment has the same structure as that shown in FIG. 3.

Referring to FIG. 18, a data bus IND and an address bus INA, connected to an MPU 1, a ROM 2 and an I/O port 5, are respectively connected to a data selector 101 and an address selector 102 of a data control circuit 100. An interface 4 is also connected to said data selector 101 through an input data latch 103, and a recording head 9 is also connected to said data selector 101 through a driver 9A and a recording data latch 104. Furthermore, a data bus MD and an address bus MA connected to a RAM 3 are respectively connected to said data selector 101 and address selector 102. An interface control unit (address counter) 105 and a recording control unit (address counter) 106, which are initialized by the data bus IND, are connected to said address selector 102 respectively through address buses IFA, BM.

When the MPU 1 makes access to the RAM 3 in the above-explained structure, the data selector 101 and the address selector 102 select the buses IND, INA of the MPU1 and connect them respectively with the buses MD, MA of the RAM 3.

On the other hand, in case the MPU 1 makes access to the ROM 2 or the I/O port 5, the buses IND, INA of the MPU 1 are separated from the buses MD, MA of the RAM 3. The data selector 101 connects the data bus MD of the RAM 3 with the data bus IFD or IMD, and the address selector 102 connects the address bus MA of the RAM 3 with the address bus IFA or BM. Consequently, during the access of the MPU 1 to the ROM 2 or the I/O port 5, the RAM 3 can store the input data from the interface 4 or send the recording data to the recording head 9 in parallel manner.

Figure 19:
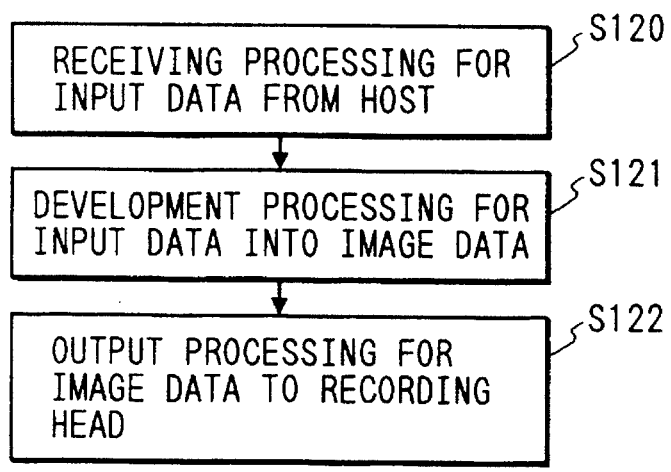
FIGS. 19, 20A and 20B are respectively a flow chart and timing charts of the functions of said seventh embodiment.

FIGS. 19 and 20 are respectively a flow chart and a timing chart, schematically showing the function of the present embodiment. In the present embodiment, the input data from a host apparatus are received in an input buffer in the RAM 3 (step S120), then said input data are developed into image data for example by means of a character generator and said image data are stored in a print buffer in the RAM 3 (step S121). Then said image data are read from the print buffer and supplied to the recording head 9 for image recording. In these operations, the MPU 1 executes the data development and data storage in the step S121 but is not involved in the data reception in the step S121 nor in the data output in the step S122.

More specifically, as shown in FIG. 20, the RAM 3 stores the input data from the interface 4 or releases the image data to the recording head 9, simultaneously with the access of the MPU 1 to the ROM 2. Since the buses of the MPU 1 and the RAM 3 are mutually separated during the period of access of the MPU 1 to the ROM 2 as explained above, the access to the RAM 3 during said period is made possible. The RAM 3 in the present embodiment requires refreshing as it is composed of a DRAM, but said refreshing operation is also conducted during the access of the MPU 1 to the ROM 2.

Thus the data transfer process of the MPU 1 can be significantly simplified, and improvements in the recording speed and in the data receiving speed from the host equipment can be realized.

Figure 21C:
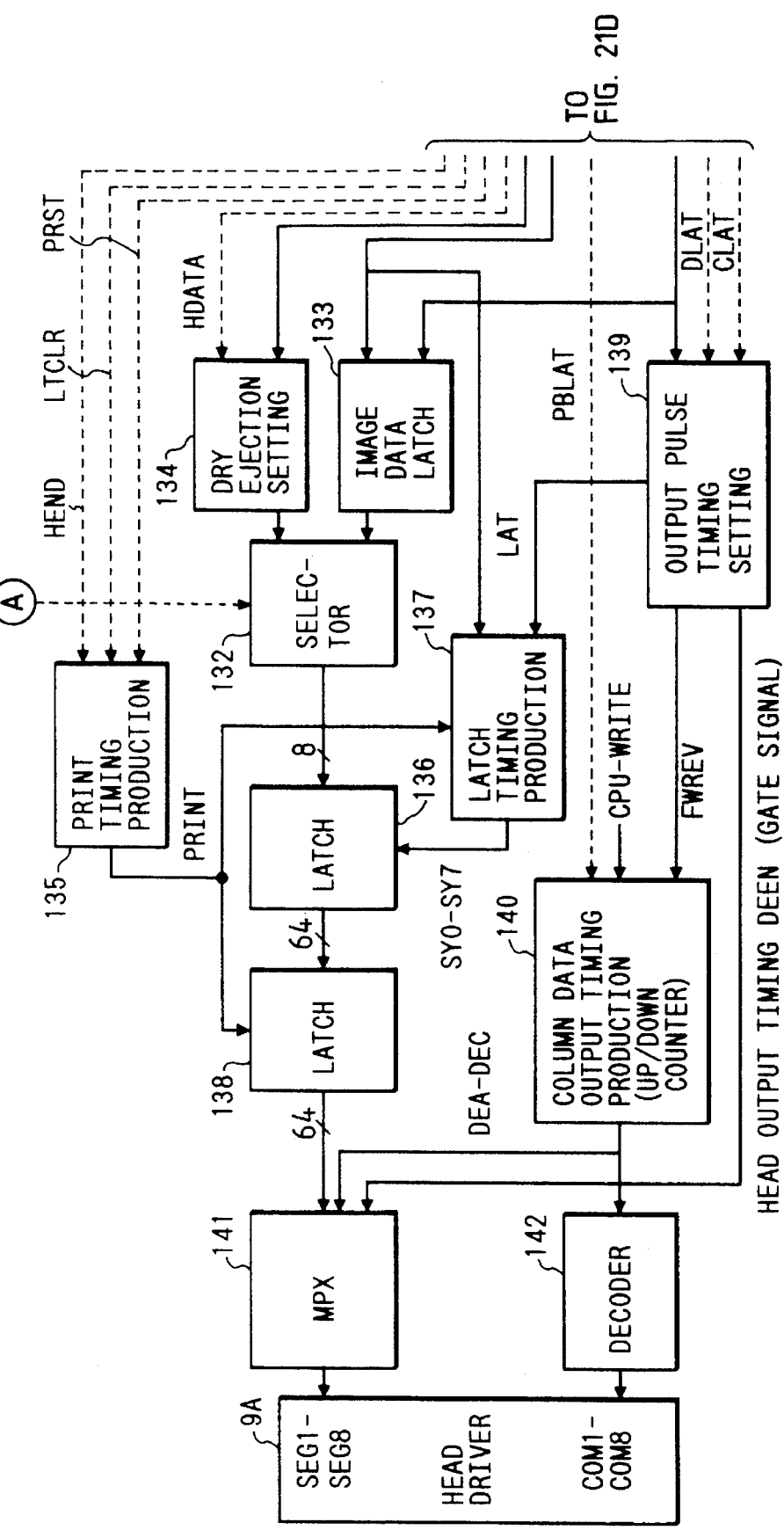
FIG. 21, which is comprised of FIGS. 21A to 21D, is a block diagram showing the details of a data control circuit shown in FIG. 18.

In the following there will be explained the details of said data control circuit 100 with reference to a block diagram shown in FIG. 21, which includes the MPU 1, RAM 3, interface 4 and driver 9A shown in FIG. 18.

(1) Interface control system

At first there will be explained the control of the interface 4, for effecting data transfer with the host apparatus. The involved signal lines will not be explained as they, are already known. As the output timing of BUSY, ACK signals is different according to the kind of the host apparatus, the MPU 1 of the present embodiment is so designed as to be capable of regulating said timing, as will be explained later.

When data are sent from the host apparatus, a simultaneously sent STROBE signal is received by a BUSY signal generating unit 110, which generates the BUSY signal to set the host apparatus in a stand-by state and sets an internal BUSY flag. In this state, the data from the host apparatus are latched in an input data latch 103.

Subsequently, when an SIF signal (FIG. 20) from a time sharing control unit 111 is rendered active (H), an IFE/HEADER signal generating unit 112 activates an IFDE signal in response to said BUSY flag. In response to said IFDE signal, the time sharing control unit 111 gives a necessary timing to a RAM control timing generating unit 112, whereby the data latched in the input data latch 103 are written into addresses (IFA0–IFA15) designated by an input buffer address generating unit 113. In this state the address selector 102 selects the bus IFA by RCSEL and CRAM signals to be explained later, and the data selector 101 selects the bus IFD by a RAMW signal to be explained later.

Simultaneously with the completion of said writing, the time sharing control unit 111 generates WEND and SWEND signals to reset (H) the input buffer address generating unit and to start an ACK generating unit 114, thereby generating an ACK signal of a pulse duration set by the MPU 1, based on an ACK timing signal from the BUSY generating unit 110. Also at a timing (Reset-BUSY signal) set in a BUSY reset timing setting unit 115 by the MPU 1, the BUSY generating unit 110 resets the BUSY signal, thereby restoring the data reception enabled state. Similarly the BUSY flag is reset.

In normal state, the above-explained operations are repeated to fetch the received data in succession into the input buffer area of the RAM 3. However, since the input buffer area is limited, an up-down counter 116 counts the difference between the number of input data and the number of data read by the MPU 1. Then the following control is conducted if a comparator 118 detects that thus obtained count coincides with the upper byte of a MAX address (2 bytes) set by the MPU 1 in an input buffer max address setting unit 17 or that said count coincides with the MAX address (2 bytes).

Figure 22:
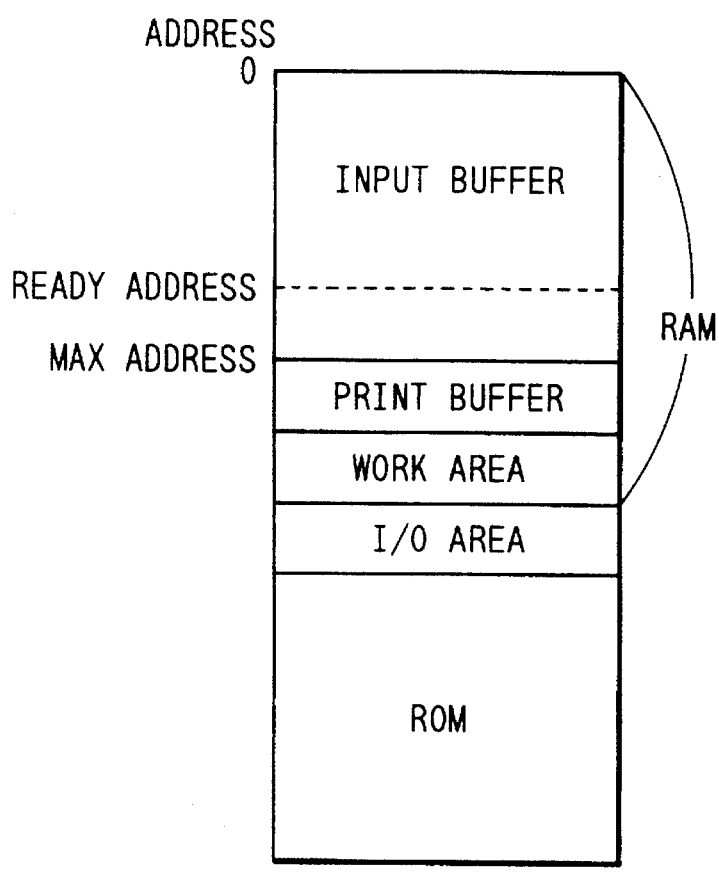
FIG. 22 is a memory map of the address space of an MPU.
Figure 23:
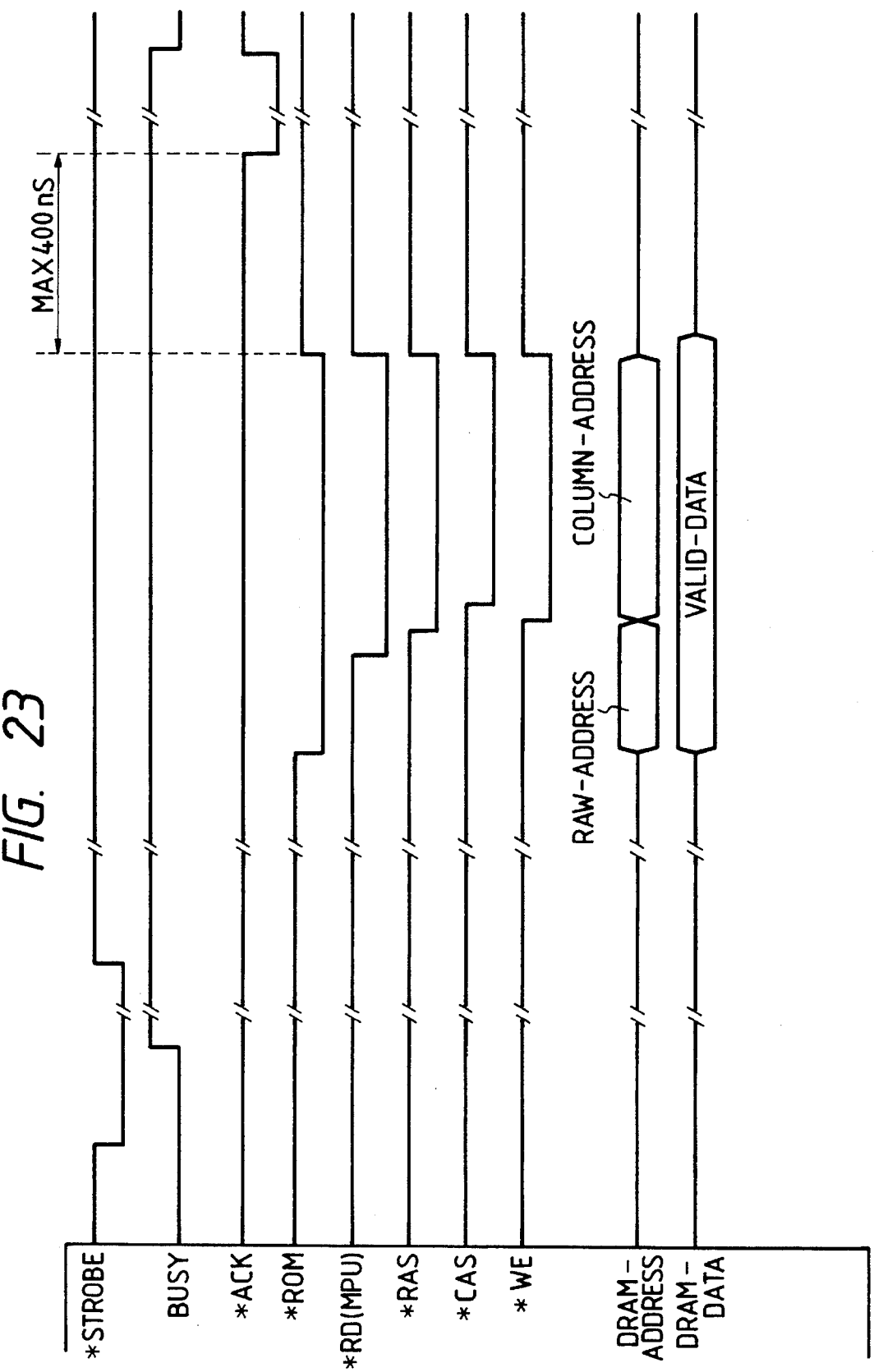

FIG. 22 shows the address space of the MPU 1. In the present embodiment, the RAM 3 is mapped from an address "0", and the MAX address indicates the upper limit of the input buffer area. Said MAX address also indicates the capacity of the input buffer (1) In case of coincidence with upper byte of the MAX address:

The output timing of the ACK signal is delayed by about 500 msec in order to avoid the next state (2) and to avoid the execution of the time-out process of the host apparatus, and said delay time is assigned to the data process of the MPU. FIG. 23 shows the timing of the ACK and BUSY signals in the normal state, while FIG. 24 shows the timing of the above-explained state in which a BUSY period expanding signal is supplied from the comparator 118 to the ACK generating unit 114.

(2) In case of coincidence with the MAX address:

In this state, the input buffer area is filled with the unprocessed data of the MPU 1 and cannot receive the new data. Therefore, when this state is reached, a Set-BUSY2 signal is sent to the BUSY generating unit 110 to set the BUSY signal. Said BUSY signal set in this state is reset only when the data processing of the MPU 1 proceeds to a point where the number of data in the input buffer coincides with a ready address set by the MPU 1 in an input buffer ready address setting unit 119. This is achieved by the supply of the Reset-BUSY2 signal by a comparator 120 to the BUSY generating unit 110.

Since the pulse duration of the ACK signal and the output timings of the ACK and BUSY signals are different according to the host apparatus as explained above, these values are rendered variable by the MPU 1. The pulse duration of the ACK signal can be varied by an ACK duration setting unit 121, from 0.4 μsec to 6 μsec with steps of 0.4 μsec each. An ACKW signal is used as the latch pulse therefor.

Figure 25A:
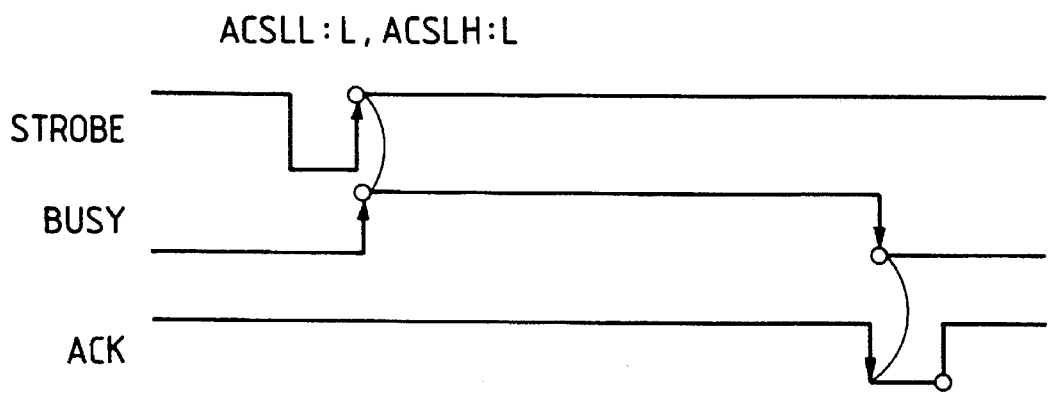
Figure 25B:
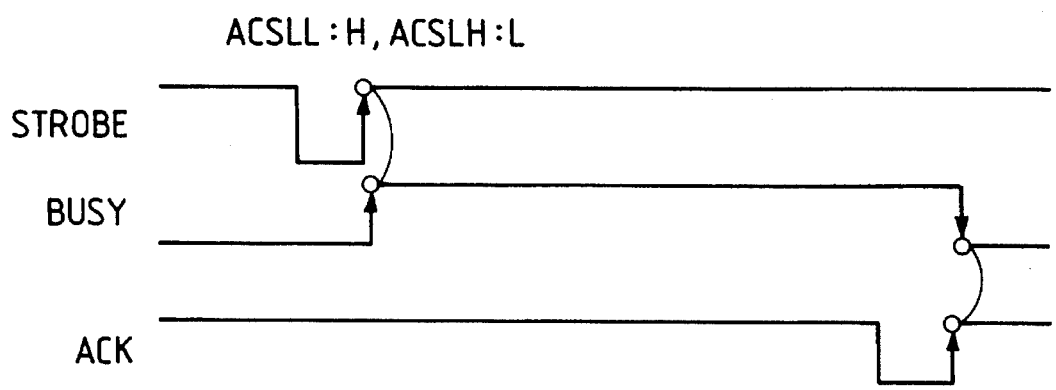
Figure 25C:
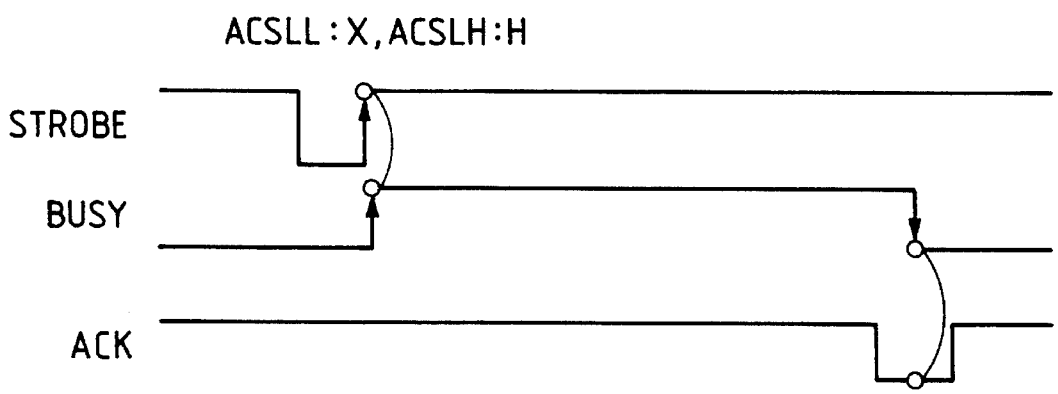

Also the timings for releasing the ACK signal and resetting the BUSY signal can be determined as shown in FIG. 25, by setting two bits ACSLL, ACSLH in the BUSY reset timing setting unit 115.

Signals SELECT, FAULT and PE are released by setting a register of an interface control unit 122 through the MPU 1. Signals IFCW and IFCR are respectively writing pulses and reading pulses. The SELECT signal is in the "H" state in the normal state, but assumes the unselecting "L" state in case of an off-line mode or an error. The FAULT signal assumes the "L" state in case of an error, and the PE signal assumes the "H" state in case of absence of recording sheet (paper end).

Reversal control units 123, 124 effect reversal control by an ILSEL signal, thereby selecting a high-active mode or a low-active mode.

(2) Input buffer, print buffer control system

In the following there will be explained the control of data transfers from the interface 4 to the input buffer (RAM 3), from the input buffer to the MPU 3, from the MPU 3 to the print buffer (RAM 3), and from the print buffer to the head driver 9A. Since the address space (FIG. 22) of a single RAM 3 is divided as the input buffer and the print buffer, there is employed timing sharing control in order to prevent the competition of buses.

In the following there will be explained the RAM addressing in each of the above-mentioned data transfers:

(1) Data transfer from interface 4 to input buffer:

The details of this data transfer are already explained in relation to the interface control system, and will not, therefore, be explained further. This addressing is conducted when SHE and CRAM signal are both in the "L" state, whereupon the address selector 102 selects the address buses IFA0–IFA15.

Figure 26:
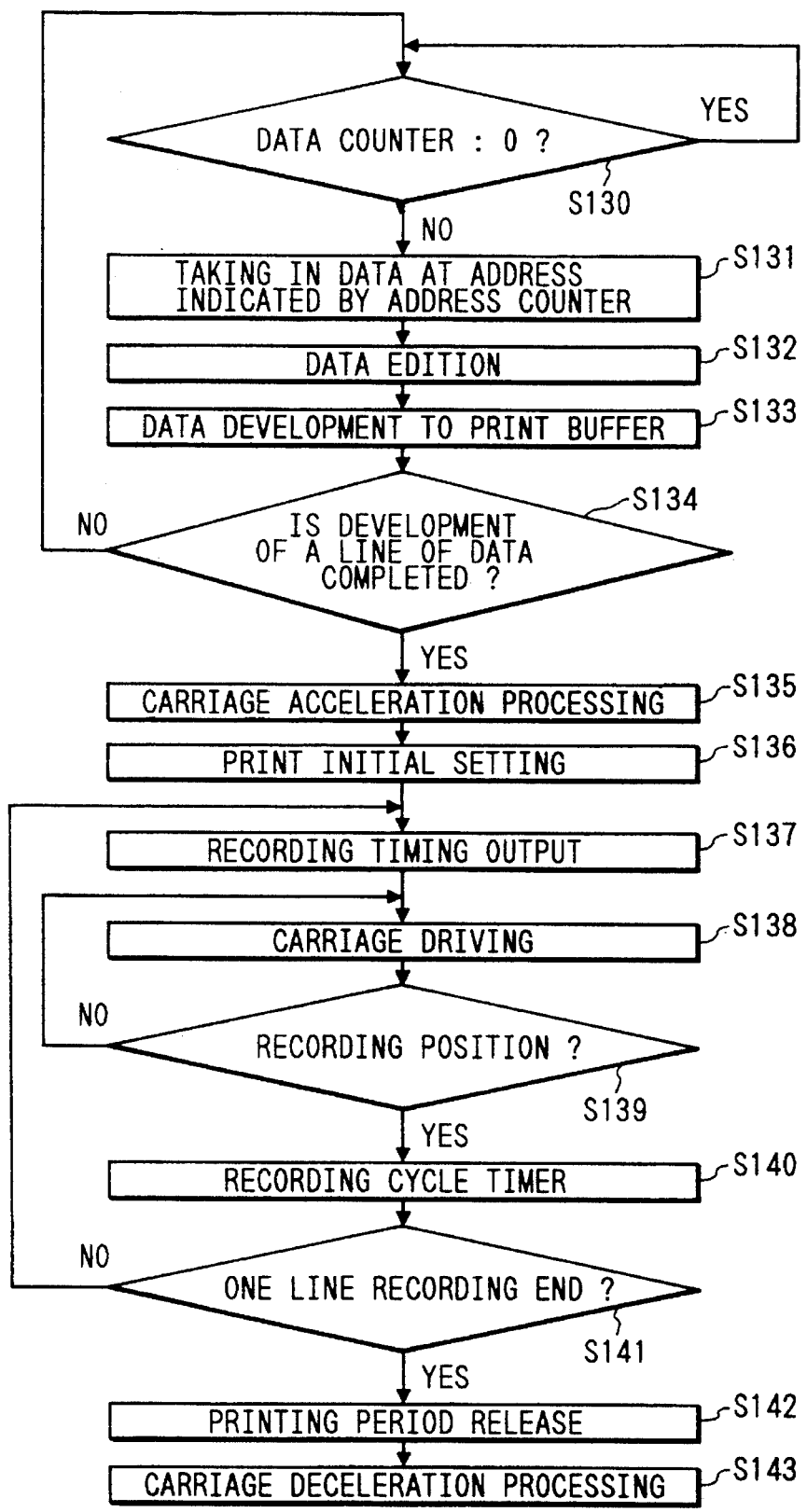
FIG. 26 is a flow chart of the control sequence of an MPU.

(2) Data transfer between MPU 1 and input buffer or print buffer:

This addressing is for a series of operations of the MPU 1, as shown in a flow chart in FIG. 26, for fetching the input data from the input buffer (steps S130, S131), effecting the command analysis and editing (step S132), and developing said data into image data and transferring said image data to the print buffer (steps S133, S134). In these operations, the RAM 3 is directly controlled by a RAM (chip-select) signal generated by an address decoder 125 and by the address buses INA0–INA15 of the MPU 15. More specifically, in the access of the MPU 1 to the RAM 3, the RAM control timing generating unit 112 shifts the CRAM signal to the "H" state in response to said RAM(chip-select) signal, whereby the address selector 102 selects the address buses INA0–INA15 of the MPU 1.

Figure 27:
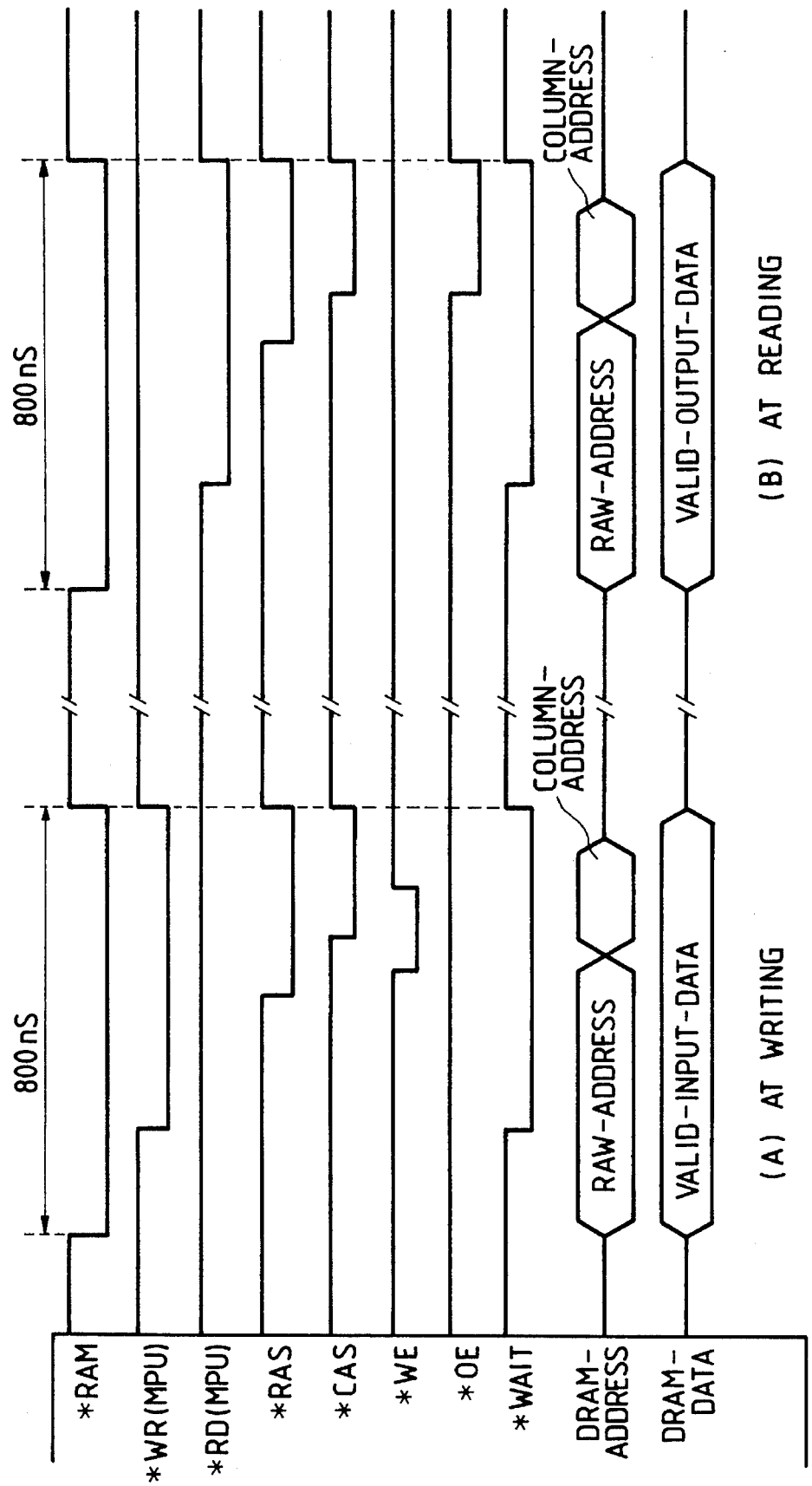
FIG. 27 is a timing chart showing the timing of RAM access by said MPU.

At each data read-out of the MPU 1 from the input buffer, the time sharing control unit 111 generates an IRRD signal, thereby effecting a stepwise decrement of the count of the up-down counter 116 indicating the difference between the number of input data and the number of read-out by the MPU 1, and a stepwise increment of the count of an input process end counter 126 of the MPU 1. Said count indicates the address of the data to be processed next by the MPU 1. The timing of access of the MPU 1 to the RAM 3 is shown in FIG. 27.

(3) Data transfer from print buffer to head driver 9A:

This addressing is fetching the image data, written by the MPU 1, in succession from the print buffer to an image data latch of a head output control system, to be explained later, in the course of a printing operation, and is controlled by a head output data reading address generating unit 127. Said generating unit 127 is composed of an up-down counter, of which start address is set by a print buffer start address setting unit 128.

After having written data of a line into the input buffer, the MPU 1 sets the start address in the start address setting unit 128 by means of PBCL and PBCH signals, and loads the reading address generating unit 127 with said start address by a PBLAT signal. Thereafter, at every fetching of data of one byte according to the printing direction determined by a FWREV signal, the count of the address generating unit 127 is stepwise increased or decreased by a DLATC signal, and the addressing is conducted by said count. This addressing becomes effective when the SHE and CRAM signals from the time sharing control unit 111 are respectively "H" and "1", whereupon the address selector 102 selects the address buses BM0–BM15.

In the above-explained addressing operations, the output timings of the signals RAS, GAS, OE, WE, WAIT etc. are determined by the RAM control timing generating unit 112, in response to the signals from the time sharing control unit 111. Also the row address and column address of the RAM 3 are switched by the address selector 102, in response to a RCSEL signal generated by the time sharing control unit 111.

In the following there will be explained the time-shared switching of bus occupancy.

The MPU 1 has the basic priority of access to the RAM 3, and, during the access of the MPU 1 to the RAM, there is not conducted the access by the hardware, namely the data fetching from the interface 4 to the RAM 3, data output to the head driver 9A or the refreshing of the RAM 3. The right of access to the RAM 3 is given to the hardware only during the access of the MPU 1 to the ROM 2 (while a SUMP signal from the address decoder 125 is at the "H" state).

During this period, there are conducted (1) the data fetching from the interface 4, (2) data output to the head driver 9A, and (3) refreshing of the RAM 3, as shown in FIG. 20.

Figure 28:
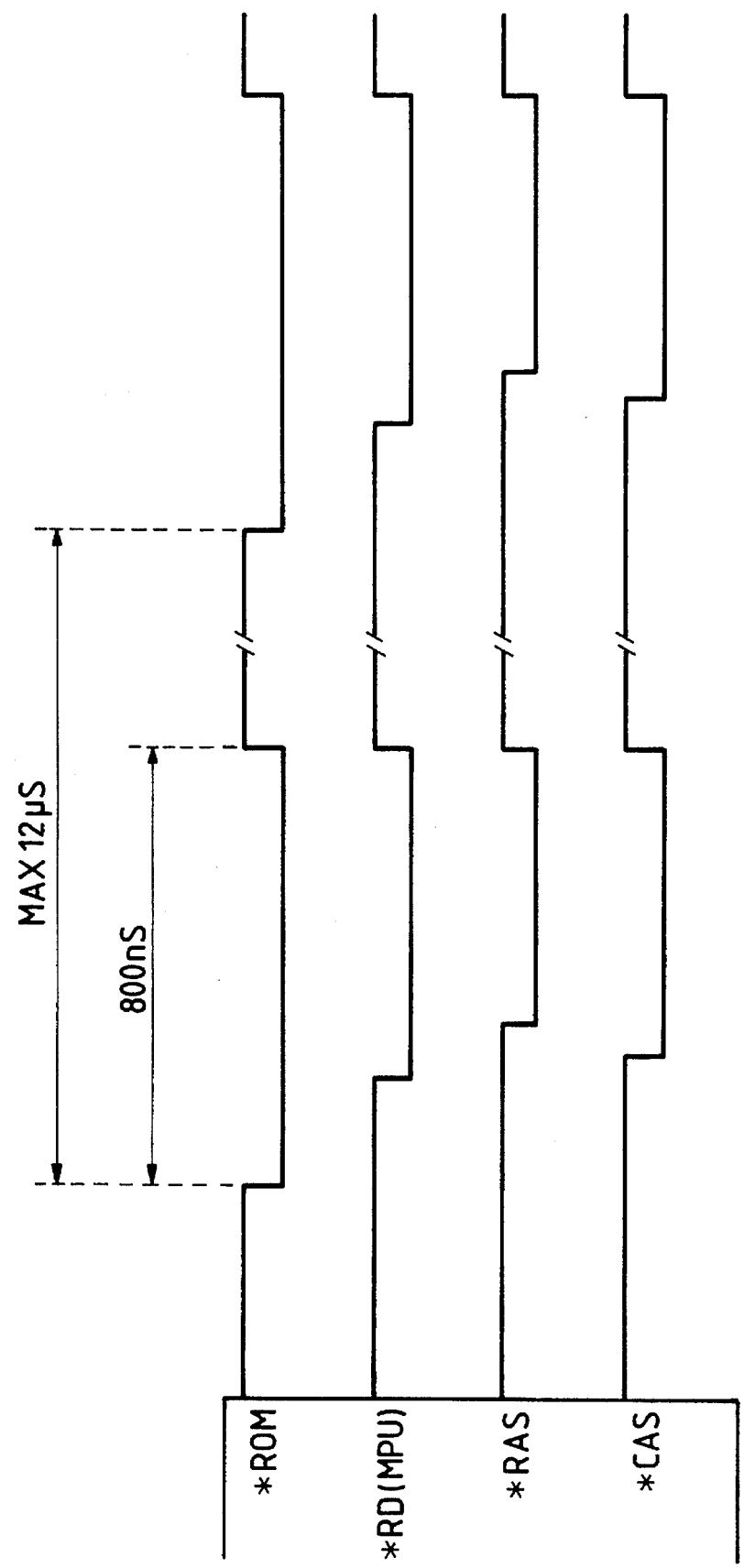
FIG. 28 is a timing chart showing the timing of RAM refreshing.

Said SUMP signal is generated from the Chip-select signal of the ROM 2 and a Read signal of the MPU 1, and is used in the time sharing control unit 111 and the IFE/HEADER signal generating unit 112 for generating various operation signals SHE, SIF, IFDE, HEADER etc., thereby achieving time-shared access to the RAM 3. The refreshing of the RAM 3 is conducted by so-called CAS-before-RAS refreshing, with the timing shown in FIG. 28.

Figure 20A:
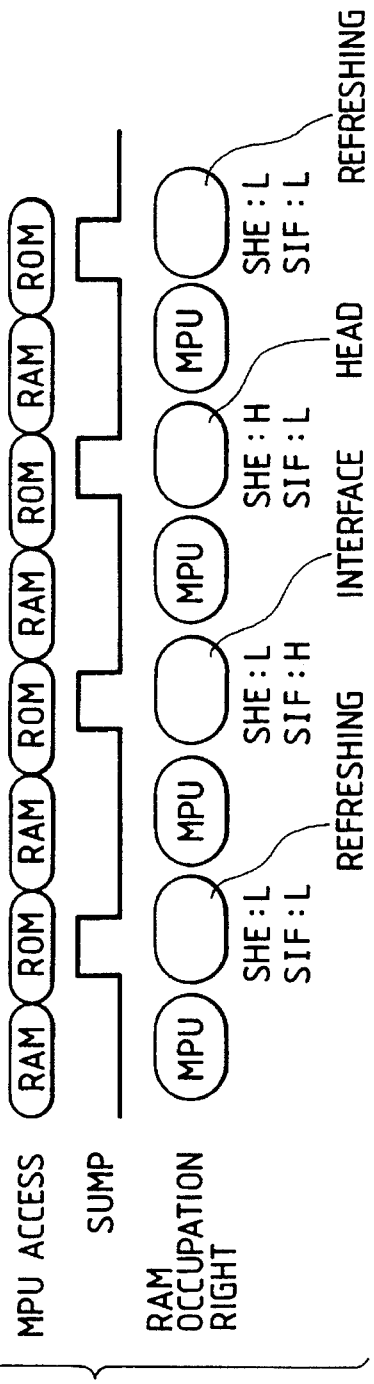
Figure 20B:
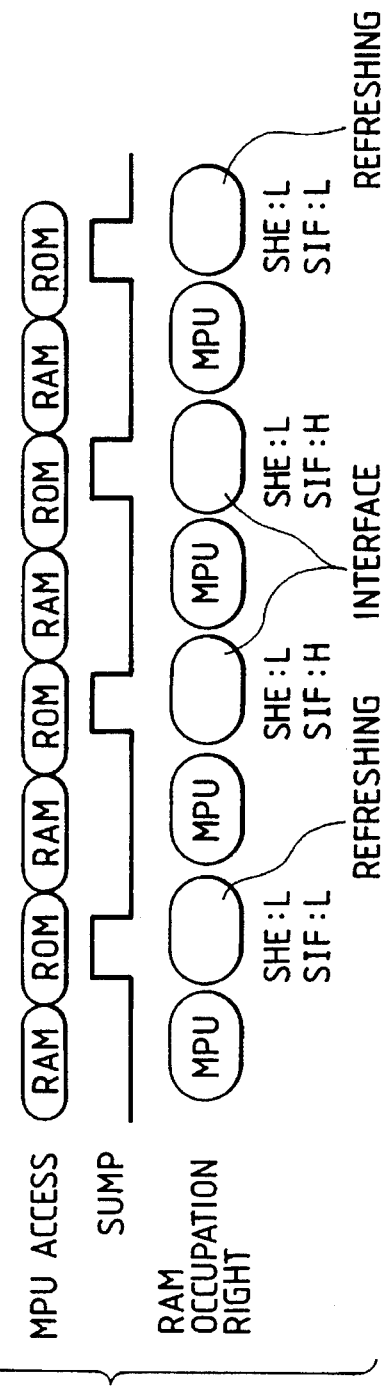

For improving the data receiving speed from the host apparatus, this embodiment employs two time sharing operations: namely the time-shared operations (1)–(3) as shown in FIG. 20A at the data output to the head driver 9A (at the recording operation), and the time-shared operations (1) and (3) as shown in FIG. 20B when the recording data are not released. These two operations are switched by the supply of an IFHD signal, set by the MPU 1 in the printer control unit 129, to the IFE/HEADER generating unit.

The above-explained input buffer of the RAM 3 has a ring structure, and the input buffer address generating unit 113 is reset to "0" by the comparator 130 when the address of said generating unit 113 coincides with the MAX address of the input buffer MAX address setting unit 117, Also the input process end counter 126 is similarly reset to "0" by the comparator (3) when the count of said counter 126 coincides with said MAX address, (3) Printer head output control system This system generates the ink discharge timing of the row data and column data to be supplied to the head driver 9A and determines the ink discharge time (discharge pulse duration). Based upon an HSEL signal from the printer control unit 129, a selector 132 selects either the image data from the RAM 3, or idle discharge (preliminary discharge) data set by an HDATA signal. Said idle discharge data indicate the nozzle drive pattern at the idle discharge operation, and the ink is discharged from all the nozzles if said data are all "1".

Referring to FIG. 26, after the data development of a line (step S134), the MPU 1 effects acceleration of the carriage 31 (step S135) and initial setting (see FIG. 29) (step S136), by the setting of the aforementioned start address (PBCH, PBCL and PBLAT signals) and an IFHD signal indicating the recording period. Then the MPU 1 sends a recording timing signal PRST to the print timing generating unit 135 (step S137).

Figure 30:
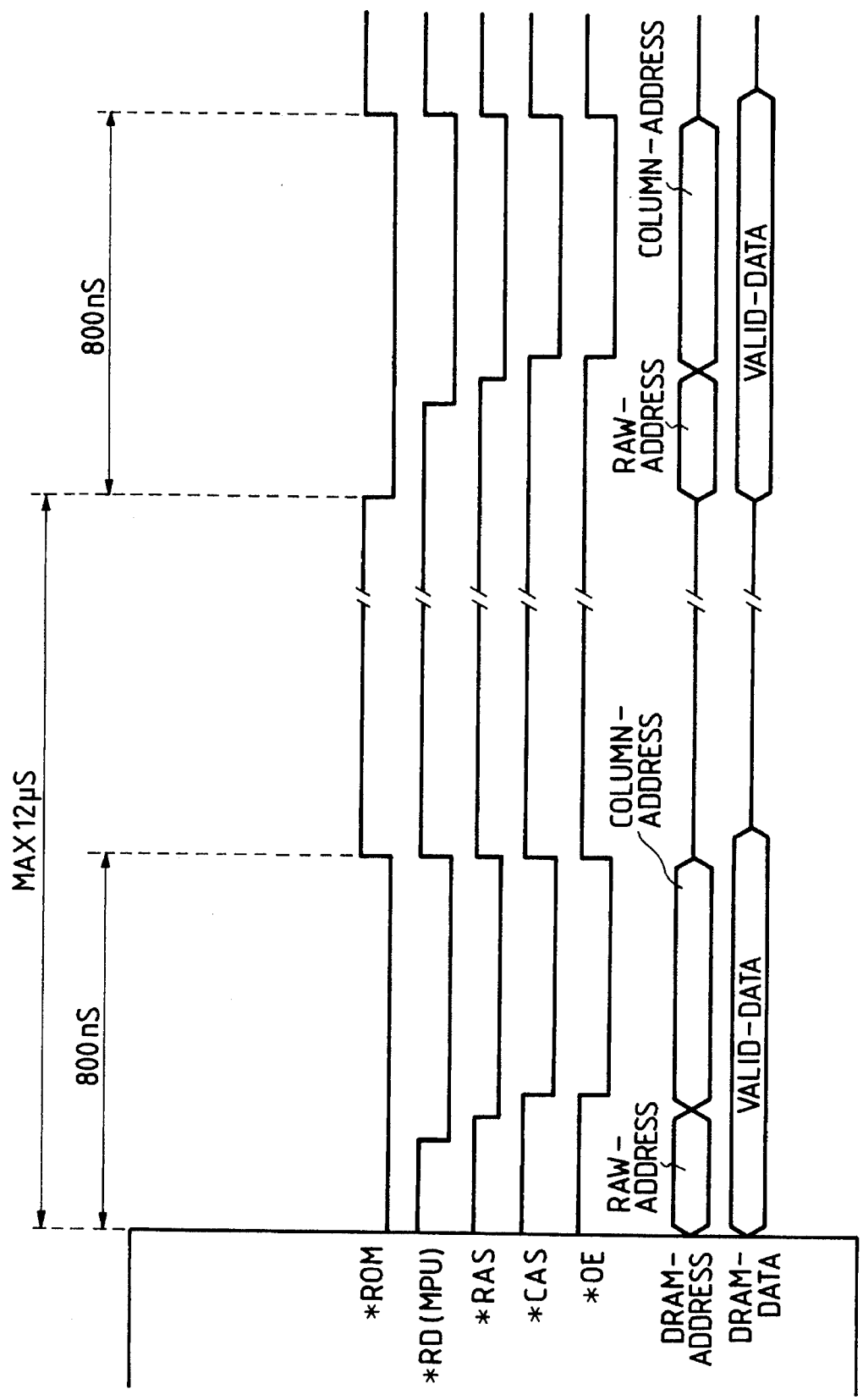
FIG. 30 is a timing chart showing the timing of recording data read-out.
Figure 31:
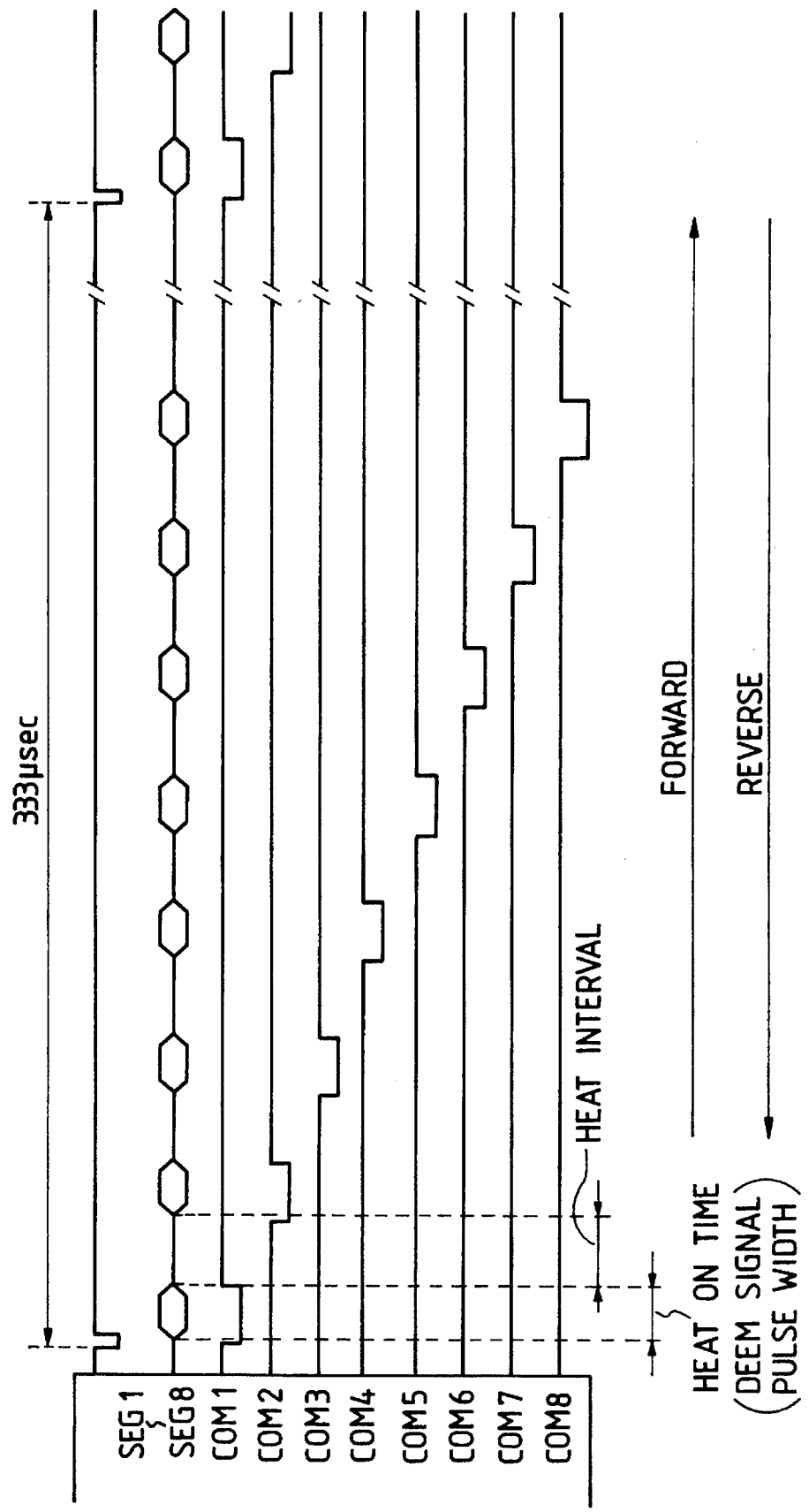
FIG. 31 is a timing chart showing the timing of data output to the recording head.

Thus the image data of 8 bytes are fetched, one byte at a time, into the latch 136 of 8×8 bits, utilizing a DLATC signal generated by the time sharing control unit 111 as the clock signal. In this operation, the latch 136 is addressed by signals SY0–SY7 generated by a latch timing generating unit 137. The timing of reading the recording data in this operation is shown in FIG. 30.

Then the carriage 31 is activated (step S138) and moved to the recording position (step S139). Then the next recording timing is awaited (step S140) and the record timing signal PRST is again released (step S137). Thus the print timing generating unit 135 generates the PRINT signal, in response to which the data of the latch 136 are loaded in a next latch 138. At the same time, a heat time setting unit of the output pulse timing setting unit 139 is initialized, and a multiplexer 141 multiplexes the data, according to a column data output timing generating unit 140 which counts the pulses generated by said heat time setting unit as the clock signals. Said data are gated by a DEEN signal determining the heating time for each byte, and are supplied to the head driver 9A. The output data SEG1–SEG8 are thus obtained.

Figure 8:
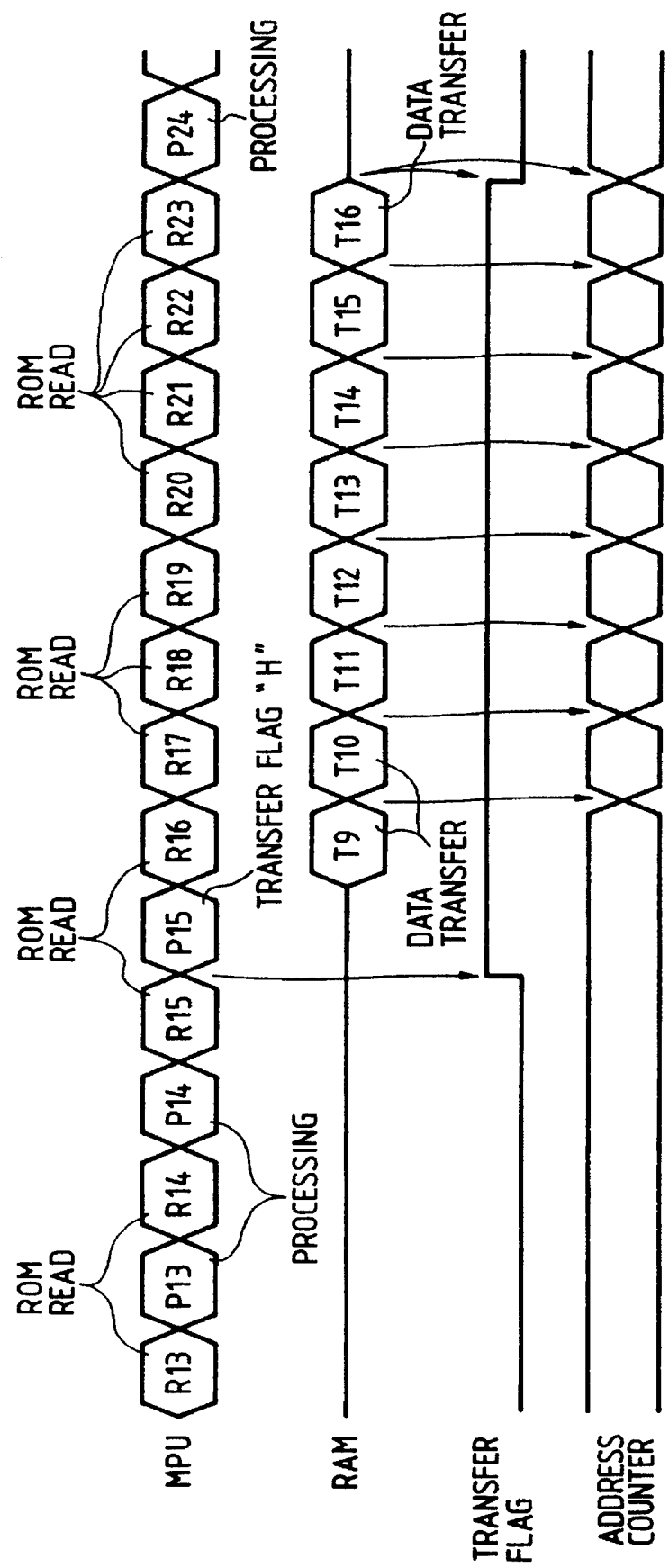
FIG. 8 is a timing chart of operations relating to data transfer in said recording apparatus of the second embodiment.

The count of said column data output timing generating unit 140 is decoded by a 3-8 decoder 142 to obtain signals COM1–COM8. FIG. 8 schematically shows the output timings of said signals COM1–COM8 and SEG1–SEG8, wherein the order of output varies according to the direction of printing, as indicated by arrows therein.

The heating time of the recording head is determined by a CLAT signal from the MPU 1, and the interval is determined by a DLAT signal.

Figure 29:
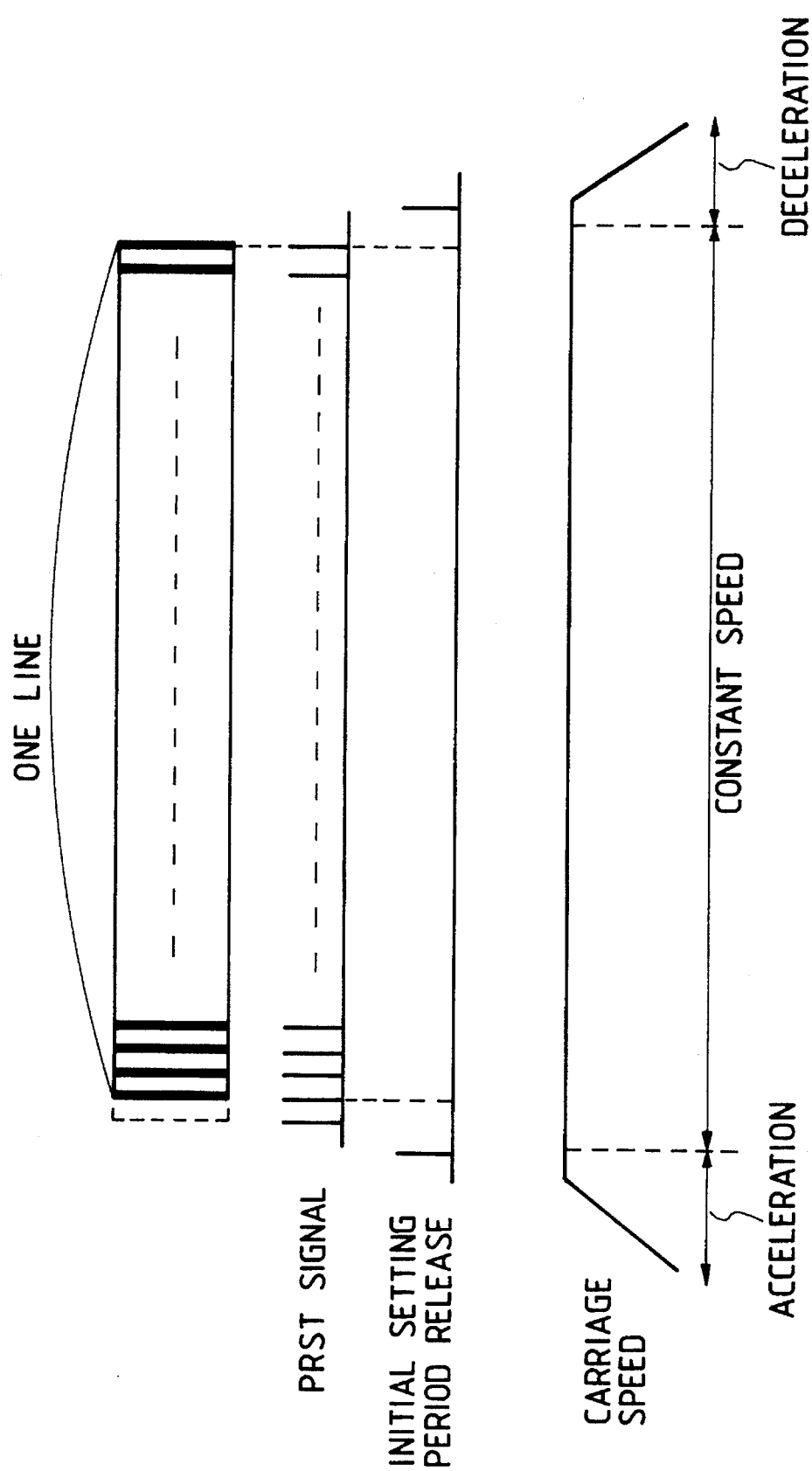
FIG. 29 is a timing chart showing a recording operation.

The recording timing signal PRST is released, preceding the actual recording by a column (FIG. 29). This is to obtain the time for data transfer to the second stage 138 of the latch having two-stage structure 136, 138.

As explained in the foregoing, the present embodiment can significantly improve the processing ability, since the MPU 1 only executes the development of image data and the setting of the timing of recording. Also the data entry from the host apparatus and the data output to the recording head can be conducted at a high speed because these operations can be automatically conducted in synchronization of the access of the MPU 1 to the ROM 2.

Furthermore, when the recording operation is not in progress, the data input from the host apparatus can be conducted with an even higher speed, because the data output to the recording head is assigned for such data input as the RAM addressing.

The present invention allows to disconnect the buses of the memory and the CPU and to connect those of the memory and the input or output means, so that the data transfer can be conducted between the memory and the input or output means in parallel to the functions of the CPU. Consequently the data transfer process can be conducted at a high speed.

In the following there will be explained an embodiment in which the present invention is applied to a recording apparatus.

Figure 32:
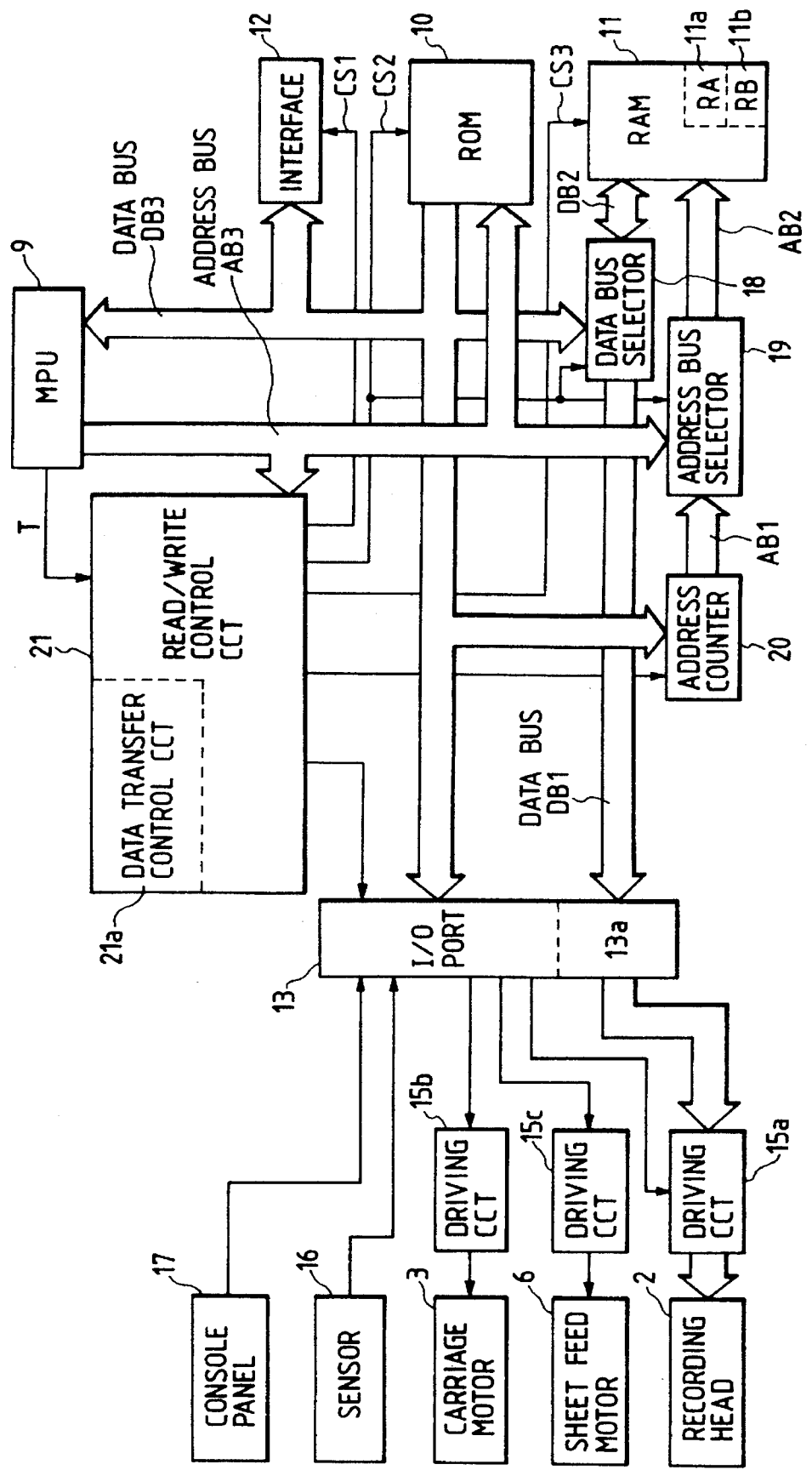
FIG. 32 is a block diagram of an eighth embodiment of the present invention.

FIG. 32 is a block diagram of an eighth embodiment of the present invention, in which a selector is provided for separating an address bus and a data bus connected to a memory from those connected to an MPU thereby enabling transfer of image data from said memory to a recording head while the MPU is not making access to said memory, whereby improvements can be achieved in the speed of data processing and in the throughput. In this embodiment, the MPU discriminates whether the image data of a next line can be stored in the memory, based on the address of image data transfer to the recording head, so that the high-speed recording can be realized even with a memory of a capacity of a line.

More detailedly, the recording operation in this recording apparatus is controlled by a control unit composed of an MPU 9 for controlling the entire apparatus through signal exchange with various units of the apparatus; a ROM 10 storing the control sequence; a RAM 11 serving for example as a buffer for recording data; an interface 12 for information exchange with a host apparatus such as a computer; an I/O port 13; and a read/write control circuit 14. Control signals from the MPU 9 are supplied through the I/O port 13 to driver circuits 15a, 15b, 15c, thereby controlling a recording head 2, a carriage motor 3 and a sheet feeding motor 6. Also information from a sensor 6 or an operation panel 17 is supplied through the I/O port 13 to the MPU 9.

Registers RA 11a, RB 11b are provided in the RAM 11, and said register RA 11a indicates the address of an image buffer, into which the analyzed image data of next line are to be stored in succession.

Also the register RA 11b indicates the lowermost one of 8-byte addresses of the image buffer in which 8-byte data (the recording head 2 of the present embodiment has 64 dots) to be recorded at the next recording position are stored. Thus RB indicates the lowermost address of the recordable data area in the image buffer area.

Other structures will not be explained as they are same as those already explained in FIG. 4. Also the timings of the MPU 9 and the RAM 11 in the recording operation will not be explained as they are same as those shown in FIG. 5.

Figure 2:
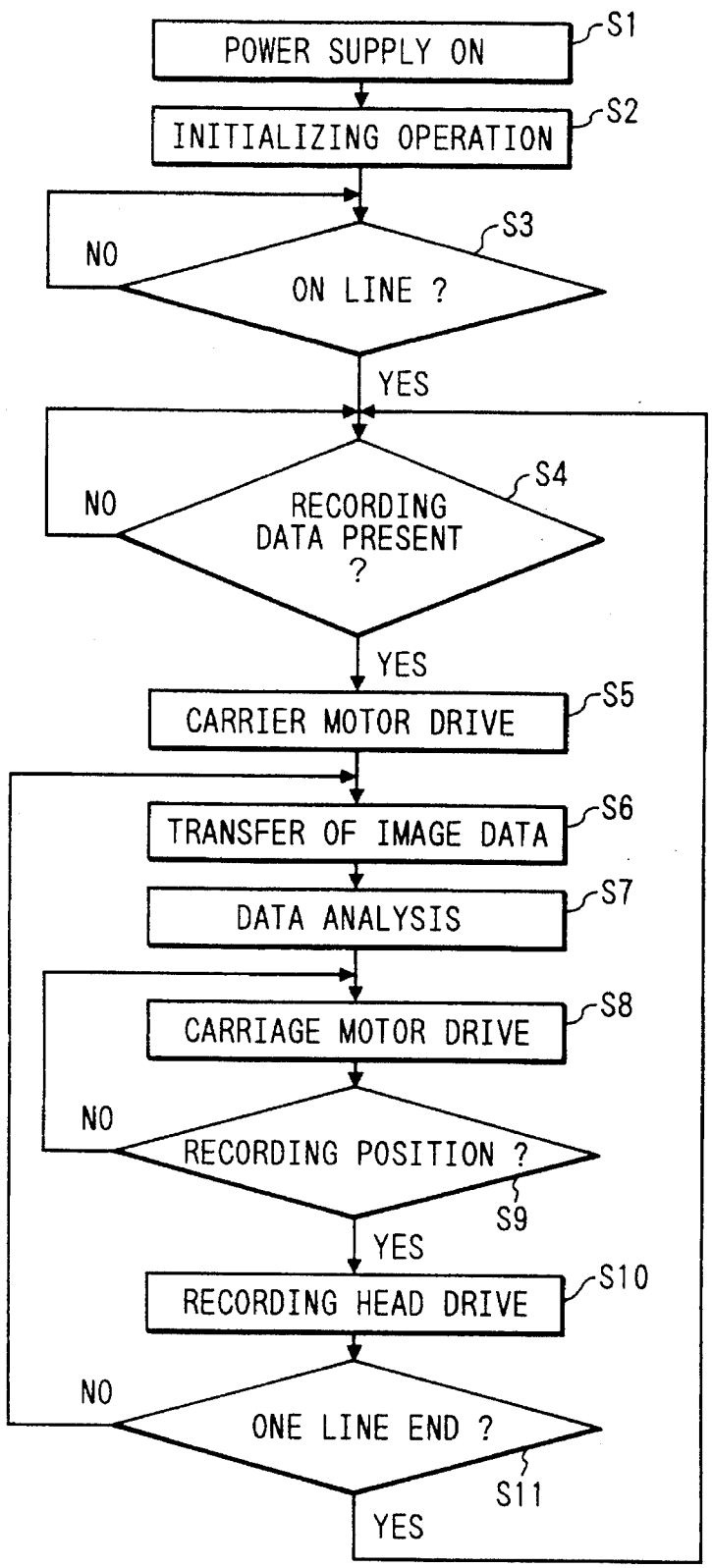
FIG. 2 is a flow chart showing the function of the control system shown in FIG. 1.
Figures 33, 33A:
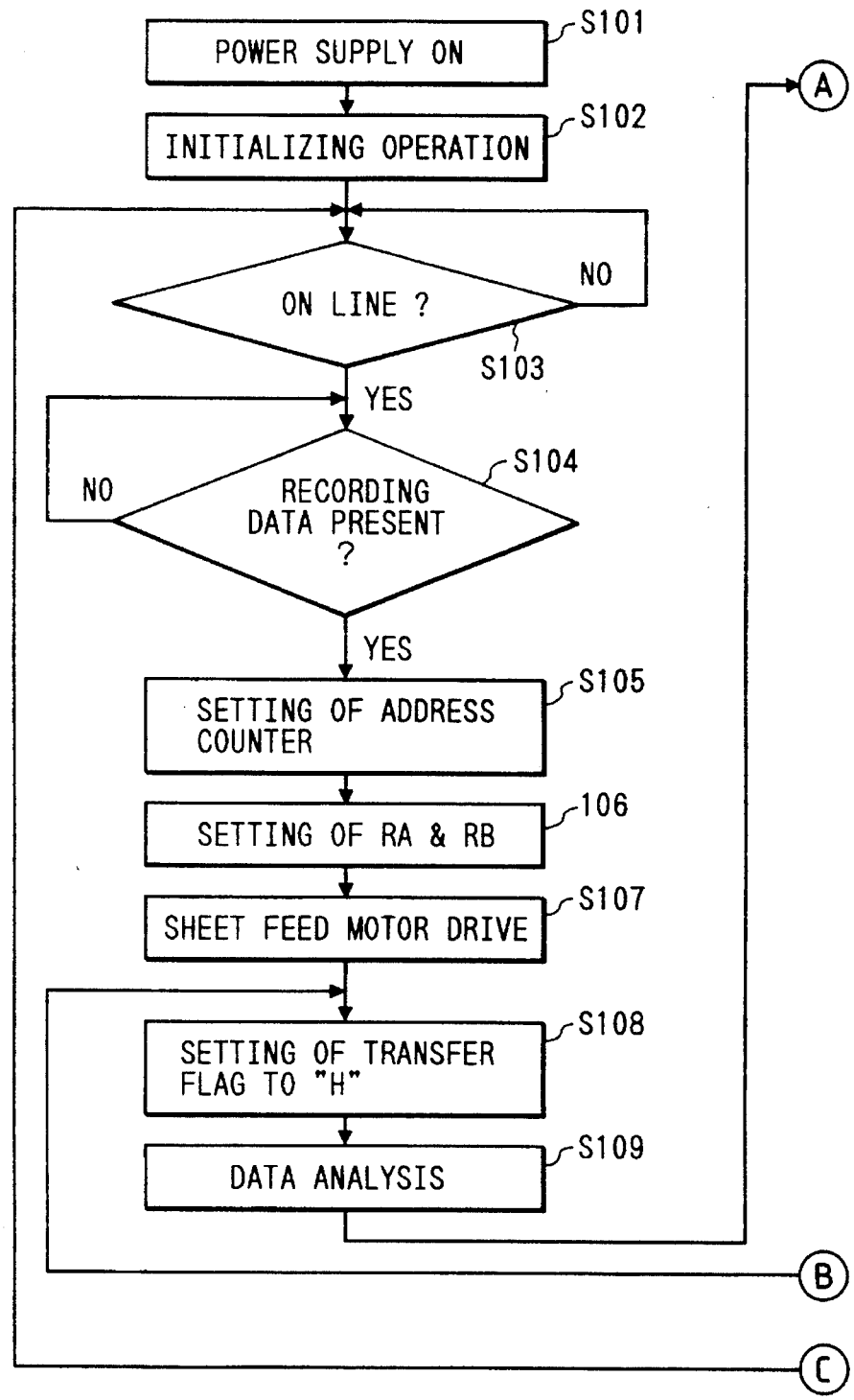
FIG. 33, which is comprised of FIGS. 33A and 33B, is a flow chart of the control sequence of said eighth embodiment.
Figure 33B:
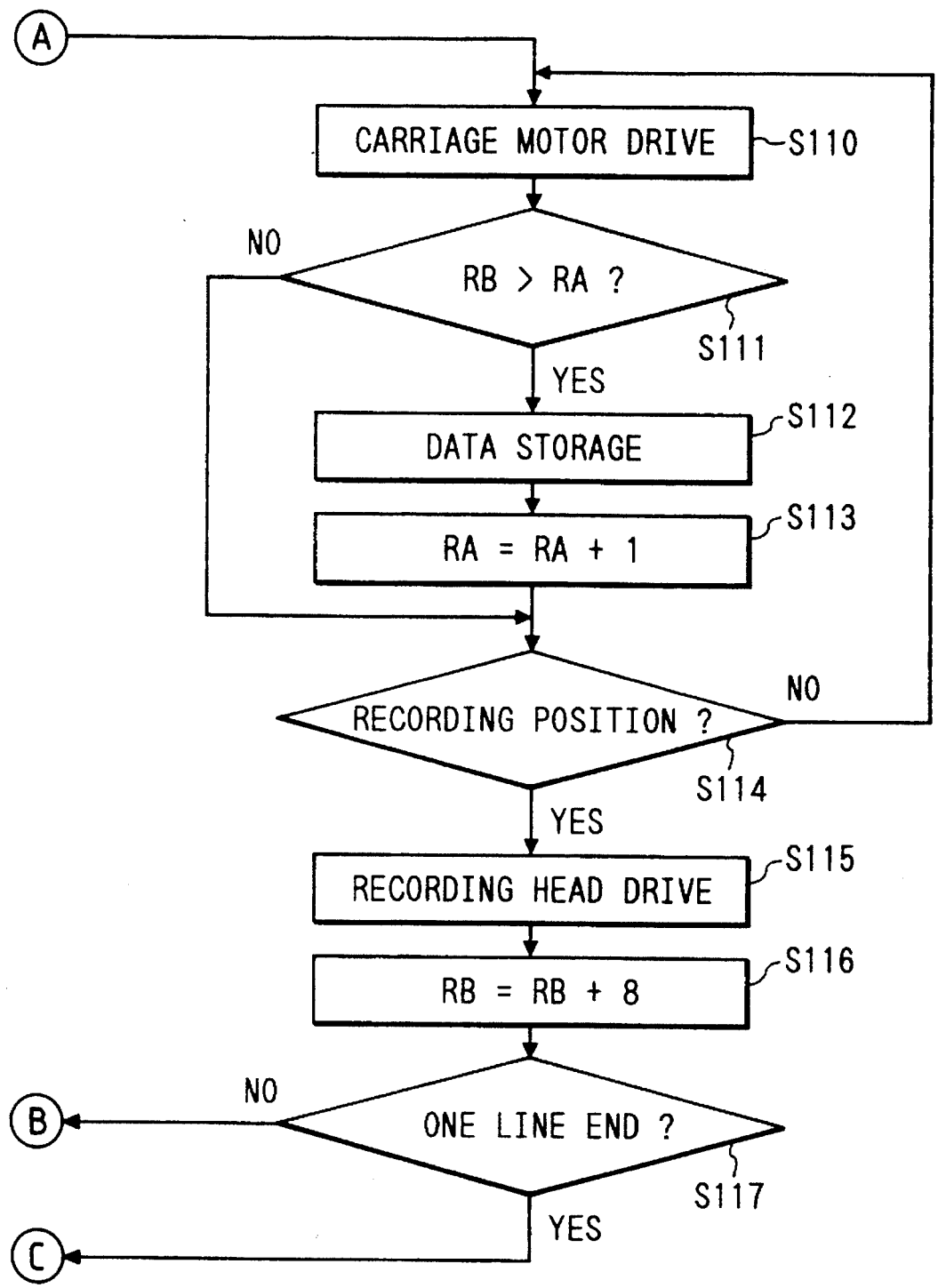

Now reference is made to FIG. 33 for explaining the actual recording operation. Steps S101–S105 are same as in the conventional example shown in FIG. 2. A step S106 sets the start address of the image buffer area of the RAM 11 in the registers RA 11a, RB 11b.

Then a step S107 activates the feeding motor 6, thereby advancing the recording sheet. Then a step S108 sets a transfer flag in the read/write signal control circuit 21 at the "H" state, whereby the image data are transferred from the RAM 11 to the I/O port 13a, at every access of the MPU 9 to the ROM 10. A step S109 effects analysis of the data of a next line, thereby converting the recording data of one byte of next line, in the reception buffer, into image data.

Then the carriage motor 3 is activated to move the carriage 1 (step S110), and a step S111 compares the values of the registers RA 11a and RB 11b. If RB>RA, the image data of next line converted in the step S109 are stored in the image buffer at an address indicated by the register RA (step S112), then the value of the register RA is increased by one (step S113), and the sequence proceeds to a step S114. On the other hand, if the step S111 identifies a state RB≦RA, indicating that the area for storing the image data is not yet empty, the sequence proceeds to the step S114 without the storage of image data. The step S114 discriminates whether the recording position has been reached, and the steps S110 to S114 are repeated until the recording position is reached. When said recording position is reached, a step S115 sends a head drive start signal through the I/O port 13 to the driver circuit 15a, which in response drives the recording head 2 according to the image data from the I/O port 13a. A next step S116 increases the count of the register RB, by "8" corresponding to the data recorded in said step S115. A step S117 then discriminates whether the recording of a line has been completed, and the steps S108–S116 are repeated until the completion of recording of a line. Upon completion of said recording, the sequence returns to the step S103.

In the course of the recording operation, the data in an image buffer area lower than the address stored in the register RB 11b are already recorded and are no longer necessary. Thus the recording data of the next line are converted into image data, and are stored in the image buffer at an address stored in the register RA 11a. In this operation, the discrimination RB>RA in the step S111 indicates whether the image data of the next line can be stored in the image buffer at the address indicated by the register RA 11a. In this manner an improvement in the throughput can be achieved with the image buffer area of a capacity of a line, by preparation of the image data of the next line in the course of the recording operation.

In the following there will be explained a ninth embodiment of the present invention.

Figure 34:
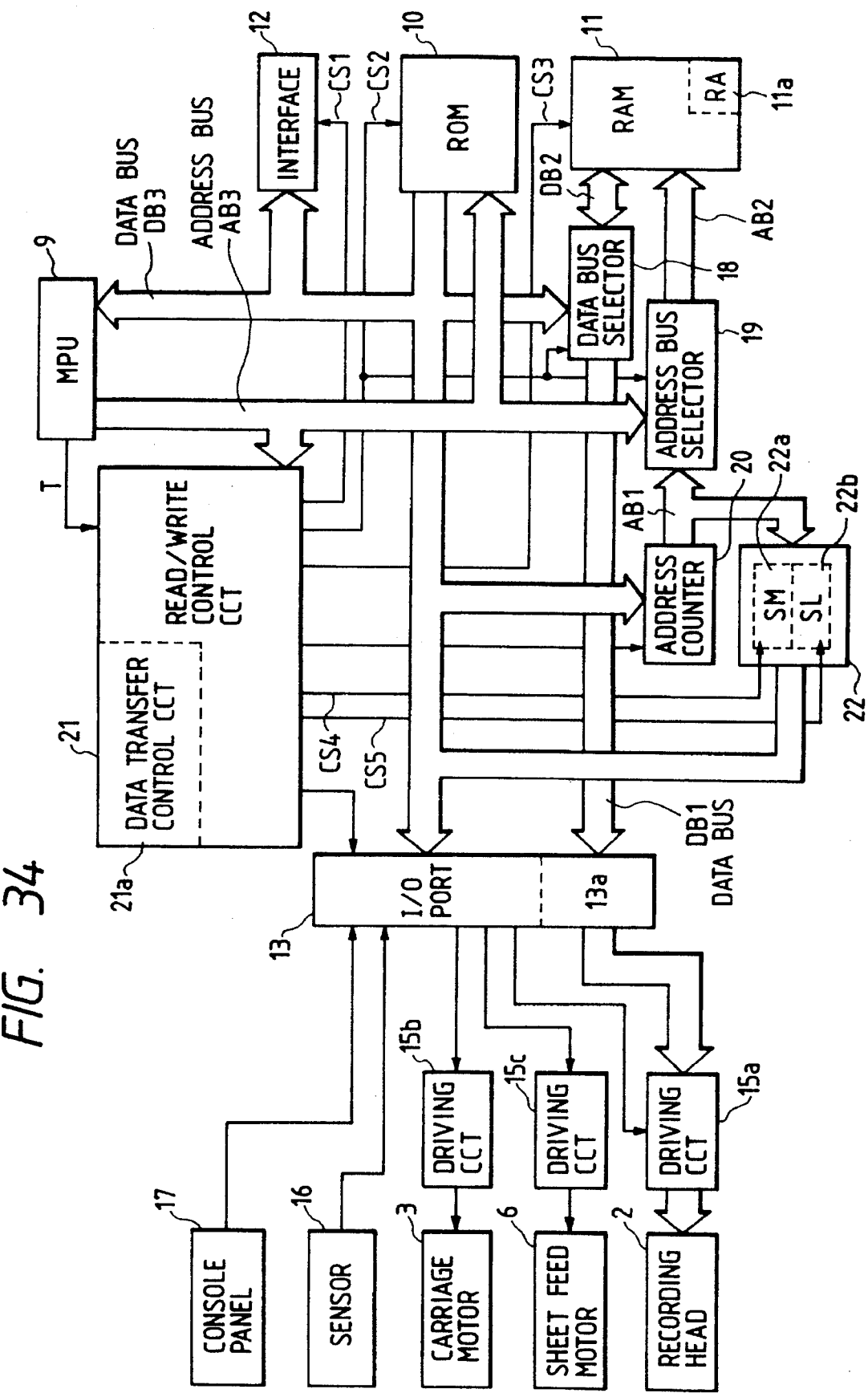
FIG. 34 is a block diagram of a ninth embodiment of the present invention.

FIG. 34 is a block diagram of said ninth embodiment, wherein the MPU 9 can read a value SM 22a or SL 22b of an address counter 20, selecting a data selector 22 by chip select signals CS4, CS5. The reading of the value of the data selector 22 in the course of recording operation, allows to identify the address to which the data in the image buffer area are no longer necessary and the area can be used for storing the image data of the next line.

Figure 35B:
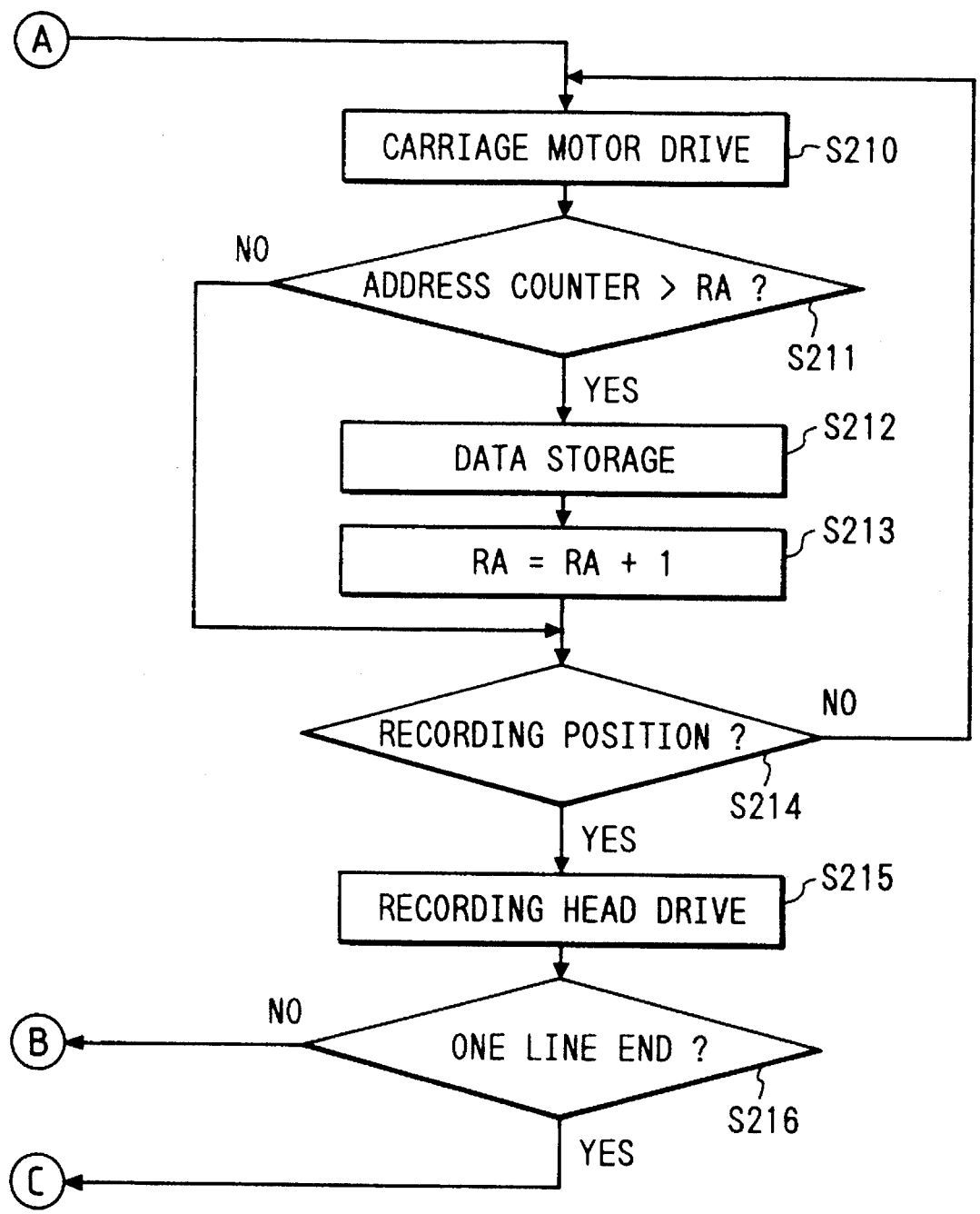
FIG. 35, which is comprised of FIGS. 35A and 35B, is a flow chart of the control sequence of said ninth embodiment.

Now reference is made to a flow chart in FIG. 35 for explaining the functions of the present embodiment.

Steps S201–S205 are same as the steps S101–S105 of the eighth embodiment. A step S206 sets the start address of the image buffer in the RAM 11, into the register RA 11a.

Then a step S207 activates the sheet feeding motor 6, thereby advancing the recording sheet, and a step S208 sets the transfer flag in the read/write signal control circuit 21 at the "H" state, whereby the image data are transferred from the RAM 11 to the I/O port 13a at every access of the MPU 9 to the ROM 10, and the count of the address counter 20 is stepwise increased at every data transfer.

A step S209 effects data, analysis for the next line, namely conversion of the recording data of one byte of the next line, stored in the reception buffer, into image data. A next step S210 activates the carriage motor 3 for moving the carriage 1, and a step S211 compares the value of the register RA 11a with the value of the address counter 20, obtained by selecting the data bus selector 22.

If the address counter values SM 22a, SL 22b>RA 11a, indicating that the data in the image buffer at the address indicated by the register RA 11a are already recorded and are unnecessary, a step S212 stores the image data of the next line, converted in the step S209, into the image buffer at the address indicated by the register RA 11a, then a step S213 increases the count of the register RA 11a by one, and the sequence proceeds to a step S214.

On the other hand, if the address counter values≦RA, a step S214 discriminates whether the recording position has been reached, and the steps S210–S214 are repeated until said position is reached.

When the recording position is reached, a step S215 sends a head drive start signal through the I/O port 13 to the driver circuit 15a, which in response drives the recording head 2 according to the image data from the I/O port 13a. Then a step S216 discriminates whether the recording of a line has been completed, and the steps S208–S213 are repeated until the completion of recording of a line.

Upon completion of said recording, the sequence returns to the step S203.

As explained in the foregoing, in the course of a recording operation, the image data of the next line are formed in a part of the image buffer area, which is lower than the address indicated by the address counter 20 and in which the data are already recorded and no longer necessary, by reading the data selector 22.

In the present embodiment, since the address counter 20 has a 16-bit structure while the data bus has an 8-bit structure, the data selector 22 is composed of SL 22b corresponding to the lower eight bits of the address counter 20 and SM 22a corresponding to the upper eight bits of the address counter, and the MPU 9 detects the value thereof by reading said SM 22a and SL 22b.

In the following there will be explained a tenth embodiment of the present invention, with reference to the attached drawings.

In forming Italicized characters, it is generally necessary, in developing the image data of a next line and storing said image data in the image buffer area of the RAM 11 after the recording of image data of a line, to clear the preceding data present in said image buffer area.

Also in case the image data of the next line is less than the amount of said next line, the preceding data have to be cleared from the image buffer area, since otherwise a part of the image data of the preceding line may be recorded.

Furthermore, there may be required two recordings in a same position in the course of recording of a line, depending on a recording control code such as a back space code or a recording area designating code. Such recordings are usually achieved in one scanning operation of the recording head, by employing an overlapped writing (logic sum) processing in the image buffer. In this process, the second image data are stored with logic summing to the preceding image data. In such case the image data of the preceding line have to be cleared since the logic summing does not erase such image data.

Such clearing or erasure is however quite burdensome to the MPU 9, so that the throughput becomes inevitably lowered in the above-explained processes.

On the other hand, the recordings may be conducted with two scanning motions of the recording head in case of doubled printing or emphasized printing, and the preceding image data should not be erased in such case.

The present tenth embodiment is designed in consideration of the foregoing points, and is to effect the image data transfer and the image data clearing in an access cycle of the MPU 9 to the ROM 10 or other units than the RAM 11, thereby preventing the loss in the throughput. Also said image data clearing is rendered controllable, whereby various recording modes are rendered possible.

Figure 36:
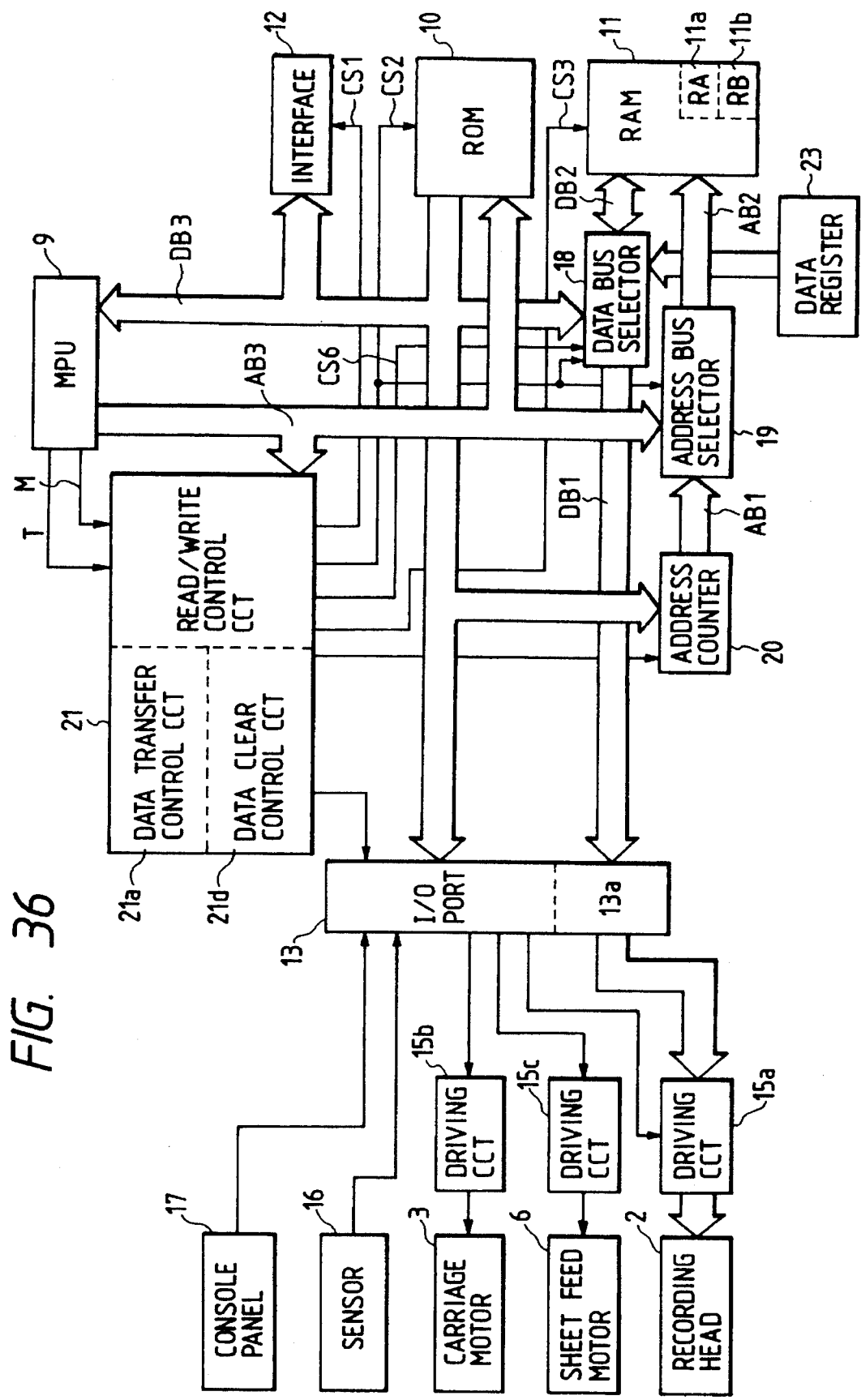
FIG. 36 is a block diagram of a tenth embodiment of the present invention.
Figure 37:
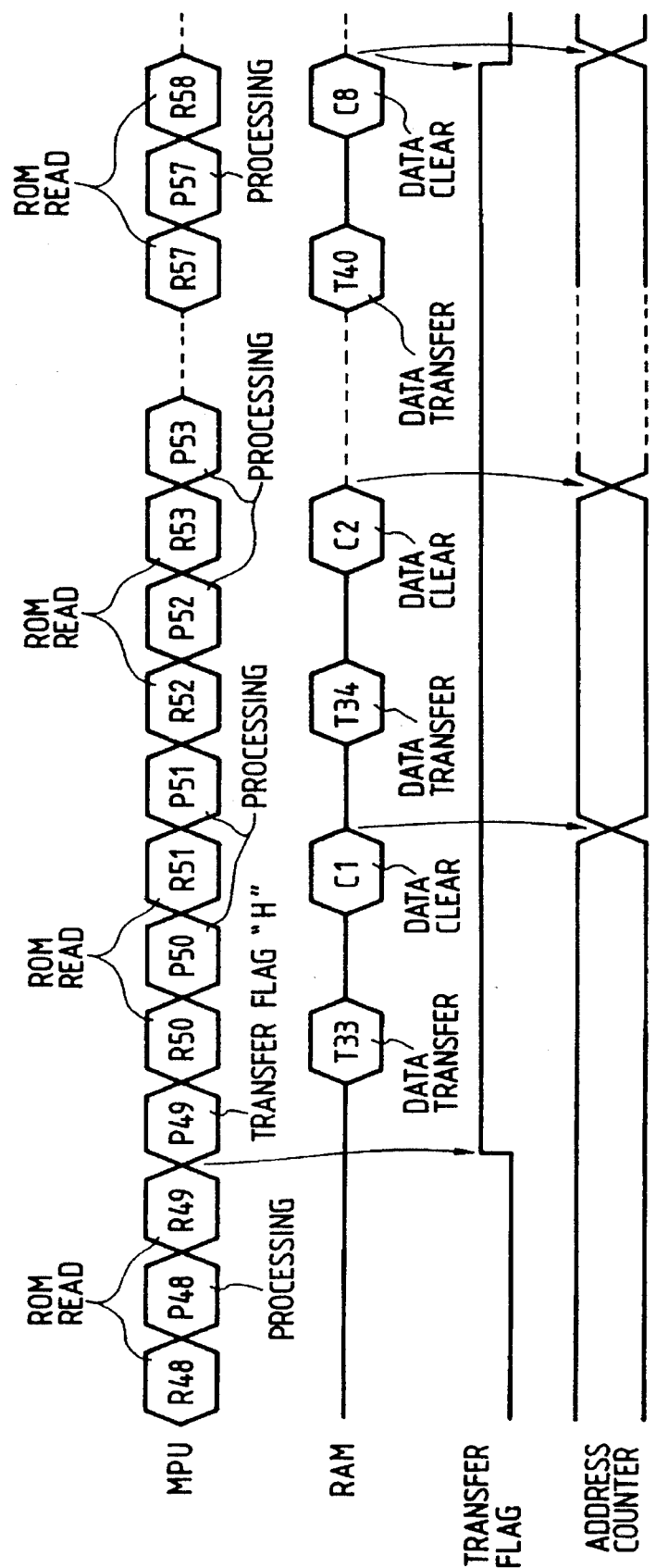
FIG. 37 is a timing chart of data transfer operations in said tenth embodiment.

FIG. 36 is a block diagram of the present embodiment, wherein a read/write control circuit incorporating a data transfer control circuit 21a and a data clear control circuit 21d effects the transfer and clearing of the image data of the RAM 11 as shown in a timing chart in FIG. 37.

When the MPU 9 sets the transfer flag in the data transfer control circuit 21a to the "H" state by a transfer signal T in a cycle P49, the data transfer control circuit 21a transfers the image data in an area of the RAM 11, indicated by the address counter 20, to the I/O port 13a, in a next ROM reading cycle R50. Then, in a next ROM reading cycle R51, the data clear control circuit 21d writes "00"H into the RAM area which previously stored the data already transferred to the I/O port 13a, thereby achieving the data clearing cycle C1. The clearing data "00"H are stored in the data register 23 and are given to the RAM 11 through the data bus selector 18, which is switched by a chip select signal CS6.

After said cycle C1, the count of the address counter is increased by "1". In the present embodiment, the transfer and clearing of data of 8 bytes are conducted by the repetition of the above-explained operations. After the clearing of the data of 8th byte in a cycle C8, the transfer flag is shifted to the "L" state so that no operation is conducted in the next ROM reading cycle. Thus the MPU 9 can achieve the transfer and clearing of the image data only by a process in the cycle P49.

The above-explained clearing operation is conducted only when the mode signal M is shifted to the "H" state, indicating the transfer/clear mode, before the transfer flag is shifted to the "H" state by the transfer signal T. If said mode signal M is at the "L" state, the clearing operation is not conducted but there is conducted an operation similar to that in the first embodiment shown in FIG. 5.

In this manner the data transfer can be conducted in various modes.

In the following there will be explained an eleventh embodiment of the present invention.

Figure 38B:
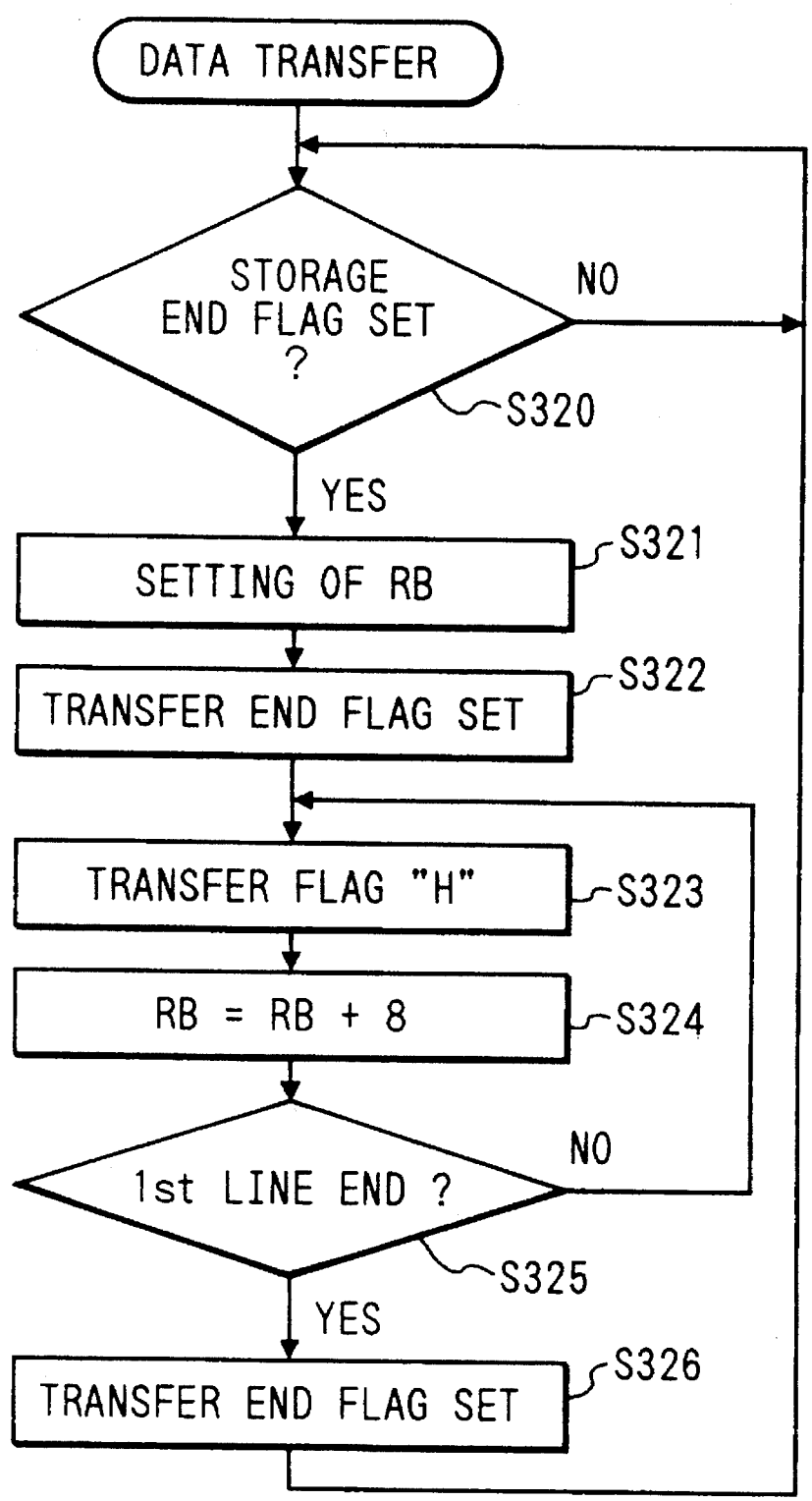
FIG. 38, which is comprised of FIGS. 38A and 38B, is a flow chart of the control sequence of an eleventh embodiment of the present invention.

This embodiment constitutes another control system in the eighth embodiment shown in FIG. 32, and the functions of this embodiment will be explained in the following with reference to FIGS. 38 and 39.

At first there will be explained the storage of data in the RAM 11. When a step S301 identifies the ON-LINE mode, a step S302 effects data analysis, and a step S303 effects setting the register RA 11a and resetting of a storage end flag, indicating the completion of storage of image data of a line.

Figure 39A:
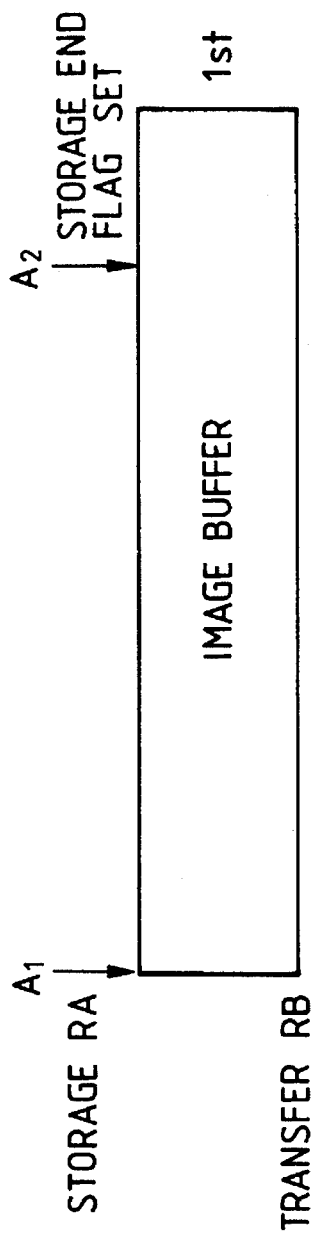
FIGS. 39A and 39B are views showing the function of said eleventh embodiment.

When a step S304 identifies that the data to be stored are of the first line, steps S305 and S306 effect the storage of data of a line. In this storage of the first line, the data transfer to the recording head need not be considered as shown in FIG. 39A. Upon completion of said date storage, a step S307 sets said storage end flag, indicating that the data to be transferred to the recording head are ready.

In the following there will be explained the data transfer from the RAM 11 to the recording head.

When a step S320 detects the set state of said storage end flag, a step S321 effects the setting of the register RB 11*b* and the resetting of a transfer end flag, indicating the completion of transfer of image data of a line.

Then a step S323 instructs the data transfer by setting the transfer flag at the "H" state, and a step S324 increases the count of the register RB by "8". Subsequently a step S325 repeats the steps S323 and S324 for a line, and a step S326 sets the transfer end flag.

Figure 39B:
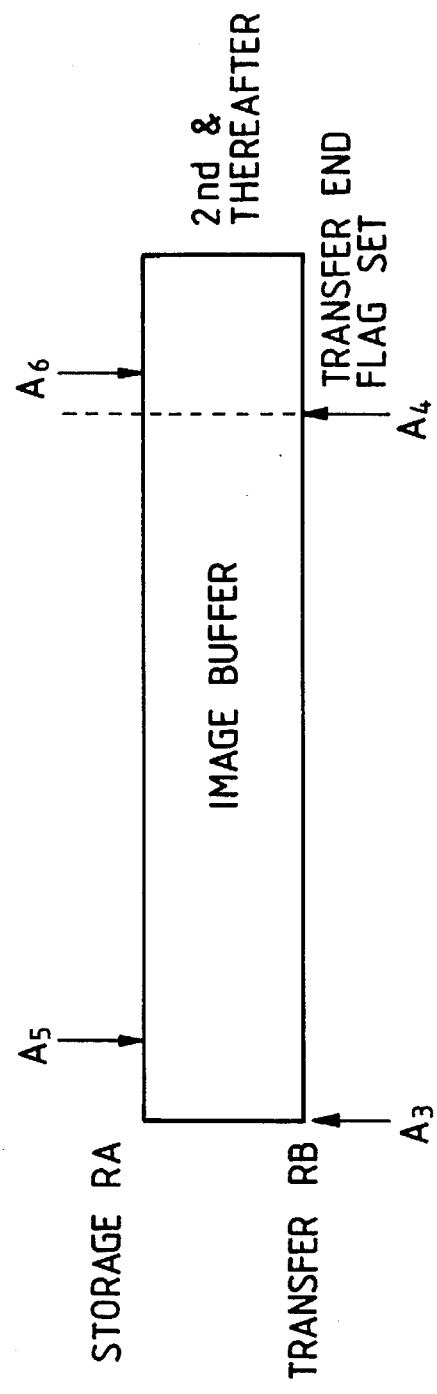

The data storage for the second or subsequent line is conducted in the following manner. If the step S304 identifies that the data to be stored are for the second line or a subsequent line, a step S308 discriminates whether the transfer end flag has been set. If said flag is not set, and if a step S309 identifies a state RB>RA, a step S310 effects the data storage. On the other hand, if RB≦RA, indicating that the data transfer has not been completed at this address, the sequence returns to the step S308. Also if said step S308 identifies that the set state of the transfer end flag, indicating that the data in the image buffer area have been recorded and are no longer necessary as shown in FIG. 39B, the step S310 effects the data storage regardless of the values of the registers RA, RB.

Subsequently a step S311 increases the value of the register RA by "1", and the steps S308–S311 are repeated until the completion of storage of data of a line is identified in a step S312. Thereafter the step S307 sets the storage end flag, thereby enabling the data transfer to the recording head.

Also this embodiment allows to prepare the image data of a next line, in the course of recording operation, utilizing an image buffer area of a capacity of a line, thereby improving the throughput of the apparatus.

Among the ink jet recording systems, the present invention brings about excellent effects particularly in a recording head or a recording device utilizing thermal energy.

As to its representative constitution and principle, for example, one practiced by use of the basic principle disclosed in, for example, the U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleate boiling corresponding to the recording information on an electricity-heat convertors arranged corresponding to the sheets or liquid channels holding liquid (ink), heat energy is generated at the electricity-heat convertors to effect film boiling at the heat acting surface of the recording head and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heat acting surface.

As the constitution of the recording head, in addition to the combination constitutions of discharge orifice, liquid channel, electricity-heat converter (linear liquid channel or right angle liquid channel) as disclosed in the above-mentioned respective specifications, the constitution used in U.S. Pat. No. 4,558,333 or 4,459,600 disclosing the heat acting portion arranged in the flexed region is also included in the present invention. In addition, the present invention can also effectively have the constitution as disclosed in Japanese Patent Laid-Open Application No. 59-123670 which discloses the constitution using a slit common to a plurality of electricity-heat convertors as the discharging portion of the electricity-heat converter, or Japanese Patent Laid-Open Application No. 59-138461 which discloses the constitution having the opening for absorbing pressure waves of heat energy correspondent to the discharging portion.

Further, as the recording head of the full line type having a length corresponding to the maximum width of the recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary auxiliary means etc. provided as the constitution of the recording device of the present invention is preferable, because the effect of the present invention can be further stabilized. Specific examples of these may include, for the recording head, capping means, cleaning means, pressurization or aspiration means, electricity-heat converters or another heating element or preliminary heating means according to a combination of these, and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

Further, the ink jet recording apparatus of the present invention may be constituted not only as an image output terminal of an information processing equipment such as a computer, but also as a copying apparatus combined for example with a reader or a facsimile apparatus provided with transmitting/receiving functions.

Figure 40:
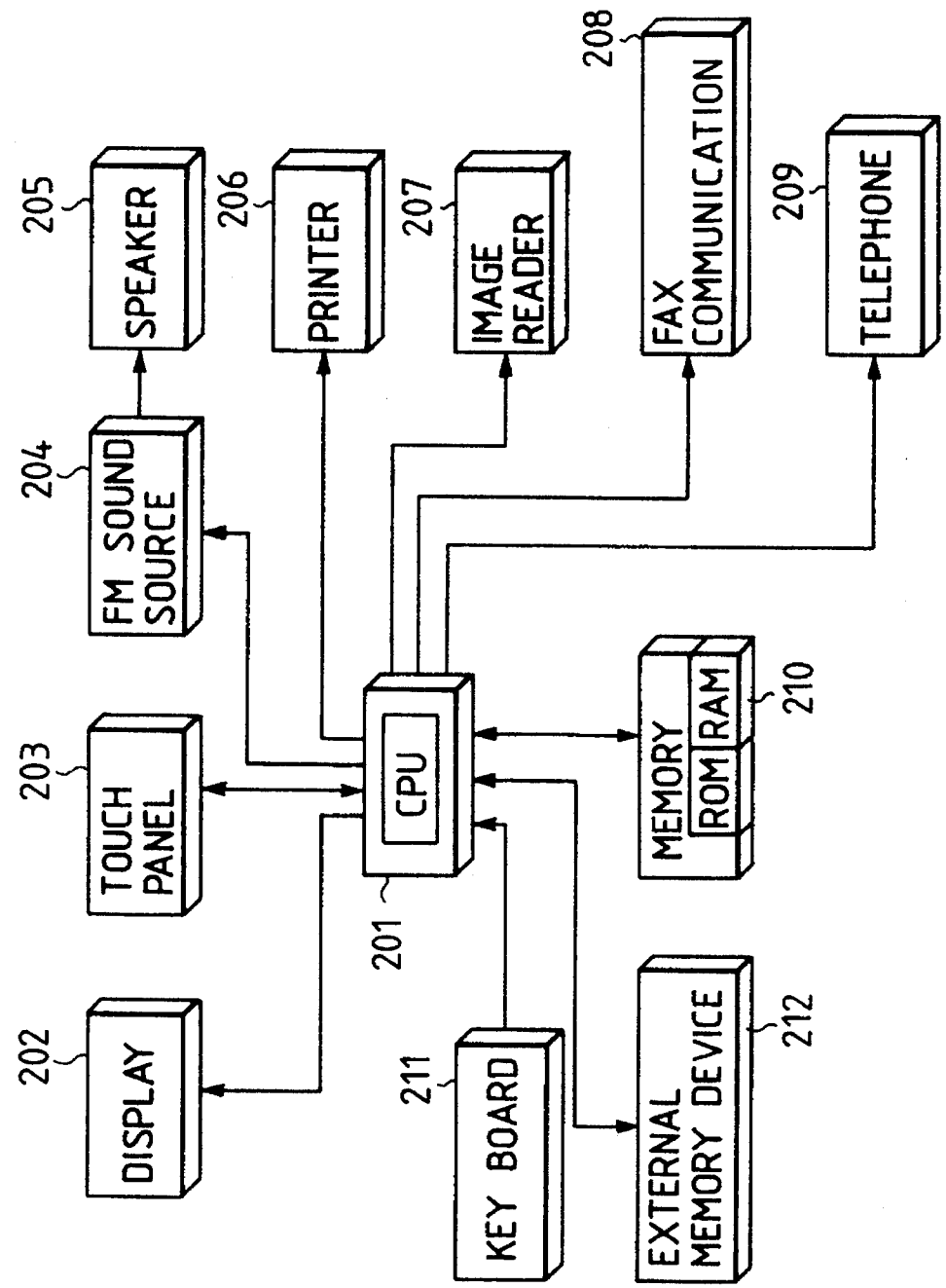
FIG. 40 is a schematic block diagram of an information processing apparatus in which the present invention is applied.

FIG. 40 is a schematic block diagram when the recording apparatus of the present invention is applied to an information processing apparatus with functions as word processor, personal computer, facsimile apparatus and copying apparatus.

A control unit 201 is provided with a CPU such as a microprocessor and various I/O ports and controls the entire apparatus by exchanging controls signals and data signals with various parts of the apparatus. A display unit 202 serves to display various menus, text information and image data read by an image reader 207. A transparent pressure-sensitive touch panel 203, provided on the display unit 202, allows to enter the items displayed on the display unit 202 or coordinates, by depression of the surface for example with a finger.

A FM (frequency modulation) sound source 204 effects frequency modulation on sound information prepared for example in a sound editor and stored in the form of digital data in a memory 210 or an external memory 212. The electrical signal from said FM sound source 204 is converted into acoustic sound by a speaker 205. A printer 206 employs the recording apparatus of the present invention, as an output terminal of the word processor, personal computer, facsimile apparatus or copying apparatus.

An image reader 207, for photoelectrically reading original data, is provided in the transport path of the original documents, and reads the original to be transmitted by facsimile or to be copied. A facsimile transmission unit 208, for transmitting the data of the original read by the image reader 207 and receiving and decoding the facsimile signals transmitted from the outside, is provided with an interface function with the external lines. A telephone unit 209 is provided with various telephone functions such as an ordinary telephone function and a message recording function.

A memory unit 210 includes a ROM for storing system programs, manager programs, other application programs, character fonts and dictionaries, and a RAM for storing application programs loaded from the external memory 212, text information and video information.

A keyboard 211 serves to enter text information and various commands.

An external memory 212 employing a floppy disk or a rigid disk as the recording medium serves to store text information, music or sound information, user application programs etc.

Figure 41:
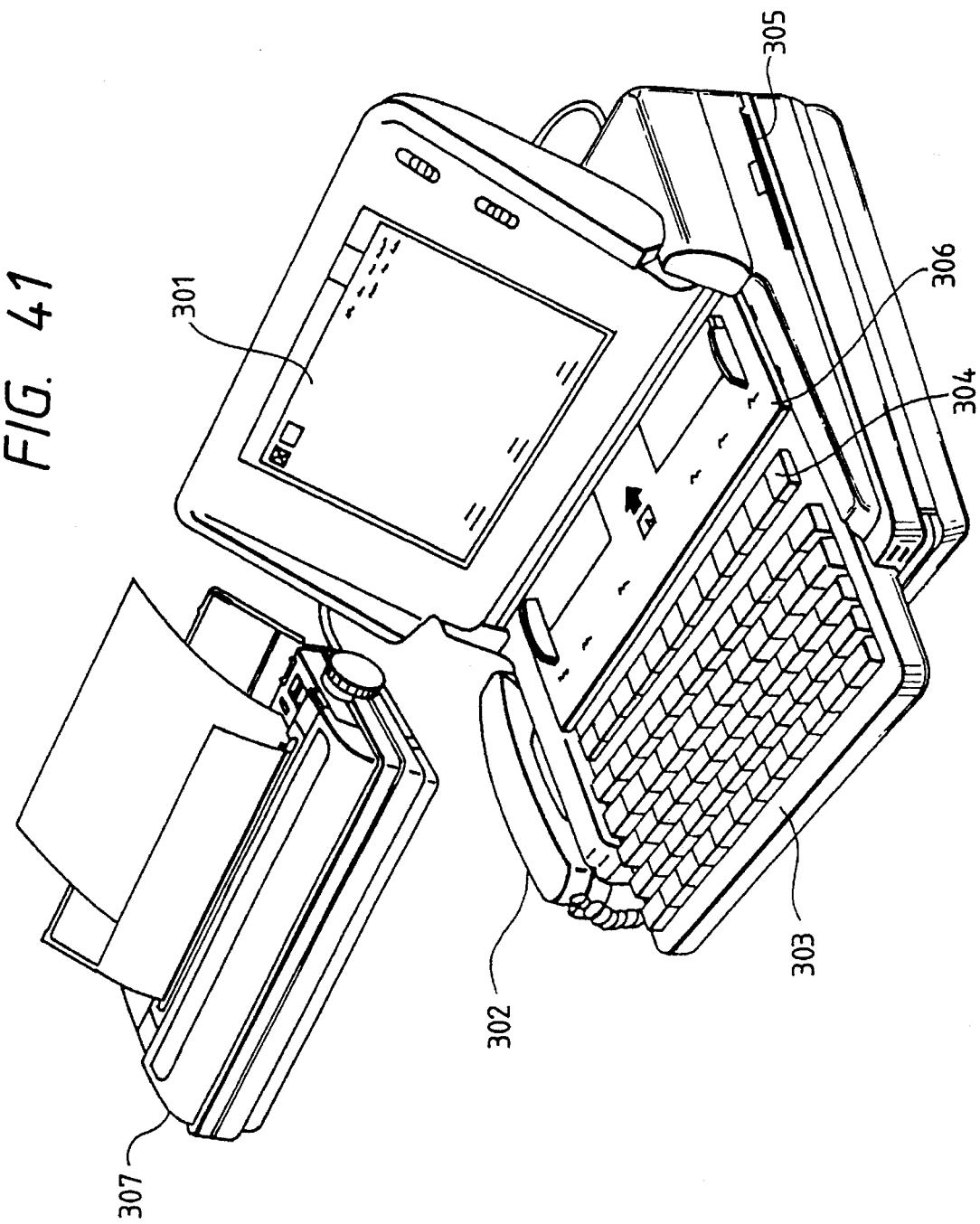
FIG. 41 is an external view of the information processing apparatus shown in FIG. 40.

FIG. 41 is an external view of the information processing apparatus shown in FIG. 40.

A flat panel display 301, composed for example of a liquid crystal display unit, serves to display various menus, graphic information and text information. On said display 301, there is provided a touch panel 203 for entering the coordinates or other items by surface depression for example with a finger. A handset 302 is used when the apparatus functions as a telephone. A keyboard 303 is detachably connected to the main body through a cable, and serves to enter various text information and data. Said keyboard 303 is further provided with various function keys 304. A slot 305 is for inserting the floppy disk into the external memory 212.

A sheet stacker 306 is provided for supporting an original to be read by the image reader 207, and the read original is discharged from the rear part of the apparatus. In the facsimile reception, the recording operation is conducted by an ink jet printer 307.

The above-mentioned display unit 202 may be composed of a cathode ray tube, but is preferably composed of a flat panel display, such as a liquid crystal display utilizing ferroelectric liquid crystal, because such display unit can achieve weight reduction, in addition to compactization.

When said information processing apparatus functions as a personal computer or a word processor, the information entered from the keyboard 211 are processed in the control unit 201 according to a predetermined program, and are released as an image in the printer unit 206.

When it functions as a facsimile receiver, the facsimile information received from a communication channel through the facsimile transmitting unit 208 are processed in the control unit 201 according to a predetermined program, and a received image is obtained from the printer unit 206.

Also when it functions as a copying apparatus, an original is read in the image reader 207, and the read original data are supplied through the control unit 201 to the printer unit 206 for obtaining a copied image therein. When it functions as a facsimile transmitter, the original data obtained in the image reader 207 are processed in the control unit 201 according to a predetermined program, and transmitted to the communication channel through the facsimile transmitting unit 208.

The application of the recording apparatus of the present invention to the above-explained multi-function information processing apparatus allows to obtain recorded images of high quality with a high speed and with low noises, thereby improving the functions of said information processing apparatus.

As explained in the foregoing, the present invention detects, in the course of a recording operation, an area of the image buffer of which data have become unnecessary because of the recording operation and forms the image data of a next line in said area, thereby improving the throughput of the apparatus without an increase in the memory capacity.

What is claimed is:

1. A data processing apparatus comprising:

an MPU for data processing;

an addressable memory for storing data processed by said MPU, said memory being arranged on a first area of an address space of said MPU;

a unit other than said addressable memory, said unit being arranged on a second area of the address space of said MPU;

an address decoder for decoding an address outputted from said MPU so as to detect that said MPU makes access to said unit other than said addressable memory;

separation means for separating an address bus and a data bus of said memory from said MPU;

data transfer control means for separating the address bus and the data bus of said memory from said MPU by said separation means and effecting transfer or clearing of the data of said memory in synchronism with access made to the unit other than said memory by means of said MPU when said address decoder detects that said MPU makes access to the unit other than said memory.

2. A data processing apparatus comprising:

an MPU for data processing:

a dynamic addressable memory for storing data processed by said MPU, said memory being arranged on a first area of an address space of said MPU;

a unit other than said addressable memory, said unit being arranged on a second area of the address space of said MPU;

an address decoder for decoding an address outputted from said MPU so as to detect that said MPU makes access to said unit other than said addressable memory;

separation means for separating an address bus and a data bus of said dynamic memory from said MPU; and a refreshing control circuit for separating the address bus and the data bus of said memory from said MPU by said separation means and effecting the refreshing of said dynamic memory in synchronism with access made to the unit other than said memory by means of said MPU when said address decoder detects that said MPU makes access to said unit other than said memory.

3. A data processing apparatus comprising:

an addressable memory, said memory being arranged on a first area of an address space;

a unit other than said addressable memory, said unit being arranged on a second area of the address space;

first and second process means for effecting a process to said memory, said first and second process means outputting an address to said memory;

an address decoder for decoding an address outputted from said first process means so as to detect that said first process means outputs an address to said unit other than said memory;

switch means for selectively connecting a bus, connected to said memory, to said first or second process means; and data control means for causing said switch means to connect the bus, connected to said memory, to said second process means, thereby enabling said second process means to effect the process to said memory in synchronism with the output of an address to said unit other than said memory by means of said first process means, when said address decoder detects that said first process means outputs an address to the unit other than said memory.

4. A data processing method utilizing an addressable memory for storing data, said method comprising the steps of:

accessing said memory by an MPU to input or output data to or from said memory in accordance with an address from said MPU, wherein said memory is arranged on a first area of an address space of said MPU;

detecting, by decoding an address from said MPU, that said MPU makes access to a unit other than said memory, wherein said unit is arranged on a second area of the address space of said MPU; and accessing said memory with the unit other than said MPU to effect input or output of data to or from said memory in synchronism with the access made to the unit other than said memory by means of said MPU, when it is detected in said detecting step that said MPU makes access to the unit other than said memory.

5. A data processing method according to claim 4, further comprising the step of clearing data in said memory with a clear control circuit, while said MPU makes access to the unit other than said memory.

6. A data processing method according to claim 4, further comprising the step of transferring data to said memory with a data transfer control circuit, while said MPU makes access to the unit other than said memory.

7. A data processing method according to claim 4, further comprising the step of transferring data from said memory to a recording device with a data transfer control circuit, while said MPU makes access to the unit other than said memory.

8. A data processing method according to claim 7, wherein said recording device comprises an ink jet recording device.

9. A data processing method according to claim 8, wherein a recording head of said ink jet recording device comprises:

plural discharge openings for discharging ink; and thermal energy generating means for causing a state change by thermal energy in the ink provided in a corresponding discharge opening, thereby discharging ink from the discharge opening based on the state change and forming a flying liquid droplet.

10. A data processing method according to claim 4, wherein said memory comprises a random access memory capable of data reading and writing.

11. A data processing method according to claim 10, wherein units other than said MPU are adapted to effect input or output of said data to or from said random access memory while said MPU makes access to a read-only memory storing programs.

12. A data processing method utilizing a dynamic memory for data storage, said method comprising the steps of:

accessing said dynamic memory with an MPU to effect input or output of data to or from said dynamic memory in accordance with an address from said MPU, wherein said dynamic memory is arranged on a first area of an address space of said MPU;

detecting, by decoding an address from said MPU, that said MPU makes access to a unit other than said memory, wherein said unit is arranged on a second area of the address space of said MPU; and effecting refreshing of said dynamic memory with a refreshing control circuit in synchronism with the access made to the unit other than said memory by means of said MPU, when it is detected in said detecting step that said MPU makes access to the unit other than said memory.

13. A data processing apparatus for data processing with a CPU, said apparatus comprising:

an addressable memory for storing data, processed by said CPU, through a bus, said memory being arranged on a first area of an address Space of said CPU;

a unit other than said addressable memory, said unit being arranged on a second area of the address space of said CPU;

input/output means for effecting input or output of the data to or from said memory through a bus;

an address decoder for decoding an address outputted from said CPU so as to detect that said CPU makes access to the unit other than said addressable memory;

bus control means for separating the bus between said CPU and said memory and connecting the bus between said input/output means and said memory, when said address decoder detects that said CPU makes access to the unit other than said memory; and access control means for enabling data access between said input/output means and said memory, in synchronization with an access operation of said CPU to said unit other than said memory.

14. A data processing apparatus according to claim 13, wherein said input/output means comprises an input data buffer for receiving data from a host computer.

15. A data processing apparatus according to claim 13, wherein said input/output means comprises an output data buffer for reading data for a recording device.

16. A data processing apparatus according to claim 15, wherein said recording device comprises an ink jet recording device.

17. A data processing apparatus according to claim 16, wherein a recording head of said ink jet recording device comprises:

plural discharge openings for discharging ink; and thermal energy generating means for causing a state change by thermal energy in the ink provided in the corresponding discharge opening, thereby discharging ink from said discharge opening based on the state change and forming a flying liquid droplet.

18. A data processing apparatus according to claim 13, wherein said memory comprises a random access memory capable of data reading and writing.

19. A data processing apparatus according to claim 18, wherein said bus control means is adapted to separate the bus between said CPU and said random access memory while said CPU makes access to a read-only memory storing programs.

20. A data processing apparatus according to claim 18, wherein said access control means is adapted to enable data access between said input/output means and said random access memory while said CPU makes access to a read-only memory, storing programs.

21. A recording apparatus comprising:

a CPU for data processing;

an addressable memory capable of storing image data of a line, processed by said CPU, through a bus, said memory being arranged on a first area of an address space of said CPU;

a unit other than said addressable memory, said unit being arranged on a second area of the address space of said CPU;

a recording head adapted for receiving the image data released from said memory through a bus;

an address decoder for decoding an address outputted from said CPU so as to detect that said CPU makes access to the unit other than said addressable memory;

bus control means for separating the bus between said CPU and said memory and connecting the bus between said recording head and said memory, when said address decoder detects that said CPU makes access to the unit other than said memory; and transfer control means for transferring image data from said memory to said recording head, in synchronization with an access operation of said CPU to the unit other than said memory;

wherein said CPU identifies an area of said memory in which the image data of a next line can be stored, based on an area of said memory from which image data are transferred to said recording head by said transfer control means.

22. A recording apparatus according to claim 21, wherein said CPU identifies an address of said memory in which the image data of a next line can be stored, based on the address from which the image data are transferred from said memory to said recording head by said transfer control means.

23. A recording apparatus according to claim 22, wherein said CPU is adapted to read an address of the transfer of image data by said transfer control means.

24. A recording apparatus according to claim 21, wherein said recording head comprises an ink jet recording head.

25. A recording apparatus according to claim 24, wherein said ink jet recording head comprises:

plural discharge openings for discharging ink; and thermal energy generating means for causing a state change by thermal energy in the ink provided in a corresponding discharge opening, thereby discharging ink from said discharge opening based on the state change and forming a flying liquid droplet.

26. A recording apparatus according to claim 21, wherein said CPU is adapted, while said recording head effects a recording operation, to store the image data of a next line in said memory.

27. An apparatus according to claim 21, wherein one of the units other than said memory comprises a read-only memory for storing programs.

28. A method according to claim 11, wherein the read-only memory stores an NOP command for said MPU.

29. An apparatus according to claim 19, wherein said read-only memory stores an NOP command for said CPU.

30. An apparatus according to claim 20, wherein said read-only memory stores an NOP command for said CPU.

31. An apparatus according to claim 27, wherein said read-only memory stores an NOP command for said CPU.

32. An apparatus according to claim 1, wherein said apparatus is utilized in a copying machine.

33. An apparatus according to claim 1, wherein said apparatus is utilized in a facsimile machine.

34. An apparatus according to claim 1, wherein said apparatus is utilized in a data processor.

35. An apparatus according to claim 1, further comprising conveying means for conveying a recording medium.

36. An apparatus according to claim 3, wherein said apparatus is utilized in a copying machine.

37. An apparatus according to claim 3, wherein said apparatus is utilized in a facsimile machine.

38. An apparatus according to claim 3, wherein said apparatus is utilized in a data processor.

39. An apparatus according to claim 3, further comprising conveying means for conveying a recording medium.

40. An apparatus according to claim 13, wherein said apparatus is utilized in a copying machine.

41. An apparatus according to claim 13, wherein said apparatus is utilized in a facsimile machine.

42. An apparatus according to claim 13, wherein said apparatus is utilized in a data processor.

43. An apparatus according to claim 13, further comprising conveying means for conveying a recording medium.

44. An apparatus according to claim 17, further comprising recovery means for recovering the recording head.

45. In combination, a data control circuit connected to an MPU for data processing, an addressable memory for storing data processed by said MPU, said memory being arranged on a first area of an address space of said MPU, and a unit other than said addressable memory, said unit being arranged on a second area of the address space of said MPU, said data control circuit comprising:

separation means for effecting separation of an address bus and a data bus of said memory from said MPU; and a refreshing control circuit for separating the address bus and the data bus of said memory from said MPU by said separation means and effecting refreshing of said memory in synchronism with access made to the unit other than said memory by means of said MPU when said address decoder detects that said CPU makes access to the unit other than said memory.

46. A data control circuit connected to an addressable memory, said memory being arranged on a first area of an address space, and a unit other than said addressable memory, said unit being arranged on a second area of the address space, first and second process means for effecting a process to said memory, said first and second process means outputting an address to said memory, said data control circuit comprising:

an address decoder for decoding an address outputted from said first process means so as to detect that said first process means outputs an address to the unit other than said memory;

switch means for selectively connecting a bus, connected to said memory, to said first or second process means; and data control means for causing said switch means to connect the bus, connected to said memory, to said second process means, thereby enabling said second process means to effect the process to said memory in synchronism with the output of an address to the unit other than said memory by means of said first process means, when said address decoder detects that said first process means outputs an address to the unit other than said memory.

47. A data control circuit connected to an addressable memory for storing data processed by a CPU, through a bus, said memory being arranged on a first area of an address space of said CPU, a unit other than said addressable memory, said unit arranged on a second area of the address space of said CPU, and input/output means for effecting input or output of the data to or from said memory through a bus, said data control circuit comprising:

- an address decoder for decoding an address outputted from said CPU so as to detect that said CPU makes access to the unit other than said addressable memory;
- bus control means for separating the bus between said CPU and said memory and connecting the bus between said input/output means and said memory, when said address decoder detects that said CPU makes access to the unit other than said memory; and
- access control means for enabling data access between said input/output means and said memory, in synchronization with an access operation of said CPU to said unit other than said memory.

48. A data processing apparatus comprising:

an MPU for data processing;

an addressable memory for storing data processed by said MPU, said addressable memory being arranged on a first area of an address space of said MPU;

a unit other than said addressable memory, said unit being arranged on a second area of the address space of said MPU;

an address decoder for decoding an address outputted from said MPU so as to detect that said MPU makes access to said unit other than said addressable memory;

separation means for separating an address bus and a data bus of said addressable memory from said MPU; and data transfer control means for separating the address bus and the data bus of said addressable memory from said MPU by said separation means, connecting the address bus and the data bus of said addressable memory to a processor, and effecting transfer or clearing of the data of said addressable memory by the processor in synchronism with access made to said unit other than said addressable memory by said MPU when said address decoder detects that said MPU makes access to said unit other than said addressable memory.

49. A data processing apparatus comprising:

an MPU for data processing;

a dynamic addressable memory for storing data processed by said MPU, said memory being arranged on a first area of an address space of said MPU;

a unit other than said memory, said unit being arranged on a second area of the address space of said MPU;

an address decoder for decoding an address outputted from said MPU so as to detect that said MPU makes access to said unit other than said memory;

separation means for separating an address bus and a data bus of said memory from said MPU; and a refreshing control circuit for separating the address bus and the data bus of said memory from said MPU by said separation means, connecting the address bus of said memory to a refresh circuit, and effecting the refreshing of said memory by said refreshing control circuit in synchronism with access made to said unit other than said memory by said MPU when said address decoder detects that said MPU makes access to said unit other than said memory.

50. A data processing apparatus comprising:

an addressable memory, said memory being arranged on a first area of an address space;

a unit other than said memory, said unit being arranged on a second area of address space;

first and second process means for effecting a process to said memory, said first and second process means outputting an address to said memory;

an address decoder for decoding an address outputted from said first process means so as to detect that said first process means outputs an address to said unit other than said memory;

switch means for selectively connecting a bus, connected to said memory, to said first or second process means; and data control means for separating the bus, connected to said memory, from said first process means, and causing said switch means to connect the bus, connected to said memory, to said second process means, thereby enabling said second process means to effect the process to said memory in synchronism with the output of an address to said unit other than said memory by said first process means, when said address decoder detects that said first process means outputs an address to said unit other than said memory.

\* \* \* \* \*

UNITED STATES PATENT AND TRADEMARK OFFICE
CERTIFICATE OF CORRECTION

PATENT NO. : 5,530,792
DATED : June 25, 1996
INVENTOR(S) : Ikeda et al.

It is certified that error appears in the above-indentified patent and that said Letters Patent is hereby corrected as shown below:

TITLE PAGE:
[56] References Cited

FOREIGN PATENT DOCUMENTS

"2029357  1/1990  Japan" should read --2-029357  1/1990  Japan--.

COLUMN 6:

Line 61, "Consequently" should read --Consequently,--.

COLUMN 7:

Line 33, "can," should read --can--.

COLUMN 8:

Line 46, "short," should read --short.--; and
Line 62, "flag," should read --flag.--.

COLUMN 11:

Line 59, "buffer" should read --buffer.--.

UNITED STATES PATENT AND TRADEMARK OFFICE
CERTIFICATE OF CORRECTION

PATENT NO. : 5,530,792

DATED : June 25, 1996

INVENTOR(S) : Ikeda et al.

It is certified that error appears in the above-indentified patent and that said Letters Patent is hereby corrected as shown below:

COLUMN 13:

Line 39, "GAS," should read --CAS,--.

COLUMN 14:

Line 14, "117," should read --117.--; and
Line 17, "address," should read --address.--.

COLUMN 16:

Line 52, "operation," should read --operation--.

COLUMN 17:

Line 1, "data," should read --data--.

COLUMN 21:

Line 1, "A" should read --An--.

UNITED STATES PATENT AND TRADEMARK OFFICE
CERTIFICATE OF CORRECTION

PATENT NO. : 5,530,792

DATED : June 25, 1996

INVENTOR(S) : Ikeda et al.

It is certified that error appears in the above-indentified patent and that said Letters Patent is hereby corrected as shown below:

COLUMN 22:

Line 37, "processing:" should read --processing;--.

COLUMN 24:

Line 20, "Space" should read --space--.

Signed and Sealed this

Twenty-ninth Day of October 1996

Attest:

BRUCE LEHMAN

Attesting Officer    Commissioner of Patents and Trademarks